(12) United States Patent
Fuller et al.

(10) Patent No.: US 12,691,849 B2
(45) Date of Patent: Jul. 28, 2026

(54) METHOD AND APPARATUS FOR TRAILER MONITORING

(71) Applicant: Jarrett Companies, Inc., Orrville, OH (US)

(72) Inventors: Abram Lee Fuller, Dalton, OH (US); Christopher Lee Indermuhle, Doylestown, OH (US); W. Michael Jarrett, Orrville, OH (US)

(73) Assignee: Jarrett Companies, Inc., Orrville, OH (US)

( * ) Notice: Subject to any disclaimer, the term of this patent is extended or adjusted under 35 U.S.C. 154(b) by 63 days.

(21) Appl. No.: 18/762,804

(22) Filed: Jul. 3, 2024

(65) Prior Publication Data

US 2024/0351555 A1 Oct. 24, 2024

Related U.S. Application Data

(62) Division of application No. 17/538,312, filed on Nov. 30, 2021, now Pat. No. 12,060,038.

(Continued)

(51) Int. Cl.
B60R 25/24 (2013.01)
B60R 25/30 (2013.01)
(Continued)

(52) U.S. Cl.
CPC ............ B60R 25/24 (2013.01); B60R 25/305 (2013.01); B60R 25/31 (2013.01); B60R 25/33 (2013.01); E05B 81/56 (2013.01); E05B 83/02 (2013.01); E05F 15/63 (2015.01); E05Y 2201/434 (2013.01); E05Y 2201/624 (2013.01); E05Y 2400/31 (2013.01); E05Y 2400/44 (2013.01);
(Continued)

(58) Field of Classification Search
CPC .......... E05F 15/63; E05B 81/56; E05B 83/02; E05Y 2201/434; E05Y 2201/624; E05Y 2400/31; E05Y 2900/516; E05Y 2400/446; E05Y 2400/44; E05Y 2400/52; B60R 25/24; B60R 25/31; B60R 25/33
USPC .......................................................... 701/49
See application file for complete search history.

(56) References Cited

U.S. PATENT DOCUMENTS 6,886,870 B2 *  5/2005  Ehrlich .................. E05B 83/10
                                                  292/240
9,919,588 B1    3/2018  Kirkland
                        (Continued)

FOREIGN PATENT DOCUMENTS

CA      3091672      8/2019
EP      3339109      6/2018
              (Continued)

*Primary Examiner* — Tuan C To
(74) *Attorney, Agent, or Firm* — Sand, Sebolt & Wernow Co., LPA

(57) ABSTRACT

A method of accessing a cargo in a trailer. The method includes steps of engaging the trailer to a vehicle, wherein the trailer comprises at least one trailer door assembly operably engaged with at least one driving assembly; unlocking a trailer door of the at least one trailer door assembly via at least one locking assembly; actuating the trailer door, via a rotary actuator, from a closed position to an opened position; pivoting the trailer door, via an expansion assembly of the at least one driving assembly, from the closed position to the opened position; and providing access to the cargo inside of the trailer.

20 Claims, 24 Drawing Sheets

Related U.S. Application Data

(60) Provisional application No. 63/252,385, filed on Oct. 5, 2021.

(51) Int. Cl.

| | |
|---|---|
| B60R 25/31 | (2013.01) |
| B60R 25/33 | (2013.01) |
| E05B 81/56 | (2014.01) |
| E05B 83/02 | (2014.01) |
| E05F 15/63 | (2015.01) |

(52) U.S. Cl.
CPC ..... *E05Y 2400/446* (2024.05); *E05Y 2400/52* (2013.01); *E05Y 2900/516* (2013.01)

(56) References Cited

U.S. PATENT DOCUMENTS

| | | | |
|---|---|---|---|
| 11,192,523 B2 * | 12/2021 | Linden | E05F 15/73 |
| 11,613,918 B2 * | 3/2023 | Sy | E05B 81/78 |
| | | | 70/277 |
| 2005/0132652 A1 * | 6/2005 | Tong | B60J 5/062 |
| | | | 49/334 |
| 2009/0236864 A1 | 9/2009 | Ehrlich et al. | |
| 2017/0361880 A1 | 12/2017 | Gardner | |
| 2018/0236972 A1 * | 8/2018 | Linden | B60R 25/01 |
| 2020/0279446 A1 | 9/2020 | Hage et al. | |
| 2021/0053407 A1 | 2/2021 | Smith et al. | |
| 2022/0041227 A1 | 2/2022 | Regan et al. | |
| 2023/0003074 A1 | 1/2023 | Hoofard et al. | |

FOREIGN PATENT DOCUMENTS

| | | | | |
|---|---|---|---|---|
| EP | 3477025 A1 * | 5/2019 | | E05B 15/004 |
| EP | 3719762 A1 * | 10/2020 | | E05B 81/90 |
| WO | 2013071236 | 5/2013 | | |
| WO | WO-2019081157 A1 * | 5/2019 | | E05B 15/004 |

* cited by examiner

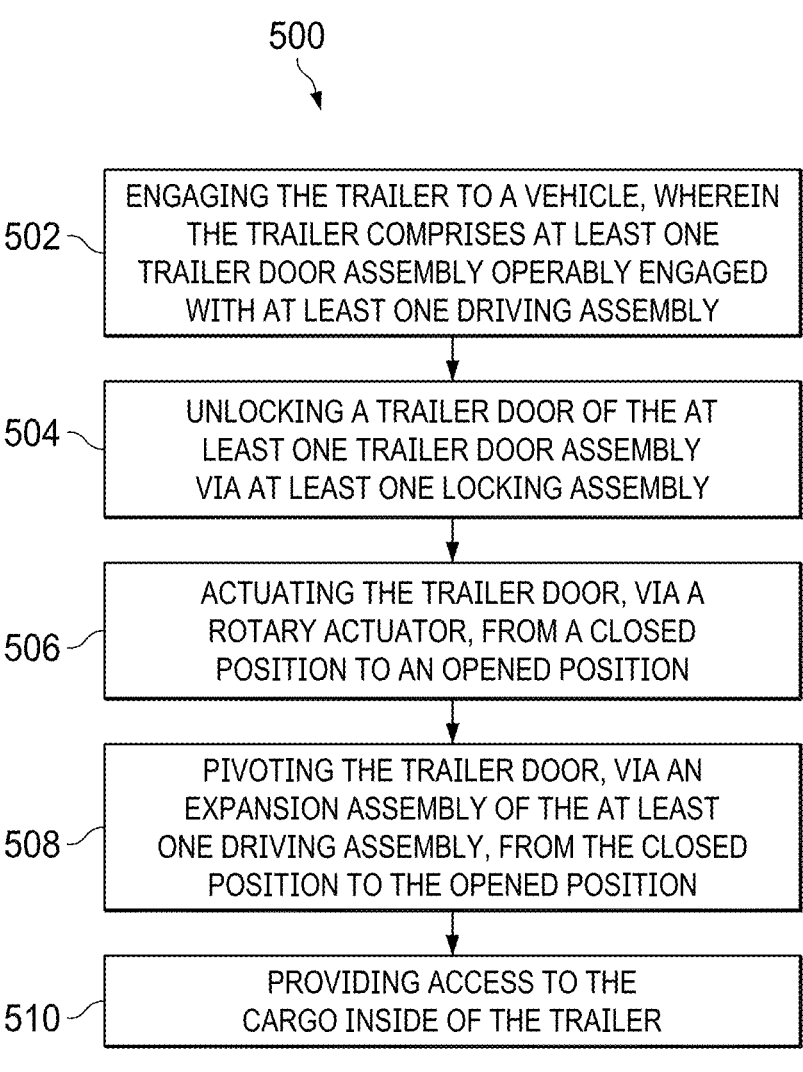

500

502 — ENGAGING THE TRAILER TO A VEHICLE, WHEREIN THE TRAILER COMPRISES AT LEAST ONE TRAILER DOOR ASSEMBLY OPERABLY ENGAGED WITH AT LEAST ONE DRIVING ASSEMBLY

504 — UNLOCKING A TRAILER DOOR OF THE AT LEAST ONE TRAILER DOOR ASSEMBLY VIA AT LEAST ONE LOCKING ASSEMBLY

506 — ACTUATING THE TRAILER DOOR, VIA A ROTARY ACTUATOR, FROM A CLOSED POSITION TO AN OPENED POSITION

508 — PIVOTING THE TRAILER DOOR, VIA AN EXPANSION ASSEMBLY OF THE AT LEAST ONE DRIVING ASSEMBLY, FROM THE CLOSED POSITION TO THE OPENED POSITION

510 — PROVIDING ACCESS TO THE CARGO INSIDE OF THE TRAILER

FIG. 14

METHOD AND APPARATUS FOR TRAILER MONITORING

CROSS REFERENCE TO RELATED APPLICATIONS

This application is a divisional of U.S. application Ser. No. 17/538,312, filed on Nov. 20, 2021, which claims the benefit of U.S. Provisional Application Ser. No. 63/252,385, filed on Oct. 5, 2021; the disclosures of which are incorporated herein by reference.

TECHNICAL FIELD

This present disclosure generally relates to covered trailers. More particularly, the present disclosure relates to a trailer door system provided on a covered trailer. Specifically, the present disclosure relates to a trailer door system that includes at least one trailer door assembly pivotably moveable, via a driving assembly, with a covered trailer.

BACKGROUND ART

Covered trailers, such as dry-van trailers and refrigeration-van trailers, are commonly used in freight carrying industry where a vehicle, such as a semi-truck, tows said covered trailer. Generally, the covered trailers are used in multiple commercial industries for transporting freight and goods for logistical purposes. These covered trailers have long used vertically-hinged doors or roll-up doors to control access through a rear opening of the trailer. While these covered trailers may utilize either door configuration, it is difficult and rather dangerous to manually open these doors during certain conditions the covered trailer is experiencing.

Generally, vertically-hinged doors provided with a covered trailer require outwardly swinging doors which need more space beyond the physical space of the trailer. Even if physical space beyond the trailer is available, opening and closing these vertically-hinged doors manually may incur injuries to the person when detrimental conditions are present (e.g., weather conditions, angle of the trailer, etc.). The vertically-hinged doors may also increase the amount of time for loading and unloading freight and goods in the covered trailer due to the vertically-hinged doors requiring more space beyond the physical space of the trailer. As such, vertically-hinged doors may require multiple adjustments during loading and unloading phases. Additionally, a roll-up door provided with a covered trailer requires additional mechanisms (e.g., tracks/rails, housing to hold the rolled-up door, etc.) that must be added internally or externally to the covered trailer, which may potentially lessen the amount of space available inside of the trailer for transporting freight and goods. Even though roll-up doors do not require physical space beyond the trailer, manually opening and closing these roll-up doors may incur injuries to the person when detrimental conditions are present (e.g., weather conditions, angle of the trailer, etc.).

Moreover, trailers in the marketplace are used in a wide array of industries for transporting and/or hauling specific types of goods and freight. In the current market, trailers are designed for a general purpose for hauling goods and freight in covered environments, such as dry-van trailers, or are designed for a specific purpose that transport or haul specific types of goods or freight, such as vehicle-hauler trailers. In addition, the existing trailers provide rather simplistic types of systems and/or mechanisms for protecting and safeguarding goods or freight with the trailer. While existing trailers may be designed for generally and specifically transporting or hauling types of freight or goods, these existing trailers make it difficult and demanding to adequately monitor and protect goods and freight with the trailer when a driver of the vehicle towing one of these trailers is parked or stationary.

To address these difficulties and problems, a driver towing an existing trailer or a third-party loading the trailer may use mechanical locking mechanisms and/or devices, such as locks and metal chains, to prevent against unauthorized opening of the doors of a trailer. While such locking mechanisms are provided in the market, the current locking mechanism used with the existing trailers may be breached and broken with simple objects and/or weapons possessed by the thief. For example, a thief may break through and breach into a trailer by simply destroying or removing a metal chain and lock that secures a door to the trailer. In addition, a driver towing an existing trailer or a third-party owner of the trailer may install security devices into the trailer to prevent against theft and unauthorized entrance to the trailer. While such devices may be used, the devices may have different operating systems and platforms causing the linking of such devices difficult and demanding. As such, the lack of adequate locking mechanisms for protecting cargo with an existing trailer leaves existing trailers exposed to theft and other unlawful break-ins for stealing good and freight.

Furthermore, many of these trailers make it difficult and demanding to allow a driver of a vehicle towing such trailers to safely maneuver and operate the trailers from loading and unloading cargo. To address these issues, a driver must include additional viewing devices, such as mirrors and devices of the like, to the driver's vehicle to adequately see the ends of the trailer. However, such addition of mirrors and viewing devices of the like require adequate space on the vehicle and/or trailer that does not impede the overall length, width, and height of the vehicle and the trailer. As such, the lack of viewing devices adequate available for a driver towing an existing trailer prevents the driver from safely maneuvering and operating an existing trailer in an adequate time when loading and unloading good and freights from the trailer.

SUMMARY OF THE INVENTION

In one aspect, an exemplary embodiment of the present disclosure may provide a trailer door system. The trailer door system includes a trailer, at least one trailer door assembly operably engaged with the trailer, and at least one driving assembly operably engaged with the trailer and the at least one trailer door assembly. The at least one driving assembly further comprises an expansion assembly operably engaged with the at least one trailer door assembly; and a rotary actuator operably engaged with the expansion assembly, wherein the rotary actuator is configured to transition the expansion assembly between a collapsed position and an expanded position for pivoting the at least one trailer door assembly between a closed position and an opened position about an axis parallel to a vertical axis defined by the trailer.

This exemplary embodiment or another exemplary embodiment may further provide at least one input device; and at least one output device operatively connected with the at least one input device via at least one electrical connection; wherein the at least one input device and the at least one output device are adapted to monitor the trailer and the at least one trailer door assembly. This exemplary embodiment or another exemplary embodiment may further provide at least one input device, wherein the at least one input device is one of a camera, a proximity sensor, a door sensor, locking device, and a geolocation device; and at least one output device operatively connected with the at least one input device via at least one electrical connection; wherein the at least one input device and the at least one output device are adapted to monitor the trailer and the at least one trailer door assembly. This exemplary embodiment or another exemplary embodiment may further provide that the at least one input device further comprises at least one camera operably engaged with the trailer exterior to a central compartment defined by the trailer, the at least one camera is adapted to record visual images during a triggering event in a first viewing plane. This exemplary embodiment or another exemplary embodiment may further provide that the at least one input device further comprises at least one proximity sensor operably engaged with the trailer, wherein the at least one proximity sensor is adapted to detect a predetermined area surrounding the trailer; and at least one door sensor operably engaged with the trailer and the at least one trailer door assembly, wherein the at least one door sensor is adapted to detect when the at least one trailer door assembly is positioned between an opened position and a closed position. This exemplary embodiment or another exemplary embodiment may further provide that the at least one input device further comprises at least one locking device operably engaged with the trailer and the at least one trailer door assembly of the trailer, wherein the at least one locking device is adapted to actuate the at least one door assembly between a locked position and an unlocked position. This exemplary embodiment or another exemplary embodiment may further provide that the at least one input device further comprises a geolocation device operably engaged with the trailer, wherein the geolocation device is adapted to share a location of the trailer via a global positioning system (GPS). This exemplary embodiment or another exemplary embodiment may further provide that the at least one driving assembly further comprises a post operably engaged with the expansion assembly and a door of the at least one trailer door assembly, wherein the post is configured to transition the door of the at least one trailer door assembly between the closed position and the opened position via the rotary actuator. This exemplary embodiment or another exemplary embodiment may further provide that the post further comprises a top end; and a shaft extending from a bottom end of the post, wherein the shaft is configured to allow the expansion assembly to rotate about the post when transition the expansion assembly between the collapsed position and the expanded position for opening and closing the at least one trailer door assembly. This exemplary embodiment or another exemplary embodiment may further provide a first axis of rotation defined by the shaft of the post; and a second axis of rotation defined by a drive shaft of the rotary actuator; wherein the first axis of rotation and the second axis of rotation are parallel to one another. This exemplary embodiment or another exemplary embodiment may further provide that the expansion assembly further comprises a first sleeve operably engaged with the post; and a second sleeve operably engaged with the rotary actuator, wherein the second sleeve is slidably disposed with the first sleeve. This exemplary embodiment or another exemplary embodiment may further provide that the first sleeve further comprises an open first end configured to receive a portion of the second sleeve; an opposing closed second end; and a receiving member operably engaged with the second end, wherein the receiving member is configured to receive the shaft of the post for rotating the expansion assembly about said shaft. This exemplary embodiment or another exemplary embodiment may further provide that the second sleeve further comprises a closed first end; an opposing open second end configured to be received by the second sleeve; and a linkage member operably engaged with the first end of the second sleeve, wherein the linkage member is configured to receive a drive shaft of the rotary actuator for rotating said expansion assembly. This exemplary embodiment or another exemplary embodiment may further provide that the at least one driving assembly further comprises a support bracket operably engaged with the trailer, wherein the support bracket is configured to support the rotary actuator orthogonal to a longitudinal axis of the trailer. This exemplary embodiment or another exemplary embodiment may further provide that the at least one driving assembly further comprises at least one mounting bracket operably engaging the post to the at least one trailer door assembly exterior to a chamber defined by the trailer. This exemplary embodiment or another exemplary embodiment may further provide that the at least one trailer door assembly further comprises a door; and at least one locking assembly operably engaged with the door, wherein the at least one locking assembly is actuated between a locked position and an unlocked position for locking and unlocking the door relative to the trailer. This exemplary embodiment or another exemplary embodiment may further provide that the at least one locking assembly further comprises at least one actuator operably engaged with one of a bolster and a bumper of the trailer, wherein the at least one actuator is configured to maintain the door between a locked position and an unlocked position. This exemplary embodiment or another exemplary embodiment may further provide that the at least one locking assembly further comprises a first actuator operably engaged with a bolster of the trailer; and a second actuator operably engaged with a bumper of the trailer; wherein the first actuator and the second actuator are configured to collectively maintain the trailer door between a locked position and an unlocked position. This exemplary embodiment or another exemplary embodiment may further provide that the at least one locking assembly further comprises: at least one lock plate operably engaged with the trailer door, wherein the lock plate operably engages with the at least one actuator for maintaining the trailer door between a locked position and an unlocked position. This exemplary embodiment or another exemplary embodiment may further provide that the at least one locking assembly further comprises a first lock plate operably engaged with a first edge of the door; wherein the first lock plate operably engages with the first actuator for maintaining the door between a locked position and an unlocked position; and an opposing second lock plate operably engaged with a second edge of the door; wherein the second lock plate operably engages with the second actuator for maintaining the door between a locked position and an unlocked position.

In another aspect, an exemplary embodiment of the present disclosure may provide a method of accessing cargo in a trailer comprising the steps of: engaging the trailer to a vehicle, wherein the trailer comprises at least one trailer door assembly operably engaged with at least one driving assembly; unlocking a trailer door of the at least one trailer door assembly via at least one locking assembly; actuating the trailer door, via a rotary actuator, from a closed position to an opened position; pivoting the trailer door, via an expansion assembly of the at least one driving assembly, from the closed position to the opened position; and providing access to the cargo inside of the trailer.

This exemplary embodiment or another exemplary embodiment may further provide steps of actuating at least one actuator of the at least one locking assembly from a locked position to an unlocked position; disengaging the at least one actuator from at least one locking plate operably engaged with the trailer door; and moving the at least one locking plate away from the trailer. This exemplary embodiment or another exemplary embodiment may further provide steps of applying a first torque, via the rotary actuator, to the expansion assembly of the at least one driving assembly; rotating a first sleeve of the expansion assembly away from the trailer; and sliding a second sleeve of the expansion assembly along the first sleeve to transition the expansion assembly from a collapsed position to an expanded position. This exemplary embodiment or another exemplary embodiment may further provide steps of applying a second torque, via the rotary actuator, to the expansion assembly of the at least one driving assembly; rotating the first sleeve of the expansion assembly towards the trailer; sliding the second sleeve of the expansion assembly along the first sleeve to transition the expansion assembly from the expanded position to the collapsed position; engaging the at least one actuator with the at least one locking plate; and actuating the at least one actuator from the unlocked position to the locked position. This exemplary embodiment or another exemplary embodiment may further provide steps of unlocking a second trailer door of a second trailer door assembly via a second locking assembly; actuating the second trailer door, via a second rotary actuator, from a closed position to an opened position; and pivoting the second trailer door, via a second expansion assembly of a second driving assembly, from the closed position to the opened position.

This exemplary embodiment or another exemplary embodiment may further provide steps of actuating at least one actuator of the at least one locking assembly from a locked position to an unlocked position; disengaging the at least one actuator from at least one lock plate operably engaged with the trailer door; and moving the at least one lock plate away from the trailer. This exemplary embodiment or another exemplary embodiment may further provide steps of applying a second torque, via the rotary actuator, to the expansion assembly of the at least one driving assembly; rotating the first sleeve of the expansion assembly towards the trailer; sliding the second sleeve of the expansion assembly along the first sleeve to transition the expansion assembly from the expanded position to the collapsed position; engaging at least one actuator of the at least one locking assembly with at least one lock plate; and actuating the at least one actuator from an unlocked position to a locked position. This exemplary embodiment or another exemplary embodiment may further provide steps of unlocking a second trailer door of a second trailer door assembly via a second locking assembly; actuating the second trailer door, via a second rotary actuator, from the closed position the an opened position; and pivoting the second trailer door, via a second expansion assembly of a second driving assembly, from the closed position to the opened position. This exemplary embodiment or another exemplary embodiment may further provide steps of monitoring the trailer and the at least one trailer door assembly with at least one input device; and monitoring the trailer and the at least one trailer door assembly with at least one output device that is operatively connected with the at least one input device via at least one electrical connection. This exemplary embodiment or another exemplary embodiment may further provide that the step of monitoring the trailer and the at least one trailer door assembly with the at least one input device further comprises: recording visual images during a triggering event in a first viewing plane, by the at least one input device, that is exterior to a central compartment defined by the trailer; wherein the at least one input device is a camera mounted to the trailer exterior to the central compartment. This exemplary embodiment or another exemplary embodiment may further provide that the step of monitoring the trailer and the at least one trailer door assembly with the at least one input device further comprises: recording visual images during the triggering event in a second viewing plane, by at least another input device, that is interior to the central compartment defined by the trailer; wherein the at least another input device is a camera mounted to the trailer interior to the central compartment, and wherein the second viewing plane is different than the first viewing plane. This exemplary embodiment or another exemplary embodiment may further provide that the step of monitoring the trailer and the at least one trailer door assembly with the at least one input device further comprises: detecting a predetermined area surrounding the trailer with a first input device of the at least one input device; and detecting when the at least one trailer door assembly is positioned between the opened position and the closed position with a first input device of the at least one input device; wherein the first input device is a proximity sensor; and wherein the second input device is a door sensor. This exemplary embodiment or another exemplary embodiment may further provide that the step of monitoring the trailer and the at least one trailer door assembly with the at least one input device further comprises: sharing a location of the trailer with the at least one input device; wherein the at least one input device is a geolocation device having a global positioning system (GPS). This exemplary embodiment or another exemplary embodiment may further provide steps of that the step of pivoting the trailer door from the closed position to the opened position further comprises: engaging a post with the expansion assembly and a door of the at least one trailer door assembly; engaging the post with the rotary actuator; rotating the post, by the rotary actuator, to transition the door from the closed position and the opened position. This exemplary embodiment or another exemplary embodiment may further provide steps of engaging a top end of the post with the door of the at least one trailer door assembly; engaging a shaft of the post with the expansion assembly, wherein the shaft is disposed at a bottom end of the post opposite to the top end; and rotating the expansion assembly about the shaft, via the rotary actuator, to transition the expansion assembly between a collapsed position and an expanded position for opening and closing the at least one trailer door assembly. This exemplary embodiment or another exemplary embodiment may further provide that the shaft defines a first axis of rotation and a drive shaft of the rotary actuator defines a second axis of rotation that is parallel to the first axis of rotation. This exemplary embodiment or another exemplary embodiment may further provide steps of engaging the post with a first sleeve of the expansion assembly; engaging the rotary actuator with a second sleeve of the expansion assembly; and engaging the first sleeve and the second sleeve with one another such that the second sleeve is slidably movable inside of the first sleeve. This exemplary embodiment or another exemplary embodiment may further provide steps of engaging a support bracket of the at least one driving assembly with the trailer; and supporting the rotary actuator from the trailer, via the support bracket, at an angle that is orthogonal to a longitudinal axis of the trailer. This exemplary embodiment or another exemplary embodiment may further provide that the step of engaging the post with the door of the at least one trailer door assembly further comprises: engaging the post with the door of the at least one trailer door assembly with at least one mounting bracket exterior to a central compartment defined by the trailer. This exemplary embodiment or another exemplary embodiment may further provide steps of engaging at least one actuator of the at least one locking assembly to a bolster of the trailer or to a bumper of the trailer inside a central compartment defined by the trailer. This exemplary embodiment or another exemplary embodiment may further provide steps of engaging a first actuator of the at least one locking assembly to a bolster of the trailer or to a bumper of the trailer inside a central compartment defined by the trailer; and engaging a second actuator of the at least one locking assembly to the bolster of the trailer or to a bumper of the trailer inside the central compartment defined by the trailer. This exemplary embodiment or another exemplary embodiment may further provide that the step of engaging the at least one actuator with the at least one lock plate further comprises: housing a portion of the at least one lock plate inside of a bolster of the trailer or a bumper of the trailer when the at least one trailer door assembly is in the closed position. This exemplary embodiment or another exemplary embodiment may further provide that the step of engaging the at least one actuator with the at least one lock plate further includes that the at least one actuator engages with the at least one lock plate inside of the bolster of the trailer or the bumper of the trailer when the at least one trailer door assembly is in the closed position.

In another aspect, and exemplary embodiment of the present disclosure may provide a trailer monitoring system. The trailer monitoring system may include at least one input device operably engaged with a trailer; and at least one output device operatively connected with the at least one input device via an electrical connection; wherein the at least one input device is configured to monitor the trailer; and wherein the at least one output device is configured to receive monitoring information from the at least one input device.

This exemplary embodiment or another exemplary embodiment may further provide the at least one input device is one of at least one camera, at least one proximity sensor, at least one door sensor, at least one locking device, and at least one geolocation device. This exemplary embodiment or another exemplary embodiment may further provide that the at least one input device further comprises at least one camera operably engaged with the trailer exterior to a central compartment defined by the trailer, wherein the at least one camera is adapted to record visual images during a triggering event in a first viewing plane. This exemplary embodiment or another exemplary embodiment may further provide that the at least one input device further comprises at least one proximity sensor operably engaged with a trailer, wherein the at least one proximity sensor is adapted to detect a predetermined area surrounding the trailer; and at least one door sensor operably engaged with the trailer and at least one trailer door assembly, wherein the at least one door sensor is adapted to detect when the at least one trailer door is positioned between an opened position and a closed position. This exemplary embodiment or another exemplary embodiment may further provide that the at least one input device further comprises at least one locking device operably engaged with the trailer and at least one trailer door assembly of the trailer, wherein the at least one locking device is adapted to actuate the at least one door assembly between a locked position and an unlocked position. This exemplary embodiment or another exemplary embodiment may further provide that the at least one input device further comprises a second camera operatively connected with the at least one output device and operably engaged the trailer; wherein the second camera is adapted to record visual images during a triggering event in a second viewing plane. This exemplary embodiment or another exemplary embodiment may further provide that the at least one camera and the second camera are oriented orthogonally to one another on the trailer. This exemplary embodiment or another exemplary embodiment may further provide that one or both of the at least one camera and second camera is adapted to show visual images when the trailer is traveling in reverse. This exemplary embodiment or another exemplary embodiment may further provide that the at least one input device further comprises an interior camera operatively connected to the at least one output device and operably engaged the trailer interior to the central chamber defined by the trailer; wherein the interior camera is adapted to record visual images inside of the central chamber upon loading or unloading of freight. This exemplary embodiment or another exemplary embodiment may further provide a radio frequency identification (RFID) tag operably engaged with the trailer; and an RFID reading device operably engaged with a vehicle, wherein the RFID reading device is adapted to detect the RFID tag of the trailer to ensure the desired trailer is connected to the vehicle. This exemplary embodiment or another exemplary embodiment may further provide that the at least one input device further comprises a geolocation device operatively connected with at least one output device and operably engaged with the trailer, wherein the geolocation device is adapted to share the location of the trailer via a global positioning system (GPS).

In another aspect, an exemplary embodiment of the present disclosure may provide a method comprising the steps of determining the trailer is available, wherein the trailer includes a trailer monitoring system; connecting the trailer to a vehicle; detecting if at least one door of the trailer is provided in an open position via at least one door sensor of the trailer monitoring system; detecting if any obstructions are surrounding the at least one door of the trailer, via at least one proximity sensor of the trailer monitoring system, prior to actuating the at least one door from the open position to a closed position; viewing a first surrounding environment of the trailer at a rear end of the trailer, via at least one camera of the trailer monitoring system, when actuating the at least one door from the open position to the closed position; actuating the at least one door from the open position to the closed position for loading freight into the trailer, and locking the at least one door, via at least one locking member of the trailer monitoring system, to the trailer.

This exemplary embodiment or another exemplary embodiment may further provide steps of marking a geolocation on the trailer at a distinct location at a first facility; notifying a driver of the vehicle the distinct location of the trailer at the first facility; and indicating the distinct location of the trailer at the first facility, via at least one illumination device, for assisting the driver of the vehicle. This exemplary embodiment or another exemplary embodiment may further provide steps of scanning an RFID tag of the trailer monitoring system on the trailer via a RFID scanning device on the vehicle; and relaying trailer information to driver of the vehicle via the information provided with the RFID tag. This exemplary embodiment or another exemplary embodiment may further provide a step of notifying the driver, via an on-board display option or remote display option, when at least one door of the trailer is provided in the open position when traveling over a predetermined speed. This exemplary embodiment or another exemplary embodiment may further provide a step of viewing a central chamber defined by a trailer, via at least one interior camera, when loading freight into said central compartment. This exemplary embodiment or another exemplary embodiment may further provide a step of viewing a second surrounding environment of the trailer at the rear end of the trailer, via at least one camera, when a triggering event occurs on the trailer. This exemplary embodiment or another exemplary embodiment may further provide steps of viewing a second surrounding environment of the trailer at the rear end of the trailer, via a second camera of the trailer monitoring system, when the triggering event occurs on the trailer, wherein the second camera is position orthogonal to the at least one camera; and recording the triggering event on the trailer. This exemplary embodiment or another exemplary embodiment may further provide a step of viewing a central chamber defined by a trailer, via at least one interior camera, when the triggering event occurs on the trailer. This exemplary embodiment or another exemplary embodiment may further provide a step of viewing a central chamber defined by a trailer, via at least one interior camera, when loading freight into the trailer. This exemplary embodiment or another exemplary embodiment may further provide steps of activating the at least one camera from an OFF state to an ON state when the vehicle and trailer are moving in a rearward direction; viewing the surrounding environment of the trailer at a rear end of the trailer via the at least one camera; detecting if any obstructions are surrounding the at least one door of the trailer via the at least one proximity sensor; locking brakes of the trailer; actuating the at least one door from the open position to a closed position for unloading the freight from the trailer. This exemplary embodiment or another exemplary embodiment may further provide that the step of locking the at least one door, via at least one locking member of the trailer monitoring system, to the trailer further includes that the at least one door is manually locked by a driver of the vehicle. This exemplary embodiment or another exemplary embodiment may further provide that the step of locking the at least one door, via at least one locking member of the trailer monitoring system, to the trailer further includes that the at least one door is manually locked by a driver of the vehicle.

BRIEF DESCRIPTION OF THE DRAWINGS

Sample embodiments of the present disclosure are set forth in the following description, are shown in the drawings and are particularly and distinctly pointed out and set forth in the appended claims.

FIG. 14 (FIG. 14) is an exemplary method flowchart for accessing cargo of a trailer.

Similar numbers refer to similar parts throughout the drawings.

DETAILED DESCRIPTION

Figure 1:
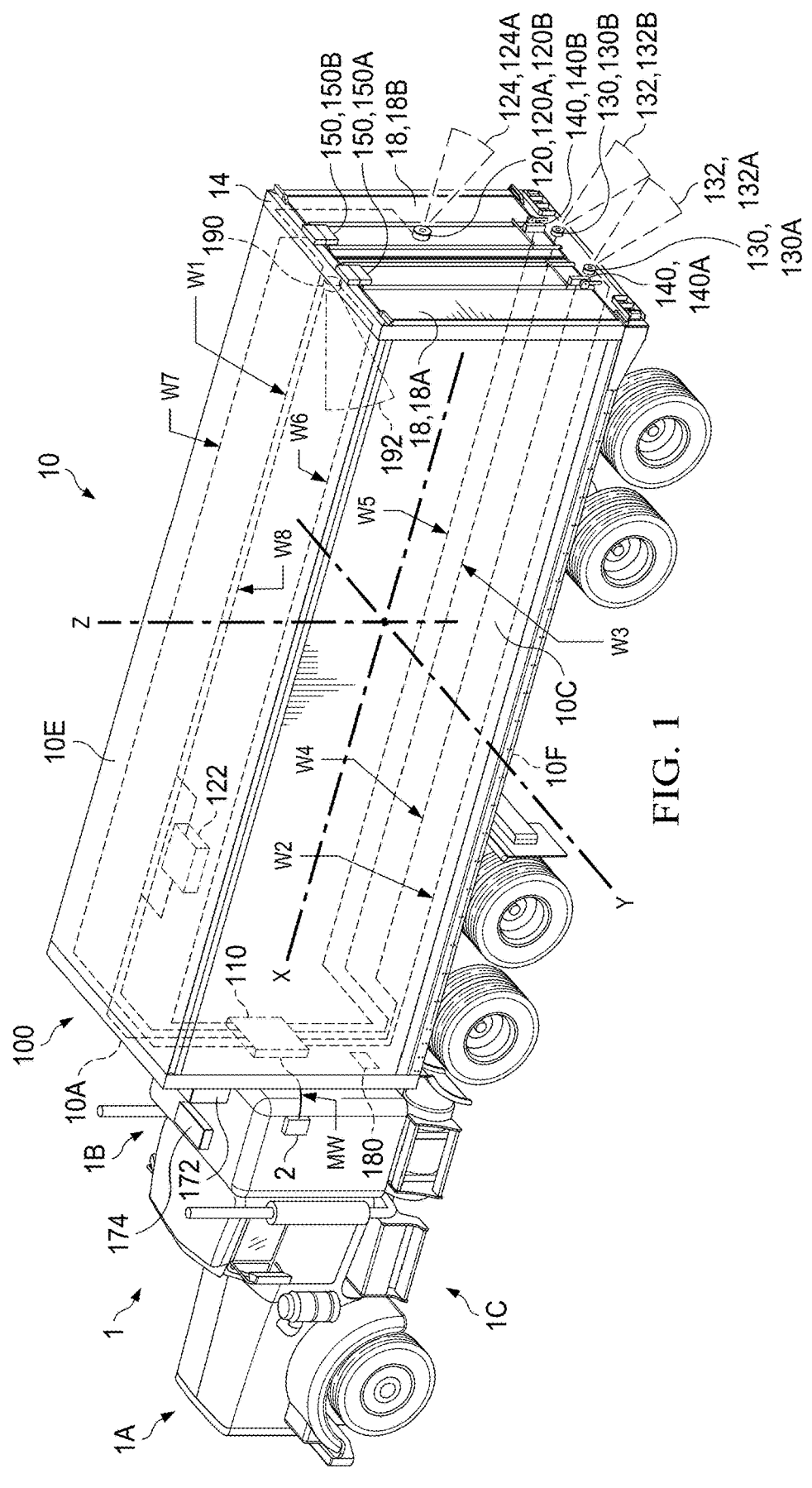
FIG. 1 (FIG. 1) is a top, rear, left side isometric perspective view of a trailer monitoring system operably engaged to a trailer and a vehicle; wherein the trailer monitoring system is illustrated in a schematic view.

FIG. 1 illustrates a vehicle, which is generally indicated by the reference number 1. It will be understood that the illustrated vehicle 1 is exemplary only and any type of vehicle is contemplated to be represented by the illustrated device. Such vehicles considered suitable herein include motorcycles, all-terrain vehicles, cars, sport utility vehicles (SUV), pickup trucks, vans, recreational vehicles, commercial trucks, semi-trucks, and other similar vehicles for the purpose of towing. In the illustrated embodiment, the vehicle 1 is depicted as a semi-truck.

As illustrated in FIG. 1, the vehicle 1 has a front end 1A, a rear end 1B that opposes the front end 1A, a first side 1C, and a second side 1D that opposes the first side 1C. The vehicle 1 also includes a towing hitch or a fifth-wheel hitch that is disposed at the rear end 1B of the vehicle 1 for operably engaging a trailer to the vehicle 1. The vehicle 1 also includes a towing electrical connector 2 that is disposed at the rear end 1B of the vehicle 1 and proximate to the towing hitch. The towing electrical connector 2 may electrically connect any associated electrical components of an attached trailer to the vehicle 1 for towing capabilities. In addition, the towing electrical connector 2 may also provide power to the associated electrical components on the attached trailer and communication of the associated electrical components between the trailer and the vehicle 1.

Still referring to FIG. 1, the vehicle 1 is mechanically connected to a trailer 10, which is generally indicated by the reference number 10. It will be understood that the illustrated trailer 10 is exemplary only and any type of trailer is contemplated to be represented by the illustrated device. Such trailers considered suitable herein include boat trailers, car-hauler trailers, enclosed trailers, flatbed trailers, gooseneck trailers, dump trailers, horse trailers, livestock trailers, tilt trailer, travel/camper trailers, utility trailers, and other similar trailers for the purpose of being towed. In the illustrated embodiment, the trailer 10 is depicted as a full-enclosed semi-trailer, more particularly a dry van semi-trailer.

As illustrated in FIG. 1, the trailer 10 may have a front wall 10A, directed towards the rear end 1B of the vehicle 1, an opposing rear wall 10B that faces away from the vehicle 1, and a longitudinal direction defined therebetween where the vehicle 1 and the trailer 10 travel forwardly and backwardly along the longitudinal direction. The trailer 10 may also have a first lateral wall or left wall 10C, an opposing second lateral wall or right wall 10D, and a transverse direction defined therebetween where the vehicle 1 and the trailer 10 travel laterally (i.e., turning left and/or right) along the transverse direction. The trailer 10 may also have a top wall 10E, an opposing bottom wall 10F, and a vertical direction defined therebetween. The trailer 10 may also define a longitudinal axis "X" between the front and rear walls 10A, 10B, a transverse axis "Y" between the first and second lateral walls 10C, 10D, and a vertical axis "Z" between the top and bottom walls 10E, 10F.

Still referring to FIG. 1, the front wall 10A, the rear wall 10B, the first and second lateral walls 10C, 10D, the top wall 10E, and the bottom wall 10F may collectively define a central chamber 11. The central chamber 11 may be accessible by a rear opening 12 defined by the rear wall 10B. The central chamber 11 may be adapted to hold and store freight and goods at certain parameters (e.g., temperature, pressure, etc.). Referring to FIGS. 1-2C, the trailer 10 includes a bolster 14. The bolster 14 is operably engaged to the top wall 10E of the trailer 10. The trailer 10 also includes a bumper 16. The bumper 16 is operably engaged to the bottom wall 10F of the trailer 10 and is posited opposite to the bolster 14 relative to the vertical axis "Z" of the trailer 10.

Still referring to FIGS. 1-2C, the trailer 10 also includes at least one door assembly 18 to provide access to the central chamber 11 of the trailer 10. The at least one door assembly 18 may be also operably engaged to the bolster 14 and/or the bumper 16 of the trailer 10. In the illustrated embodiment, the at least one door assembly 18 includes a first door assembly 18A and an opposing second door assembly 18B. In the illustrated embodiment, each of the first door assembly 18A and the second door assembly 18B is a vertical pivoting and sliding trailer door assembly operably engaged to the trailer 10. While each of the first door assembly 18A and the second door assembly 18B is a vertical pivoting and sliding trailer door assembly operably engaged to the trailer 10, any suitable door assembly may be included on the trailer 10 for providing access to the central chamber 11 of the trailer 10. In one exemplary embodiment, at least one door assembly may be a vertical hinging trailer door included on a trailer for providing access to a central chamber of the trailer. In another exemplary embodiment, at least one door assembly may be a roll-up trailer door included on a trailer for providing access to a central chamber of the trailer.

In the illustrated embodiment, the at least one door assembly 18 may manually transition between an opened position and a closed position via a force exerted by the driver on the at least one door assembly 18. In other exemplary embodiments, the at least one door assembly 18 may transition between the opened position and a closed position through different types of force. In one exemplary embodiment, at least one door assembly on a trailer may include a driving assembly to automatically transition the at least one door assembly between an opened position and a closed position. The driving assembly in the exemplary embodiment may be powered by the vehicle, the trailer, or an external power source independent of the vehicle and the trailer.

Referring now to FIG. 1, the trailer 10 has a trailer monitoring system 100 that is operable to provide numerous advantageous over conventional trailers. In one instance, the trailer monitoring system 100 of the trailer 10 is operable to provide drivers of vehicles 1 with an ease of locating the trailers between specific drop locations, which is described in more detail below. In another instance, the trailer monitoring system 100 of the trailer 10 is operably to provide drivers of vehicles 1 with the ease of transporting and maneuvering the trailer 10 between drop locations, which is also described in more detail below. In yet another instance, the trailer monitoring system 100 is also operable to provide security if a security breach of the trailer 10 occurs when the trailer 10 is stationary or parked with the vehicle 1 or at a specific drop location, which is also described in more detail below.

The trailer monitoring system 100 may be electrically connected to a power supply provided on the trailer 10 or electrically connected to the power supply of the vehicle 1. Referring to FIG. 1, the trailer monitoring system 100 is electrically connected to the power supply of the vehicle 1 via a main wiring harness "MW" electrically connecting associated electrical components of the trailer 10 and associated electrical components of the trailer monitoring system 100 to the vehicle 1. Such electrical connection between the vehicle 1 and the trailer monitoring system 100 may allow the driver of the vehicle 1 to operably control specific features and devices associated with the trailer monitoring system 100 on the trailer. In other exemplary embodiments, the trailer monitoring system 100 may be powered and controlled in various configurations. In one exemplary embodiment, a trailer monitoring system may be operably powered by an energy storage device independent of a vehicle and a trailer. In another exemplary embodiment, each associated device of a trailer monitoring system may be independently powered by an energy storage device where each associated devices of the trailer monitoring system is remotely controlled.

Referring to FIG. 1, the trailer monitoring system 100 may include at least one output device or controller 110. The controller 110 may be operable for logically controlling the associated devices of the trailer monitoring system 100 electrically connected to the controller 110. As such, the controller 110 described and illustrated herein may be any suitable computer readable storage medium or multiple computer readable storage media that is operable for logically controlling the associated devices electrically connected to said controller 110. In other exemplary embodiments, the controller 110 of the trailer monitoring system 100 may be any suitable device for logically controlling any and all devices operably connected to the controller in the trailer monitoring system 100. Examples of suitable controllers for a trailer monitoring system may include a programmable logic controller (PLC), a field programmable device (FPD), a programmable logic device (PLD), a field programmable gate array (FPGA), a microcontroller, or other devices of the like suitable for logically controlling associated devices in the trailer monitoring system.

Still referring to FIG. 1, the controller 110 may be operably engaged to any wall and/or part of the trailer 10. As illustrated in FIG. 1, the controller 110 is operably engaged to the front wall 10A of the trailer 10 interior to the central chamber 11 of the trailer 10. In addition, the controller 110 may be operably engaged to the vehicle 1 via a main wiring harness "MW" that may electrically connect the trailer monitoring system 100 with the vehicle 1. The electrical connection between the trailer monitoring system 100 and the vehicle 1 may allow the trailer monitoring system 100 to be powered via the vehicle 1. In addition, the electrical connection between the trailer monitoring system 100 and the vehicle 1 may also allow the driver of the vehicle 1 to monitor and control the associated devices of the trailer monitoring system 100 through an application program interface (or API hereinafter) (not illustrated) operably engaged with the controller 110.

The API operably engaged to the controller 110 may be any suitable device that allows the driver of the vehicle 1 to monitor and control associated devices of the trailer monitoring system 100. In one exemplary embodiment, an API device that is operably engaged to a trailer monitoring system may be positioned with a vehicle towing a trailer that includes said trailer monitoring system. In another exemplary embodiment, an API device that is operably engaged to a trailer monitoring system may be a device remote from a vehicle towing a trailer that includes said trailer monitoring system. In this exemplary embodiment, the API device may be a mobile application or smartphone application provided on a mobile device or smartphone that allows users, such as the driver of the vehicle and dispatchers of these trailers, to view and locate the trailer between deliveries.

Still referring to FIG. 1, the trailer monitoring system 100 may include at least one input device operatively connected with the at least one output device via an electrical connection. As illustrated in FIG. 1, the at least one input device of the trailer monitoring device may include at least one camera 120 that may be electrically connected to a digital video recorder 122 (or "DVR" hereinafter). The at least one camera 120 and the DVR 122 may be positioned along any portion or member of the trailer 10. In the illustrated embodiment, the at least one camera 120 is operably engaged to second door assembly 18B and is positioned exterior to the central chamber 11 of the trailer 10. The DVR 122 is positioned on the top wall 10E of the trailer 10 and is positioned interior to the central chamber 11 of the trailer 10.

The at least one camera 120 may include a first camera 120A and a second camera 120B operably engaged to second door assembly 18B. As illustrated in FIGS. 1-2C, the first camera 120A may be directed rearwardly from the trailer 10 where the first camera 120A has a first viewing plane 124A. The first viewing plane 124A of the first camera 120A may generally extend in a direction with the longitudinal axis "X" of the trailer 10. As illustrated in FIGS. 2B-2C, the second camera 120B may be directed inwardly from the trailer 10 where the second camera 120B has a second viewing plane 124B. The second viewing plane 124B of the second camera 120B may generally extend in a direction with the transverse axis "Y" of the trailer 10. In the illustrated embodiment, the second viewing plane 124B of the second camera 120B may be orthogonal to the first viewing plane 124A of the first camera 120A relative to the longitudinal axis of the second door assembly 18B. In addition, the first and second viewing planes 124A, 124B of the first and second cameras 120A, 120B illustrated herein must be understood that such viewing planes 124A, 124B are diagrammatic only and may have viewing planes less than or greater than the viewing planes illustrated herein.

The orientation of the first viewing plane 124A and the second viewing plane 124B is configured advantageous at least because the first camera 120A and the second camera 120B are able to capture and record (via the DVR 122) different perspectives of the trailer 10 that surround the rearward end of the trailer 10. As such, the first camera 120A is able to capture a first perspective that is directed away from the rear wall 10B of the trailer 10 while the second camera 120B is able to capture a second, different perspective that is directed towards the rear opening 12 of the trailer 10. Such capturing of different perspectives may be useful in various situations, such as assisting driver when maneuvering the trailer 10 with the vehicle 1, surveying for potential obstructions that may interfere with one or both of the first and second door assemblies 18A, 18B, or surveilling the trailer 10 upon a security breach of the trailer 10 when one or both of the door assemblies 18A, 18B are opened.

Still referring to FIG. 1, the at least one camera 120 may be electrically connected to the controller 110 via a first wire or electrical connection "W1." The first wire "W1" that electrically connects the at least one camera 120 to the controller 110 may provide power to the at least one camera 120 via the vehicle 1, the trailer 10, or other suitable power supplies that may be operably engaged to the controller 110. In addition, the first wire "W1" that electrically connects the at least one camera 120 to the controller 110 may allow the controller 110 to activate and/or control the at least one camera 120 between an ON state and an OFF state based on triggering events (e.g., activated by a driver's input, activated by the vehicle's inputs, activated by a remote user or facility, activated by another sensor and/or device within the trailer monitoring system 100, etc.). Such triggering events for activating the at least one camera 120 between an ON state and an OFF state is described in more detail below.

As described previously, the at least one camera 120 may include the first camera 120A and the second camera 120B. The first camera 120A and the second camera 120B may be structurally configured and arranged with the trailer 10 in any suitable manner. In one instance, the first camera 120A and the second camera 120B may be single, unitary device that may be operably engaged with the trailer 10 (see FIGS. 1-2C). As illustrated in FIG. 1, a single wire (i.e., first wire "W1") may electrically connect both the first camera 120A and the second camera 120B to the controller 110 for powering and activating each of the first camera 120A and the second camera 120B. In another instance, the first camera 120A and the second camera 120B may be separate, independent devices that may be operably engaged with the trailer 10 such that the first camera 120A and the second camera 120B are independently electrically connected to the controller 110 (i.e., electrically connected to the controller 110 via independent wires and/or electrical connections).

Figure 2A:
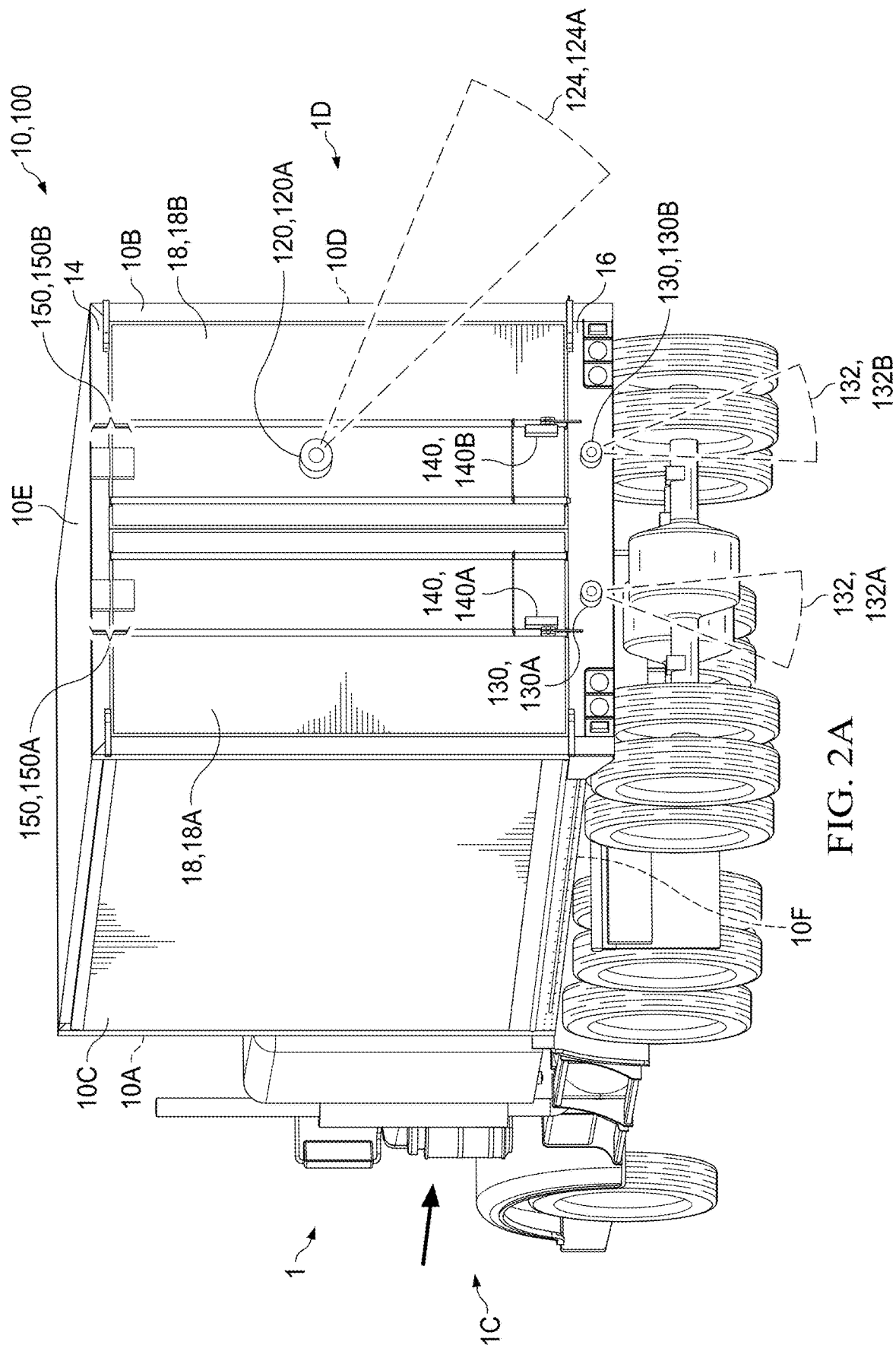
FIG. 2A (FIG. 2A) is a top, rear, left side isometric perspective view of the trailer monitoring system operably engaged to the trailer and the vehicle shown in FIG. 1, wherein the vehicle and the trailer are moving in a rear direction and at least one camera and first and second proximity sensors of the trailer monitoring system are activated.
Figure 2B:
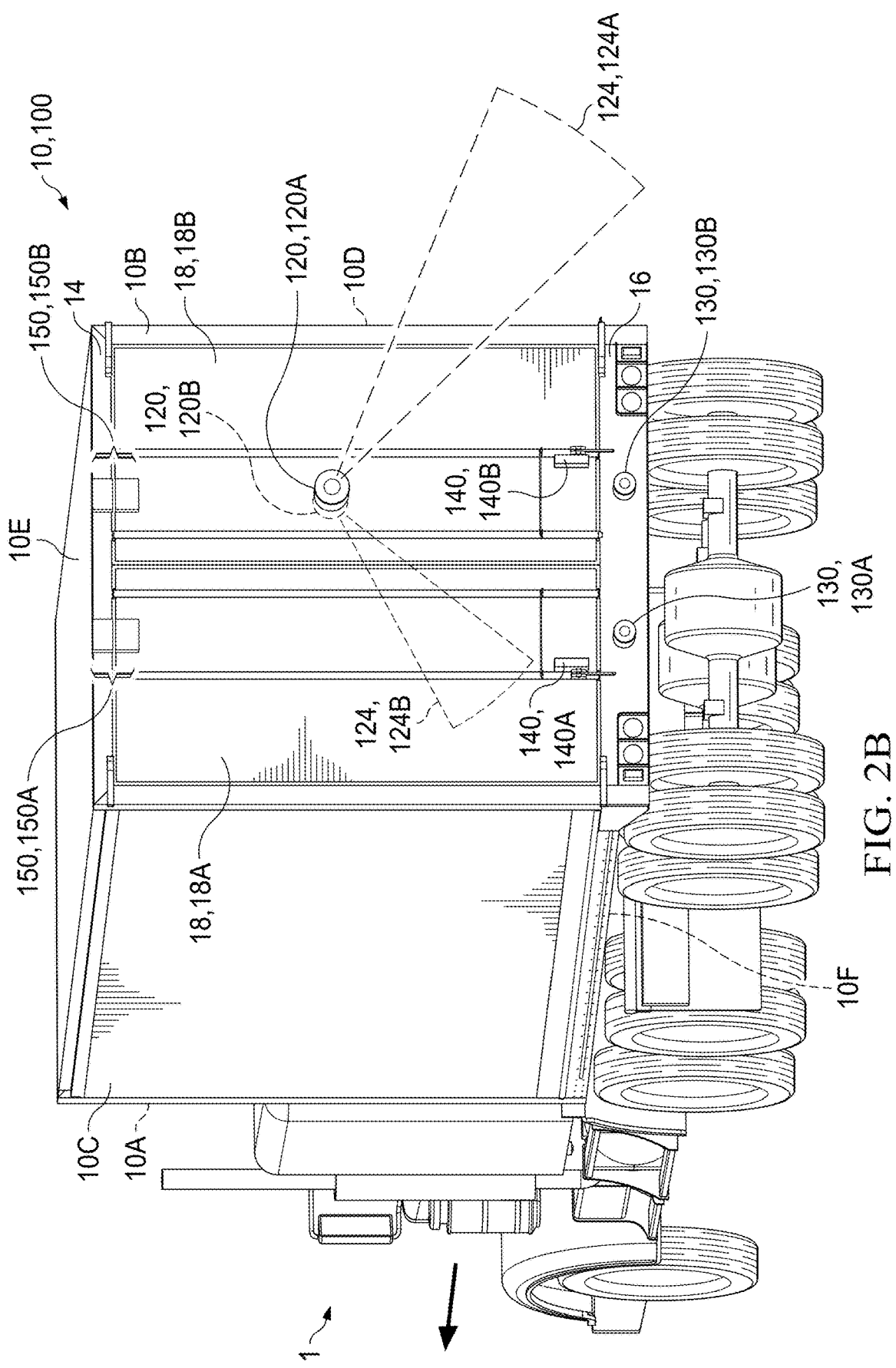
FIG. 2B (FIG. 2B) is a top, rear, left side isometric perspective view of the trailer monitoring system operably engaged to the trailer and the vehicle shown in FIG. 1, wherein the vehicle and the trailer are moving in a forward direction and a first camera and a second camera of the trailer monitoring system are activated.
Figure 2C:
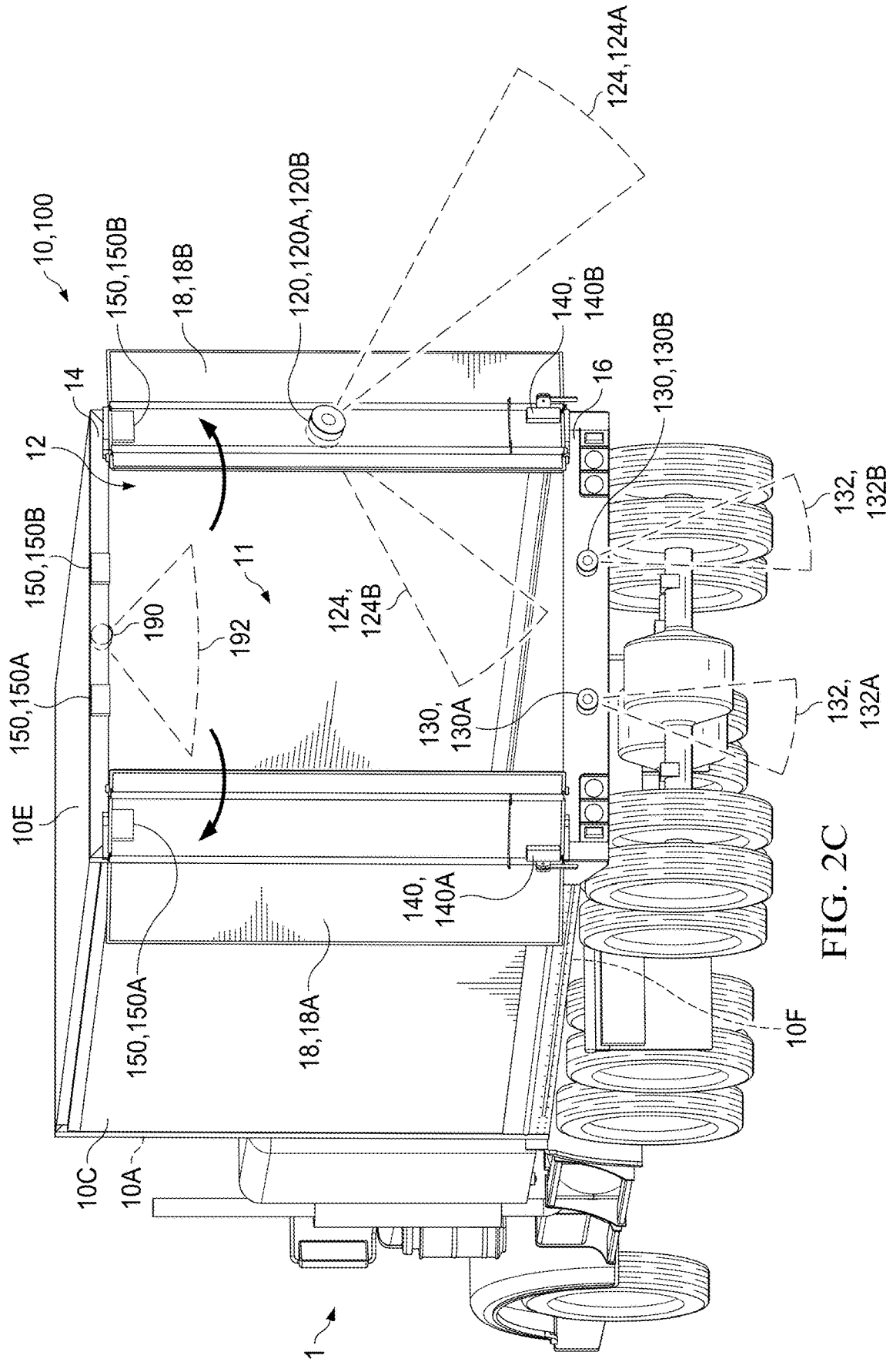
FIG. 2C (FIG. 2C) is a top, rear, left side isometric perspective view of the trailer monitoring system operably engaged to the trailer and the vehicle shown in FIG. 1, wherein at least one door assembly of the trailer are opening and a first camera, a second camera, a first proximity sensor, and a second proximity sensor of the trailer monitoring system are activated.

The first camera 120A and the second camera 120B may be also be activated separately and/or independently from one another by the controller 110 (see FIGS. 1-2C). In one instance, the first camera 120A may be activated and the second camera 120B may remain deactivated when the vehicle 1 and the trailer 10 are collectively traveling in a reverse direction for a desired purpose (e.g., parking the trailer 10 into a designated loading dock at a loading facility) (see FIG. 2A). In another instance, the first camera 120A and the second camera 120B may be collectively activated when activated by the driver during a towing operation (see FIG. 2B) or when one or both of the first door assembly 18A and second door assembly 18B is opened manually or automatically (see FIG. 2C). When one or both of the first camera 120A and the second camera 120B are activated, each of the first camera 120A and the second camera 120B may record visual images to the DVR 122 via each of the first viewing plane 124A and the second viewing plane 124B. During activation, the visual images recorded by one or both the first camera 120A and the second camera 120B may be viewed in real-time, via the API, or viewed at a delayed-time, via the DVR 122.

While the at least one camera 120 may be operably engaged to one of the first door assembly 18A and the second door assembly 18B, at least one camera may be operably engaged to any suitable portion of a trailer. In one exemplary embodiment, at least one camera may be operably engaged to a bolster of a trailer. In another exemplary embodiment, at least one camera may be operably engaged to a bumper of a trailer. In another exemplary embodiment, at least one camera may be positioned along any suitable portion of a trailer for viewing different perspectives of the trailer during a towing operation. Moreover, while the at least one camera 120 of the trailer monitoring system 100 may have a first camera 120A and a second camera 120B, any suitable number of cameras may be included in a trailer monitoring system. Examples of a suitable number of camera that may be included in a trailer monitoring system includes one, at least one, two, plurality, three, four, and other any suitable number of cameras based on a particular application.

Referring now to FIGS. 1-2C, the at least one input device of the trailer monitoring device 100 may include at least one proximity sensor 130 that is provided on the trailer 10. The at least one proximity sensor 130 may be positioned along any portion or member of the trailer 10. In the illustrated embodiment, the at least one proximity sensor 130 is operably engaged to bumper 16 of the trailer 10 and is positioned exterior to the central chamber 11 of the trailer 10. In addition, the at least one proximity sensor 130 may include a first proximity sensor 130A and a second proximity sensor 130B operably engaged to the bumper 16. As illustrated in FIGS. 1-2C, the first proximity sensor 130A may be directed rearwardly from the trailer 10 where the first proximity sensor 130A has a first detection plane 132A. The first detection plane 132A of the first proximity sensor 130A may generally extend in a direction with the longitudinal axis "X" of the trailer 10. As illustrated in FIGS. 2B-2C, the second proximity sensor 130B may be also directed rearwardly from the trailer 10 where the second proximity sensor 130B has a second detection plane 132B. The second detection plane 132B of the second proximity sensor 130B may also generally extend in a direction with the longitudinal axis "X" of the trailer 10. In the illustrated embodiment, the second detection plane 132B of the second proximity sensor 130B may be substantially parallel with the first detection plane 132A of the first proximity sensor 130A relative to the transverse axis "Y" of the trailer 10. In the illustrated embodiment, the first detection plane 132A of the first proximity sensor 130A is also adjacent to the second detection plane 132B of the second proximity sensor 130B relative to the transverse axis "Y" of the trailer 10. In addition, the first and second detection planes 132A, 132B of the first and second proximity sensors 130A, 130B illustrated herein must be understood that such detection planes 132A, 132B are diagrammatic only and may have viewing planes less than or greater than the detection planes illustrated herein.

The orientation of the first detection plane 132A and the second detection plane 132B is configured advantageous at least because the first proximity sensor 130A and the second proximity sensor 130B are able to detect different areas that surround the rearward end of the trailer 10. As such, the first proximity sensor 130A is able to capture a first area that is directed away from the rear wall 10B of the trailer 10 while the second proximity sensor 130B is able to capture a second, adjacent area that is directed towards the rear opening 12 of the trailer 10. Such capturing of different perspectives may be useful in various situations, such as assisting driver when maneuvering the trailer 10 with the vehicle 1, surveying for potential obstructions that may interfere with one or both of the first and second door assemblies 18A, 18B, or surveilling the trailer 10 upon a security breach of the trailer 10 when one or both of the door assemblies 18A, 18B are opened.

Referring to FIG. 1, the at least one proximity sensor 130 may be electrically connected to the controller 110 via at least one wire or at least one electrical connection. In the illustrated embodiment, a second wire "W2" of the trailer monitoring system 100 may electrically connect the first proximity sensor 130A to the controller 110 to provide power to the first proximity sensor 130A via the vehicle 1, the trailer 10, or other suitable power supplies that may be operably engaged to the controller 110. A third wire "W3" of the trailer monitoring system 100 may also electrically connect the second proximity sensor 130B to the controller 110 to provide power to the second proximity sensor 130B via the vehicle 1, the trailer 10, or other suitable power supplies that may be operably engaged to the controller 110. In addition, the second wire "W2" and third wire "W3" that electrically connects the first proximity sensor 130A and the second proximity sensor 130B to the controller 110 may allow the controller 110 to activate and/or control the first proximity sensor 130A and the second proximity sensor 130B between an ON state and an OFF state based on triggering events (e.g., activated by a driver's input, activated by the vehicle's inputs, activated by another sensor and/or device within the trailer monitoring system 100, etc.). Such triggering events for activating the first proximity sensor 130A and the second proximity sensor 130B between an ON state and an OFF state is described in more detail below.

The first proximity sensor 130A and the second proximity sensor 130B may be also be activated separately and/or independently from one another by the controller 110 (see FIGS. 1-2C). In one instance, the first proximity sensor 130A may be activated and the second proximity sensor 130B may remain deactivated. In another instance, the first proximity sensor 130A and the second proximity sensor 130B may be collectively activated when the vehicle 1 and the trailer 10 are collectively traveling in a reverse direction for a desired purpose (e.g., parking the trailer 10 into a designated loading dock at a facility) (see FIG. 2A). In another instance, the first proximity sensor 130A and the second proximity sensor 130B may be collectively activated when activated by the driver during a towing operation (see FIG. 2B) or when one or both of the first door assembly 18A and second door assembly 18B are opened manually or automatically (see FIG. 2C). When one or both of the first proximity sensor 130A and the second proximity sensor 130B are activated, each of the first proximity sensor 130A and the second proximity sensor 130B may be used in conjunction with any associated devices of the trailer monitoring system 100, including at least one camera 120.

While the at least one proximity sensor 130 may be operably engaged to the bumper 16 of the trailer 10, at least one proximity switch may be operably engaged to any suitable portion of a trailer. In one exemplary embodiment, at least one proximity switch may be operably engaged to a bolster of a trailer. In another exemplary embodiment, at least one proximity sensor may be operably engaged to a door assembly of a trailer. In another exemplary embodiment, at least one proximity switch may be operably engaged to each lateral wall of a trailer for detecting obstructions and/or hazards on either side of the trailer. In another exemplary embodiment, at least one proximity switch may be operably engaged to a front wall of a trailer for detecting distance between the trailer and the vehicle prior to the vehicle operably connecting to said trailer.

While the at least one proximity sensor 130 of the trailer monitoring system 100 may have a first proximity sensor 130A and a second proximity sensor 130B, any suitable number of proximity sensors may be included in a trailer monitoring system. Examples of a suitable number of proximity sensors that may be included in a trailer monitoring system includes one, at least one, two, plurality, three, four, and other any suitable number of proximity sensors based on a particular application.

Referring now to FIGS. 1-2C, the at least one input device of the trailer monitoring system 100 may include at least one locking device 140 that is operably engaged with at least one door assembly 18 the trailer 10. The at least one locking device 140 may be positioned along any portion or member of the trailer 10 while still be able to provide the at least one door assembly 18 in the locked position (see FIGS. 2A and 2B) or in the unlocked position (see FIG. 2C). In the illustrated embodiment, the at least one locking device 140 may include a first locking device 140A that may be operably engaged to the first door assembly 18A. The first locking device 140A is operable to maintain the first door assembly 18A between a locked, closed position (FIGS. 1-2B) and in an unlocked, opened position (FIG. 2C). In addition, the at least one locking device 140 may also include a second locking device 140B that may be operably engaged to the second door assembly 18B. The second locking device 140B is operable to maintain the second door assembly 18B between a locked position (FIGS. 1-2B) and in an unlocked position (FIG. 2C). In addition, the placement of the first and second locking devices 140A, 140B illustrated herein must be understood that such placement of said first and second locking devices 140A, 140B is diagrammatic only and may be operably engaged to the first and second door assemblies 18A, 18B in different configuration as compared to illustrated herein.

Referring to FIG. 1, the at least one locking device 140 may be electrically connected to the controller 110 via at least one wire or at least one electrical connection. In the illustrated embodiment, a fourth wire "W4" of the trailer monitoring system 100 may electrically connect the first locking device 140A to the controller 110 to provide power to the first locking device 140A via the vehicle 1, the trailer 10, or other suitable power supplies that may be operably engaged to the controller 110. A fifth wire "W5" of the trailer monitoring system 100 may also electrically connect the second locking device 140B to the controller 110 to provide power to the second locking device 140B via the vehicle 1, the trailer 10, or other suitable power supplies that may be operably engaged to the controller 110. In addition, the fourth wire "W4" and fifth wire "W5" that electrically connects the first locking device 140A and the second locking device 140B to the controller 110 may allow the controller 110 to activate and/or control the first locking device 140A and the second locking device 140B between a locked position and an unlocked position based on triggering events (e.g., activated by a driver's input, activated by the vehicle's inputs, activated by a remote user or facility, activated by another sensor and/or device within the trailer monitoring system 100, etc.). Such triggering events for activating the first locking device 140A and the second locking device 140B between the locked position and the unlocked position is described in more detail below.

The first locking device 140A and the second locking device 140B may also be activated separately and/or independently from one another by the controller 110 (see FIGS. 1-2C). In one instance, the first locking device 140A may be activated and the second locking device 140B may remain deactivated (and vice versa) when only one of the first door assembly 18A and the second door assembly 18B is unlocked and opened. In another instance, the first locking device 140A and the second locking device 140B may be collectively activated when the first door assembly 18A and second door assembly 18B are to be opened manually by the driver or automatically by the driving assembly via the controller 110 (see FIG. 2C). When one or both of the first locking device 140A and the second locking device 140B are activated, each of the first locking device 140A and the second locking device 140B may be used in conjunction with any associated devices of the trailer monitoring system 100, including at least one camera 120 and at least one proximity sensor 130.

While the at least one locking device 140 may be operably engaged to at least one of door assembly 18 of the trailer 10 exterior to the central chamber 11, at least one locking device may be operably engaged to any suitable portion of a trailer. In one exemplary embodiment, at least one locking device may be operably engaged to a bolster of a trailer exterior to a central chamber of the trailer for maintaining at least one door assembly between a locked position and an unlocked position. In another exemplary embodiment, at least one locking device may be operably engaged to each door assembly of a trailer exterior to a central chamber of the trailer for maintaining at least one door assembly between a locked position and an unlocked position. In another exemplary embodiment, at least one locking device may be positioned interior to a central chamber of a trailer.

While the at least one locking device 140 of the trailer monitoring system 100 may have a first locking device 140A and a second locking device 140B, any suitable number of locking devices may be included in a trailer monitoring system. Examples of a suitable number of locking devices that may be included in a trailer monitoring system includes one, at least one, two, plurality, three, four, and other any suitable number of locking devices based on a particular application.

Referring now to FIGS. 1-2C, the at least one input device of the trailer monitoring system 100 may include at least one door sensor 150 that is operably engaged with at least one door assembly 18 the trailer 10. The at least one door sensor 150 may be positioned along any portion or member of the trailer 10 while still be able to detect whether the at least one door assembly 18 is provided in the open position (see FIG. 2C) or in the closed position (see FIG. 2A). In the illustrated embodiment, the at least one door sensor 150 may include a first door sensor 150A that may be operably engaged to the first door assembly 18A. The first door sensor 150A is operable to detect whether the first door assembly 18A is provided in a closed position (FIGS. 1-2B) or provided in an opened position (FIG. 2C). In addition, the at least one door sensor 150 may include a second door sensor 150B that may be operably engaged to the second door assembly 18B. The second door sensor 150B is operable to detect whether the second door assembly 18B is provided in a closed position (FIGS. 1-2B) or provided in an opened position (FIG. 2C). In addition, the placement of the first and second door sensors 150A, 150B illustrated herein must be understood that such placement of said first and second door sensors 150A, 150B is diagrammatic only and may be operably engaged to the first and second door assemblies 18A, 18B in different configuration as compared to illustrated herein.

Referring to FIG. 1, the at least one door sensor 150 may be electrically connected to the controller 110 via at least one wire or at least one electrical connection. In the illustrated embodiment, a sixth wire "W6" of the trailer monitoring system 100 may electrically connect the first door sensor 150A to the controller 110 to provide power to the first door sensor 150A via the vehicle 1, the trailer 10, or other suitable power supplies that may be operably engaged to the controller 110. A seventh wire "W7" of the trailer monitoring system 100 may also electrically connect the second door sensor 150B to the controller 110 to provide power to the second door sensor 150B via the vehicle 1, the trailer 10, or other suitable power supplies that may be operably engaged to the controller 110. In addition, the sixth wire "W6" and seventh wire "W7" that electrically connects the first door sensor 150A and the second door sensor 150B to the controller 110 may allow the controller 110 to receive information and/or data collected by the first door sensor 150A and the second door sensor 150B when either the first door sensor 150A and the second door sensor 150B detects that the first door assembly 18A or the second door assembly 18B is provided in the open position or the closed position. Such information collected by the first door sensor 150A and the second door sensor 150B may be relayed to the driver of the vehicle 1 or a dispatcher of the trailer 10 in various ways. In one exemplary embodiment, an on-board API device may relay information of the change in position of at least one door assembly of the vehicle to a driver of the vehicle or a dispatcher of the trailer. In another exemplary embodiment, a remote device (e.g., a mobile device or smartphone) may relay the change in position of at least one door assembly of the vehicle to a driver of the vehicle or a dispatcher of the trailer.

In operation, one or both of the first door sensor 150A and second door sensor 150B may cause the at least one camera 120 to be activated when one or both of the first door assembly 18A and the second door assembly 18B transition from the closed position to the opened position. If one or both of the door assemblies 18 are provided in the opened position, one or both of the first door sensor 150A and second door sensor 150B may send a signal to the controller 110 that one or both of the door assemblies 18 are provided in the opened position. Upon receiving this signal, the controller 110 may activate one or both of the first camera 120A and second camera 120B to capture any visual images for a set amount of time (also recorded on the DVR 122). In one exemplary embodiment, one or both of first and second cameras may be activated to capture any visual images up to about one hour after being activated by a controller. Once one or both of the door assemblies 18 is provided in the closed position, via detection by one or both of the first and second door sensors 150A, 150B, one or both of the first and second cameras 120A, 120B may be deactivated by the controller 110

Referring now to FIG. 1, the at least one input device of the trailer monitoring system 100 may include a geolocation device 160. In the illustrated embodiment, the geolocation device 160 is operably engaged with the controller 110 where the geolocation device 160 may be housed inside of the controller 110. In other exemplary embodiments, the geolocation device 160 may be positioned along any portion or member of the trailer 10 or as a separate, independent device. In addition, the geolocation device 160 may be electrically connected to the controller 110 via at least one wire or at least one electrical connection. In the illustrated embodiment, the geolocation device 160 may be electrically embedded in the controller 110 to provide power and control over the geolocation device 160 during operation. In other exemplary embodiments, the geolocation device 160 may be electrically connected to the controller 110 in other suitable ways. In one exemplary embodiment, a geolocation device may be electrically connected to a controller via a wire in which the geolocation device is remote from the controller and provided in a separate, independent device.

During operation, the geolocation device 160 provides information and data to the controller 110 as to aiding in the location of the trailer 10 via an existing global positioning system (GPS). Such information and data collected by the geolocation device 160 may allow a dispatcher to suitably track and monitor the location of the trailer 10 prior to towing said trailer 10 or when said trailer 10 is being towed by the vehicle 1. In one instance, the information and data collected by the geolocation device 160 of the trailer monitoring system 100 may allow a driver of the vehicle 1 or a dispatcher of the trailer 10 to quickly locate the desired trailer 10 which, in turn, may reduce the overall time of the towing operation. In another instance, the information and data collected by the geolocation device 160 of the trailer monitoring system may allow a dispatcher to monitor the trailer 10 or other trailers that may be utilizing a trailer monitoring system, such as trailer monitoring system 100, to ensure that the trailer 10 will be delivered in an adequate time or if delays may incur due to intervening circumstances (e.g., traffic issues, traffic accidents, etc.).

Referring now to FIG. 1, the at least one input device of the trailer monitoring system 100 may include scanning and or a radio frequency identification (or "RFID" hereinafter) system 170. In the illustrated embodiment, the RFID system 170 includes at least one RFID tag 172 operably engaged to the trailer 10 and a RFID scanner 174 operably engaged to the vehicle 1. As illustrated in FIG. 1, the at least one RFID tag 172 may be operably engaged to the front wall 10A of the trailer 10 and proximate to the top wall 10E of the trailer 10. Still referring to FIG. 1, the RFID scanner 174 is operably engaged to the vehicle 1 proximate to the rear end 1B of the vehicle 1 to adequately view and scan the RFID tag 172 of the trailer 10. In other exemplary embodiment, a RFID scanner may be operably engaged to any suitable area of a vehicle in order to adequately scan and view a corresponding RFID tag on a trailer. In addition, the RFID scanner 174 may be operably connected with the vehicle 1 where the vehicle 1 provides power to the RFID scanner 174 to use said RFID scanner 174. The RFID scanner 174 may also be electrically connected to the controller 110 where the RFID scanner 174 shares data and information to the controller 110.

The RFID system 170 of the trailer monitoring system 100 is considered advantageous because the RFID system 170 may communicate to the driver of the vehicle 1 and/or the dispatcher of the trailer 10 that the desired trailer 10 is being towed by the vehicle 1. Prior to selecting the trailer 10, the RFID scanner 174 provided on the vehicle 1 may scan at least one RFID tag 172 on the trailer 10 to determine that the vehicle 1 is towing the selected trailer 10. With this operation, the RFID system 170 of the trailer monitoring system 100 may provide assistance to the driver of the vehicle 1 to select the correct trailer 10 in which the vehicle 1 will be towing. In addition, the RFID system 170 of the trailer monitoring system 100 is also considered advantageous at least because remote RFID scanners provided at loading and unloading facilities may be utilized to scan the at least one RFID tag 172 on the trailer 10. Such information taken from the RFID tag 172 may help direct and assist the driver of the vehicle 1 to a specific dock at the loading and unloading facility which may lessen the amount of time for unloading or loading the trailer 10.

Referring to FIG. 1, the trailer monitoring system 100 may include an identification barcode or serial tag 180. In the illustrated embodiment, the barcode 180 may be positioned on the front wall 10A of the trailer 10 proximate to the bottom wall 10F of the trailer 10. The barcode 180 may include data and information providing details on the trailer 10. During operation, a driver of the vehicle 1 may scan the barcode 180 (via a mobile device or smartphone) prior to operably engaging the trailer 10 to the vehicle 1 to clarify the trailer 10 is the correct trailer. The mobile device or smartphone used by the driver of the vehicle 1 may be operable to use a mobile application or smartphone application that is adapted to communicate with the trailer monitoring system 100 via the controller 110. Once scanned, the driver of the vehicle 1 and a dispatcher of the trailer 10 may be notified that the correct trailer has been selected by the driver of the vehicle 1.

Referring to FIGS. 1 and 2, the at least one input device of the trailer monitoring system 100 may include at least one interior camera 190 that may be electrically connected to the DVR 122. The at least one interior camera 190 may be positioned along any portion or member of the trailer 10. In the illustrated embodiment, the at least one interior camera 190 is operably engaged with the bolster 14 of the trailer 10 and is positioned interior to the central chamber 11 of the trailer 10. As illustrated in FIGS. 1 and 20, the at least one interior camera 190 may be directed forwardly from the bolster 14 where the at least one interior camera 190 has a third viewing plane 192 directed towards the front wall 10A of the trailer 10. The third viewing plane 192 of the at least one interior camera 190 may generally extend in a direction with the longitudinal axis "X" of the trailer 10. The third viewing plane 192 of the at least one interior camera 190 illustrated herein must be understood that said third viewing plane 192 is diagrammatic only and may have viewing plane less than or greater than the viewing plane illustrated herein.

The orientation of the first viewing plane 124A and the second viewing plane 124B is configured advantageous at least because the at least one interior camera 190 is able to capture and record (via the DVR 122) different perspectives of the trailer 10 inside of the central chamber of the trailer 10. As such, the at least one interior camera 190 is able to capture a third perspective that is directed into the central chamber 11 of the trailer 10. Such capturing of this third perspective may be useful in various situations, such as assisting the driver or operator of the trailer 10 when the trailer 10 is being loaded or has been loaded with freight and surveilling the trailer 10 upon a security breach or similar triggering event of the trailer 10 when one or both of the door assemblies 18A, 18B are opened.

Still referring to FIG. 1, the at least one interior camera 190 may be electrically connected to the controller 110 via an eighth wire or electrical connection "W8." The eighth wire "W8" that electrically connects the at least one interior camera 190 to the controller 110 may provide power to the at least one interior camera 190 via the vehicle 1, the trailer 10, or other suitable power supplies that may be operably engaged to the controller 110. In addition, the eighth wire "W8" that electrically connects the at least one interior camera 190 to the controller 110 may allow the controller 110 to activate and/or control the at least one interior camera 190 between an ON state and an OFF state based on triggering events (e.g., activated by a driver's input, activated by the vehicle's inputs, activated by a remote user or facility, activated by another sensor and/or device within the trailer monitoring system 100, etc.). Such triggering events for activating the at least one interior camera 190 between an ON state and an OFF state is described in more detail below.

The at least one interior camera 190 may be also be activated separately and/or independently from the at least one camera 120 by the controller 110. In one instance, the at least one interior camera 190 may be activated and the first and second cameras 120A, 120B may remain deactivated when the vehicle 1 and the trailer 10 are parked and freight is being loaded into the trailer 10. During activation, the visual images recorded by the at least one interior camera 190 may be viewed in real-time, via the API, or viewed at a delayed-time, via the DVR 122.

While the at least one interior camera 190 may be operably engaged to bolster 14 of the trailer 10 inside of the central chamber 11, at least one interior camera may be operably engaged to any suitable portion of a trailer. In one exemplary embodiment, at least one interior camera may be operably engaged with a top wall of a trailer. In another exemplary embodiment, at least one interior camera may be operably engaged with a side wall of a trailer. In another exemplary embodiment, at least one interior camera may be operably engaged with a front wall of a trailer. In another exemplary embodiment, at least interior one camera may be positioned along any suitable portion of a trailer for viewing a central chamber of a trailer when freight is being loaded into the trailer or unloaded from the trailer.

Moreover, while the at least one interior camera 190 of the trailer monitoring system 100 may have a single camera, any suitable number of interior cameras may be included in a trailer monitoring system. Examples of a suitable number of interior cameras that may be included in a trailer monitoring system includes one, at least one, two, plurality, three, four, and other any suitable number of interiors cameras based on a particular application.

While the trailer 10 described and illustrated herein is equipped with the trailer monitoring system 100, the trailer monitoring system 100 may be equipped to existing trailers that do not currently have or use a trailer monitoring system similar to said trailer monitoring system 100. In other words, the trailer monitoring system 100 may be fully modular and equipped to existing trailers that are in the current market.

The trailer monitoring system 100 described and illustrated herein may be able to communicate with other devices, via the controller 110, for receiving and sending data and information from and to said devices operably connected to the trailer monitoring system 100. In one exemplary embodiment, a trailer monitoring system of a trailer may be adapted to communicate with remote devices (e.g., mobile device and smartphones) for receiving and sending data and information from and to said remote devices operably connected to the trailer monitoring system. In another exemplary embodiment, a trailer monitoring system of a trailer may be adapted to communicate with remote devices on a dispatcher server and/or dispatcher system that are positioned at loading and unloading facilities (e.g., RFID devices) for receiving and sending data and information from and to said remote devices operably connected to the trailer monitoring system. Such communication between the dispatcher systems and the trailer monitoring system may allow the dispatcher to be notified about the location of the trailer when leaving a loading facility, notified about the location of the trailer when entering an unloading facility, notified about the positions of the door assemblies on the trailer (between opened and closed positions), notified about recorded visual images from at least one camera, and other features to show the status of the trailer via the trailer monitoring system. Furthermore, the dispatcher systems may be able to operably control the components and devices of the trailer monitoring system 100, via the controller 110, based on geo-fencing systems provided at loading and unloading facilities. The dispatcher system may be able to determine the trailer 10 is provided inside of a geo-fencing system due to the communication between a remote device, such as the driver's mobile device, and the dispatcher system over a software application. For example, the dispatcher system may communicate to the trailer monitoring system 100 to maintain the door assemblies 18 in a closed position until the trailer 10 has reached a second geo-fencing at a second facility.

Having now described the structure and components of the trailer monitoring system 100, methods of using the trailer monitoring system 100 will now be described in more detail below.

FIGS. 3A-4B illustrate different method flowcharts, specifically methods 200A, 200B, 300A, 300B, for loading and unloading a trailer that has a trailer monitoring system, such as trailer 10 and trailer monitoring system 100, with a vehicle, such as vehicle 1. Each of the following methods 200A, 200B, 300A, 300B may be completed together and in sequential order for loading and unloading a trailer that has a trailer monitoring system, such as trailer 10 and trailer monitoring system 100, with a vehicle, such as vehicle 1.

Figure 3A:
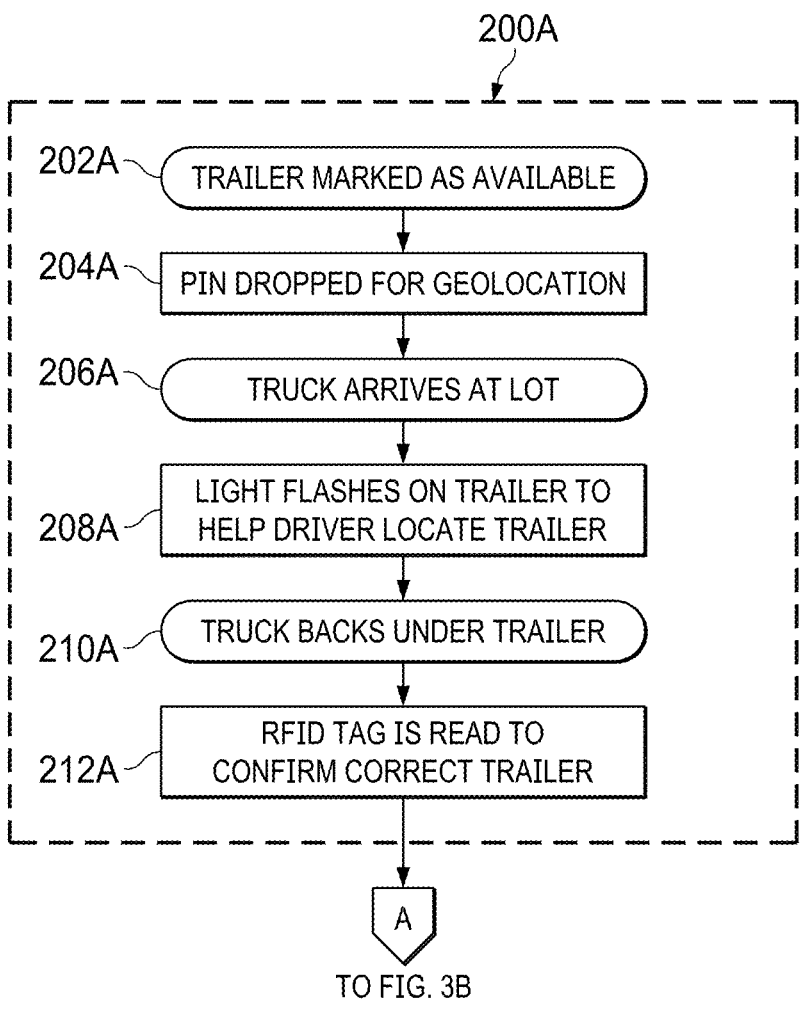
FIG. 3A (FIG. 3A) is an exemplary method flow chart for selecting a desired trailer with a trailer monitoring system to a vehicle.

Referring to FIG. 3A, FIG. 3A is a method 200A of selecting a desired trailer 10 via the trailer monitoring system 100. An initial step 202A of method 200A comprises marking a desired trailer as available in a first, loading facility with a first geo-fencing system. In step 202A, the desired trailer, such as trailer 10, may be marked by a dispatcher inside of the first geo-fencing system at the first facility. In this method, the desired trailer may be equipped with a trailer monitoring system, such as trailer monitoring system 100, to allow to dispatcher to mark the distinct location of the available trailer inside of the first facility. Another step 204A comprises marking and/or dropping a geolocation pin on the available trailer at the distinct location of the available trailer inside of the first geo-fencing system at the first facility. In step 204A, the driver of the vehicle may be notified about the location of the available trailer prior to arriving at the loading destination via an on-board display option provided with the vehicle or via a remote display option (e.g., a personal computer, a mobile device, a smartphone, or other remote display options of the like). The on-board display option provided with the vehicle or the remote display option may also be equipped with GPS capabilities to detect the geolocation of the available trailer.

In addition, the on-board display option provided with the vehicle or the remote display option may be adapted to communicate with the trailer monitoring system of the available trailer, which is previously described above. Here, the location of the trailer may be communicated to a dispatching system via a software application operably connected to the on-board display option or the remote display option. The communication between the dispatching system and the on-board display option or the remote display option allows for geo-fencing systems at facilities to enable or disable certain functions of the trailer monitoring system once a trailer is inside of a geo-fencing system. In one exemplary embodiment, a dispatching system may enable to a trailer monitoring system of a trailer to maintain the door assemblies in a locked position until the trailer reaches a designated geo-fencing system. The use of geo-fencing systems is described in more detail below.

Still referring to FIG. 3A, another step 206A may comprise the vehicle arriving at the loading destination. As such, steps 202A and 204A may be performed prior to the vehicle arriving at the loading destination to assist the driver in locating the available trailer at the first facility. Another step 208A comprises flashing at least one light device or illumination device on the available trailer to provide assistance to the driver on locating the available trailer. In one instance, the loading destination may be equipped with at least illumination device for providing assistance to the driver on locating the available trailer. Another step 210A comprises reversing the vehicle into the trailer to operably engaging the vehicle with the trailer. Another step 212A comprises scanning an RFID tag of the trailer monitoring system on the available trailer via a RFID of the trailer monitoring system on the vehicle. In step 212A, the RFID scanner provided on the vehicle may scan the RFID tag on the available trailer to confirm that the correct trailer has been selected. Such confirmation information may be relayed to the driver of the vehicle and the dispatcher to confirm that the desired trailer has been selected. An optional step may include scanning a barcode on the trailer, via mobile device or smartphone, to provide information on the trailer. The optional step of scanning the barcode may notify the trailer monitoring system provided with the trailer that the trailer is operably engaged to the vehicle.

Figure 3B:
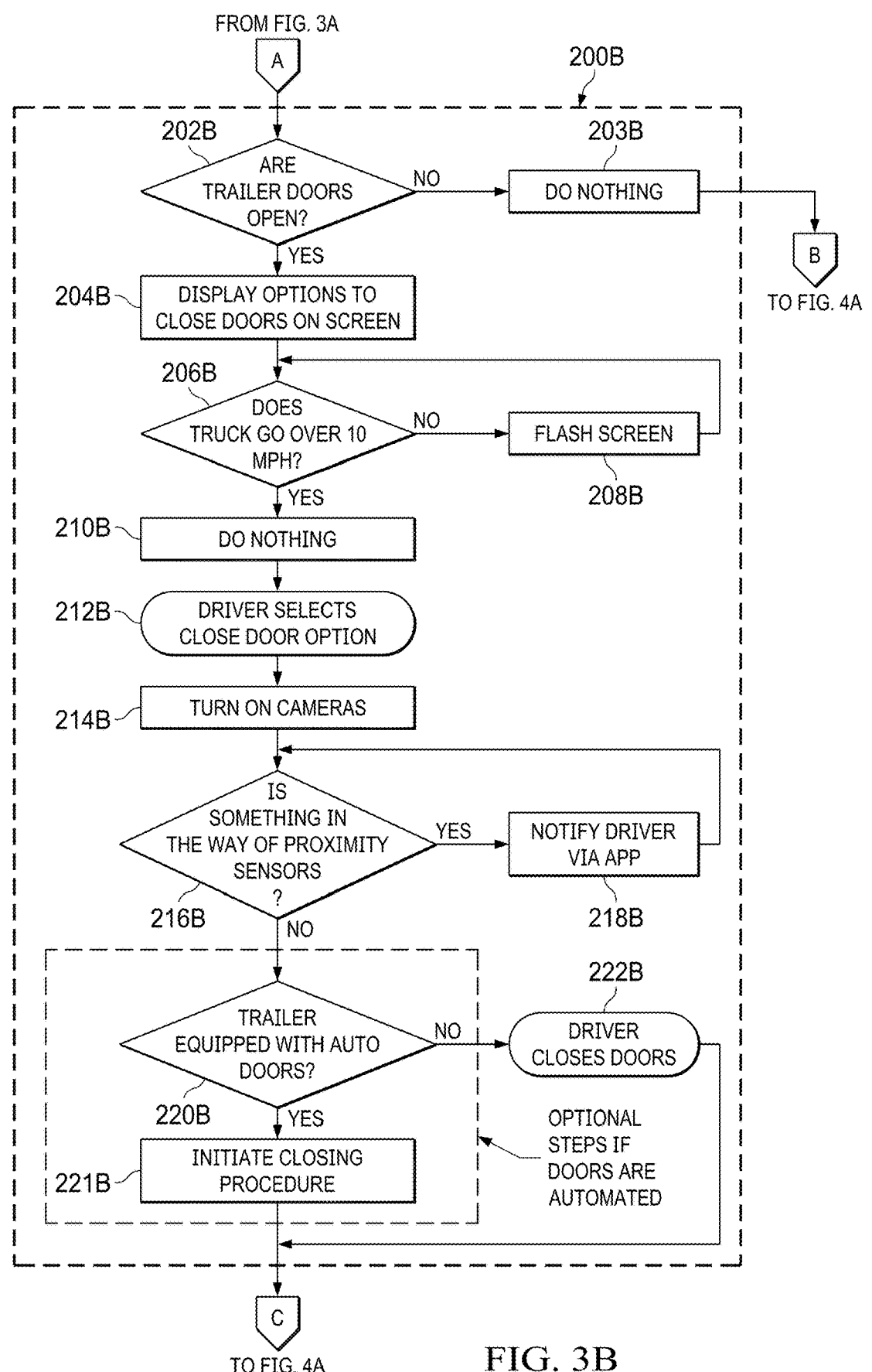
FIG. 3B (FIG. 3B) is an exemplary method flow chart similar to FIG. 3A, but the method is for monitoring the trailer during a loading operation.

Referring now to FIG. 3B, FIG. 3B is a method 200B of monitoring a trailer with a trailer monitoring system during a loading operation. Initial step 202B of method 200B comprises determining whether the trailer door assemblies of the available trailer are provided in an open position via at least one door sensor of the trailer monitoring system. In step 202B, the at least one door sensor, such as door sensors 150, may determine whether the door assemblies are provided in the open position. If the at least one door sensor determines that at least one door assembly is open, another step 204B may be accomplished where step 204B comprises notifying the driver, via the on-board display option or the remote display option, that at least one door assembly on the trailer is provided in the open position. If, however, the at least one door sensor determined that the door assemblies are closed, step 204B will be ignored (i.e, do nothing for another step 203B) and method 300A will begin, which is described in more detail below. If step 204B is accomplished, another step 206B comprises determining if the vehicle and the trailer are traveling at a speed of at least ten miles per hour. If the vehicle and trailer are traveling at a speed of at least ten miles per hour, another step 208B may be accomplished where step 208B comprises notifying the driver, via the on-board display option or the remote display option, that at least one door assembly is provided in the open position. Step 208B may repeat until the driver, either manually or automatically, moves the at least one door assembly from the opened position to the closed position. If, however, the door assemblies are provided in the closed position, via the at least one door sensor, step 210B may be ignored (i.e., do nothing for another step 210B) and progress to complete method 200B.

Still referring to FIG. 3B, another step 212B comprises selecting to close the at least one door assembly of the trailer. Once step 212B is accomplished, another step 214B may be performed which comprises activating at least one camera of the trailer monitoring system to an ON state. In step 214B, the at least one camera, such as the first camera 120A, may be activated, via a controller of the trailer monitoring system, for viewing the rear area of the trailer for any obstructions or objects prior to closing the at least one door assembly. Optionally, a second camera from the at least one camera, such as second camera 120B, may also be activated, via the controller of the trailer monitoring system, for viewing the area surrounding the rear opening of the trailer. After step 214B is accomplished, another step 216B may be performed which comprises activating at least one proximity sensor of the trailer monitoring system to an ON state. In step 216B, the at least one proximity sensor, such as the first proximity sensor 130A and the second proximity sensor 130B, may be activated for viewing the rear area of the trailer for any obstructions or objects that prevents the at least one door assembly from closing. If the at least one proximity sensor views an obstruction or object that prevents the at least one door assembly from closing, another step 218B may be accomplished where step 218B comprises notifying the driver via the on-board display option or the remote display option of any obstructions or objects. If, however, the at least one proximity sensor does not view any obstructions or objects that prevents the at least one door assembly from closing, step 218B is accomplished and may progress to complete method 200B.

Still referring to FIG. 3B, an optional step 220B may be performed once any obstructions or objects are removed away from the at least one door assembly. Optional step 220B comprises automatically transitioning the at least one door assembly from the opened position to the closed position by a driving assembly on the trailer. Optional step 220B may be performed if the at least one door assembly is operably engaged to a driving assembly for transitioning the at least one door between the opened position and the closed position. If equipped with the driving assembly, optional step 221B may be performed which comprises initiating driving assembly to transition the at least one door assembly from the opened position to the closed position. If, however, the at least one door assembly is not equipped with a driving assembly, another step 222B may be performed which comprises manually transitioning the at least one door assembly from the opened position to the closed position. Step 222B may be accomplished by the driver of the vehicle or another person around the trailer to manually transition the at least one door assembly from the opened position to the closed position.

Once step 221B or step 222B is complete, the door assemblies of the trailer may remain locked, via the trailer monitoring system, until the trailer reaches a second unloading facility. The door assemblies of the trailers may remain locked once the trailer travels outside of the first geo-fencing system of the first facility. Such information may be sent to the dispatcher system over the software application provided on the driver's mobile device or smartphone or by the trailer monitoring system. As such, trailer monitoring system may be operably controlled by the dispatcher system in which the door assemblies may not be opened until the trailer arrives at a second, unloading facility with a second geo-fencing system.

Figure 4A:
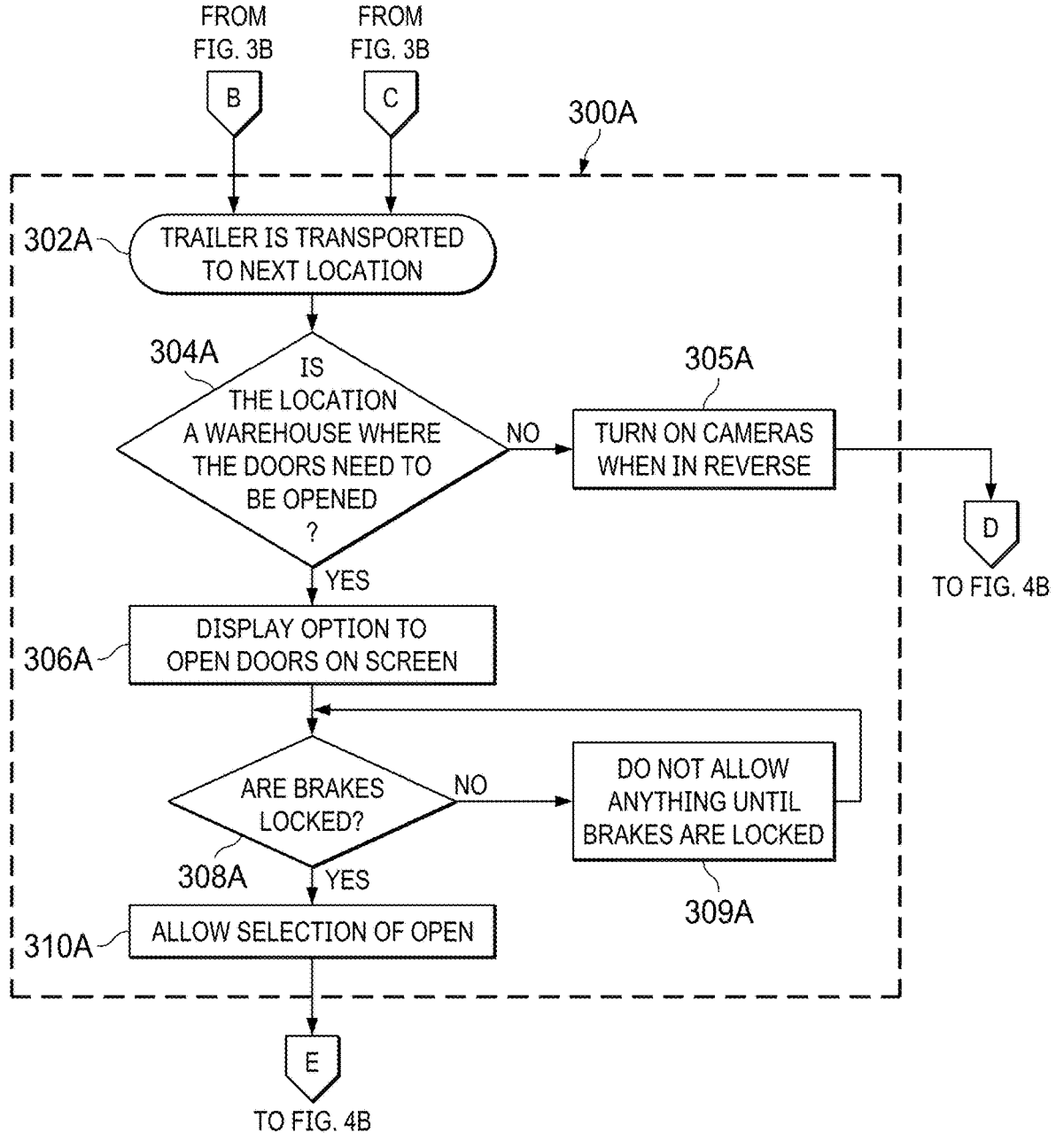
FIG. 4A (FIG. 4A) is an exemplary method flow chart similar to FIG. 3B, but the method is for unloading a trailer with a trailer monitoring system from a vehicle.

FIG. 4A illustrates a method 300A of delivering a trailer to a second, unloading destination. An initial step 302A comprises transporting the trailer to the second, unloading locating and/or facility. Initial step 302A may be accomplished from either step 202B of method 200B or step 221B of method 200B. Another step 304A comprises determining if the door assemblies of the trailer need to be provided in the open position due to the location of the trailer inside of a second, unloading facility. The second facility may have a second geo-fencing system that operably communicates with the driver's mobile device and/or the trailer monitoring system on the trailer. If the trailer has not reached the desired location inside of the second geo-fencing system of the second facility based on the location of the driver's mobile device or the trailer, optional step 305A may be accomplished which comprises activating the at least one camera to an ON state when the vehicle and the trailer are moving in a rearward direction (i.e., the vehicle and the trailer are in reverse). During optional step 305A, the door assemblies may remain locked until the trailer is inside of the second geo-fencing at the second facility. If optional step 305A is accomplished, optional step 305A will continue to method 300B, which is described in more detail below. If the trailer has reached a desired location inside of the second geo-fencing system facility based on the location of the driver's mobile device or the trailer, another step 306A is used which comprises displaying an option to the driver to provide the door assemblies in the opened position. Another step 308A comprises determining whether the brakes of the trailer need to be locked. If the brakes of the trailer are determined not to be locked, optional step 309A may be accomplished which comprises prohibiting any use of the trailer monitoring system until the brakes of the trailer are locked. If the brakes of the trailer are determined to be locked, another step 310A may be accomplished which comprises allowing selection of the doors assemblies to be provided in the open position.

Figure 4B:
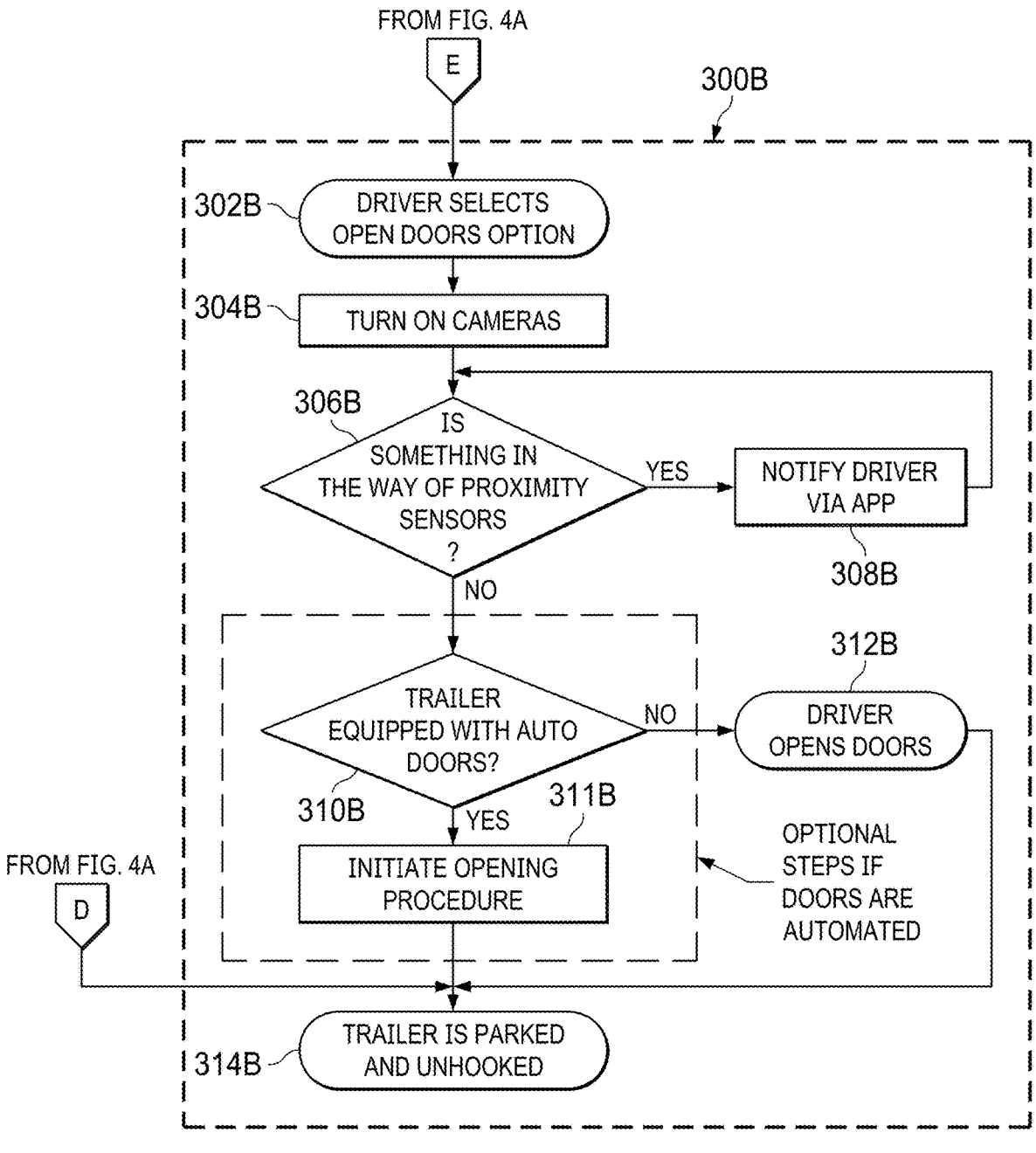
FIG. 4B (FIG. 4B) is an exemplary method flow chart similar to FIG. 3A, but the method is for monitoring the trailer during an unloading operation.

FIG. 4B illustrated a method 300B of monitoring a trailer with a trailer monitoring system during an unloading operation. Method 300B is substantially similar to steps in method 200B of monitoring a trailer with a trailer monitoring system during a loading operation, except as detailed below. Initial step 302B comprises selecting to open the at least one door assembly of the trailer. In this step, the trailer is located inside of the second geo-fencing of the second facility via the location of the driver's mobile device or the trailer monitoring system. Once step 302B is accomplished, another step 304B may be accomplished which comprises activating at least one camera of the trailer monitoring system to an ON state. In step 304B, the at least one camera, such as the first camera 120A, may be activated for viewing the rear area of the trailer for any obstructions or objects prior to closing the at least one door assembly. Optionally, a second camera from the at least one camera, such as second camera 120B, may also be activated to view area surrounding the rear opening of the trailer.

After step 304B is accomplished, another step 306B may be accomplished which comprises activating at least one proximity sensor of the trailer monitoring system to an ON state. In step 306B, the at least one proximity sensor, such as the first proximity sensor 130A and the second proximity sensor 130B, may be activated for viewing the rear area of the trailer for any obstructions or objects that prevents the at least one door assembly from closing. If the at least one proximity sensor views an obstruction or object that prevents the at least one door assembly from closing, another step 308B may be accomplished where step 308B comprises notifying the driver via the on-board display option or the remote display option of such obstructions or objects. If, however, the at least one proximity sensor does not view any obstructions or objects that prevents the at least one door assembly from closing, optional step 310B may be performed once any obstructions or objects are removed away from the at least one door assembly. Optional step 310B comprises automatically transitioning the at least one door assembly from the opened position to the closed position by a driving assembly on the trailer. Optional step 310B may be performed if the at least one door assembly is operably engaged to a driving assembly for transitioning the at least one door between the opened position and the closed position. If equipped with the driving assembly, optional step 311B may be accomplished which comprises initiating a driving assembly to transition the at least one door assembly from the opened position to the closed position. If, however, the at least one door assembly is not equipped with a driving assembly, another step 312B may be performed which comprises manually transitioning the at least one door assembly from the opened position to the closed position by the driver. Step 312B may be accomplished by the driver of the vehicle or another person around the trailer to manually transition the at least one door assembly from the opened position to the closed position. Upon completion of step 312B, the trailer is ready to be unloaded. Still referring to FIG. 4B, another step 314 comprises parking the trailer and disconnecting the trailer from the vehicle. Step 314 may be accomplished by performing either step 310B or step 311B of method 300B. In addition, step 314 may be accomplished by performing step 305A of method 300A.

During loading and unloading operations, at least one interior camera of the trailer monitoring system (such as interior camera 190) may be activated from an OFF state to an ON state. The at least one interior camera provides the driver of the vehicle 1 with a real time video viewing the central chamber of the trailer. The at least one interior camera allows the driver to monitor when the trailer is completely loaded during a loading operation or when the trailer is completely unloaded during an unloading operation. The at least one interior camera may be activated by the driver of the vehicle and/or by a remote third-party during unloading or loading operations. The at least one interior camera may also be actuated during triggering or security events (e.g., opening doors when the doors are originally provided in the locked position).

As described and illustrated herein, method 200A, method 200B, method 300A, method 300B may be performed in sequential order when a vehicle selects a trailer equipped with a trailer monitoring system similar, such as trailer monitoring system 100. In addition, method 200A, method 200B, method 300A, method 300B may be repeated each time a vehicle selects the same trailer that is equipped with a trailer monitoring system or a different trailer that is equipped with a trailer monitoring system.

In other exemplary embodiments, the trailer monitoring system of the trailer may be used between either methods 200A, 200B, 300A, or 300B or upon completion of methods 200A, 200B, 300A, and 300B for security and monitoring purposes. In one instance, an optional step may include activating at least one camera to an ON state, via at least one locking device of the trailer monitoring system, when at least one door assembly is provided in the open position and the trailer is parked. In this optional step, the at least one camera, such as the first camera 120A, may be activated for viewing the rear area of the trailer for any obstructions or objects prior to closing the at least one door assembly. Optionally, a second camera from the at least one camera, such as second camera 120B, may also be activated to view area surrounding the rear opening of the trailer. Such activation of the first camera and/or second camera may be recorded for security purposes via a DVR provided in the trailer monitoring system.

While a dispatching system has been described herein, any suitable dispatching system may utilize methods 200A, 200B, 300A, and 300B to operably communicating with a trailer having a trailer monitoring system.

Figure 5:
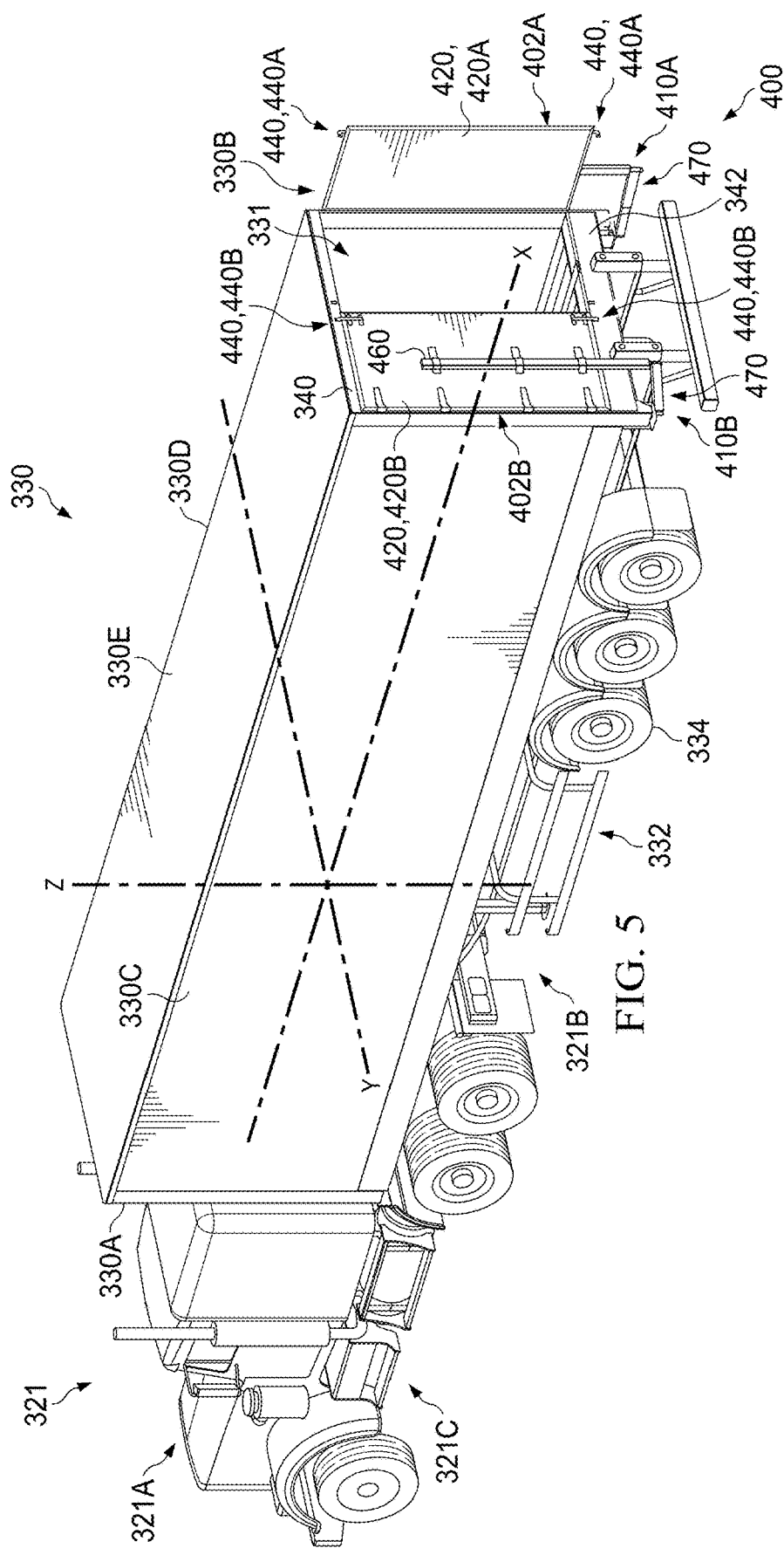
FIG. 5 (FIG. 5) is a top, rear, right side isometric perspective view of a trailer door system in accordance with an aspect of the present disclosure, wherein the trailer door system is operably engaged to a trailer.

FIG. 5 illustrates a vehicle, which is generally indicated by the reference number 321. It will be understood that the illustrated vehicle 321 is exemplary only and any type of vehicle is contemplated to be represented by the illustrated device. Such vehicles considered suitable herein include motorcycles, all-terrain vehicles, cars, sport utility vehicles (SUV), pickup trucks, vans, recreational vehicles, commercial trucks, and other similar vehicles for the purpose of towing. In the illustrated embodiment, the vehicle 321 is depicted as a semi-tractor-trailer truck.

The trailer monitoring system 100 may be provided with any suitable trailer door assembly or trailer described and illustrated herein and/or any existing trailer or future trailer in the current market.

Still referring to FIG. 5, the vehicle 321 has a front end 321A, an opposing rear end 321B, and a longitudinal direction defined therebetween where the vehicle 321 travels forwardly and backwardly along the longitudinal direction. The vehicle 321 also has a left side or first side 321C, and an opposing right side or second side 321D, and a transverse direction defined therebetween where the vehicle 321 travels laterally (i.e., turning left and/or right) along the transverse direction. The vehicle 321 may also include a towing hitch or a fifth-wheel hitch (not illustrated) that is disposed proximate to the rear end 321B of the vehicle 321. The vehicle 321 may also include an air supply device (not illustrated) that is disposed proximate to the rear end 321B of the vehicle 321. The air supply device may be any suitable device to adequately supply air pressure to a trailer or similar towable vehicle. As such, the air supply device may supply suitable air pressure to specific components and/or assemblies on a trailer operably engaged to the vehicle 321, which is described in more detail below.

Still referring to FIG. 5, the vehicle 321 is mechanically connected to a trailer, which is generally indicated by the reference number 330. It will be understood that the illustrated trailer 330 is exemplary only and any type of trailer is contemplated to be represented by the illustrated device. Such trailers considered suitable herein include boat trailers, car-hauler trailers, enclosed trailers, flatbed trailers, gooseneck trailers, dump trailers, horse trailers, livestock trailers, tilt trailer, travel/camper trailers, utility trailers, and other similar trailers for the purpose of being towed. In the illustrated embodiment, the trailer 330 is depicted as a fully-enclosed semi-trailer, more particularly a dry van semi-trailer or refrigerated van semi-trailer.

As illustrated in FIG. 5, the trailer 330 may have a front wall 330A, directed towards the rear end 321B of the vehicle 321, an opposing rear wall 330B that faces away from the vehicle 321, and a longitudinal direction defined therebetween where the vehicle 321 and the trailer 330 travel forwardly and backwardly along the longitudinal direction. The trailer 330 may also have a first lateral wall or left wall 330C, an opposing second lateral wall or right wall 330D, and a transverse direction defined therebetween where the vehicle 321 and the trailer 330 travel laterally (i.e., turning left and/or right) along the transverse direction. The trailer 330 may also have a top wall 330E, an opposing bottom wall 330F, and a vertical direction defined therebetween. The trailer 330 may also define a longitudinal axis "X" between the front and rear walls 330A, 330B, a transverse axis "Y" between the first and second lateral walls 330C, 330D, and a vertical axis "Z" between the top and bottom walls 330E, 330F.

Figure 6:
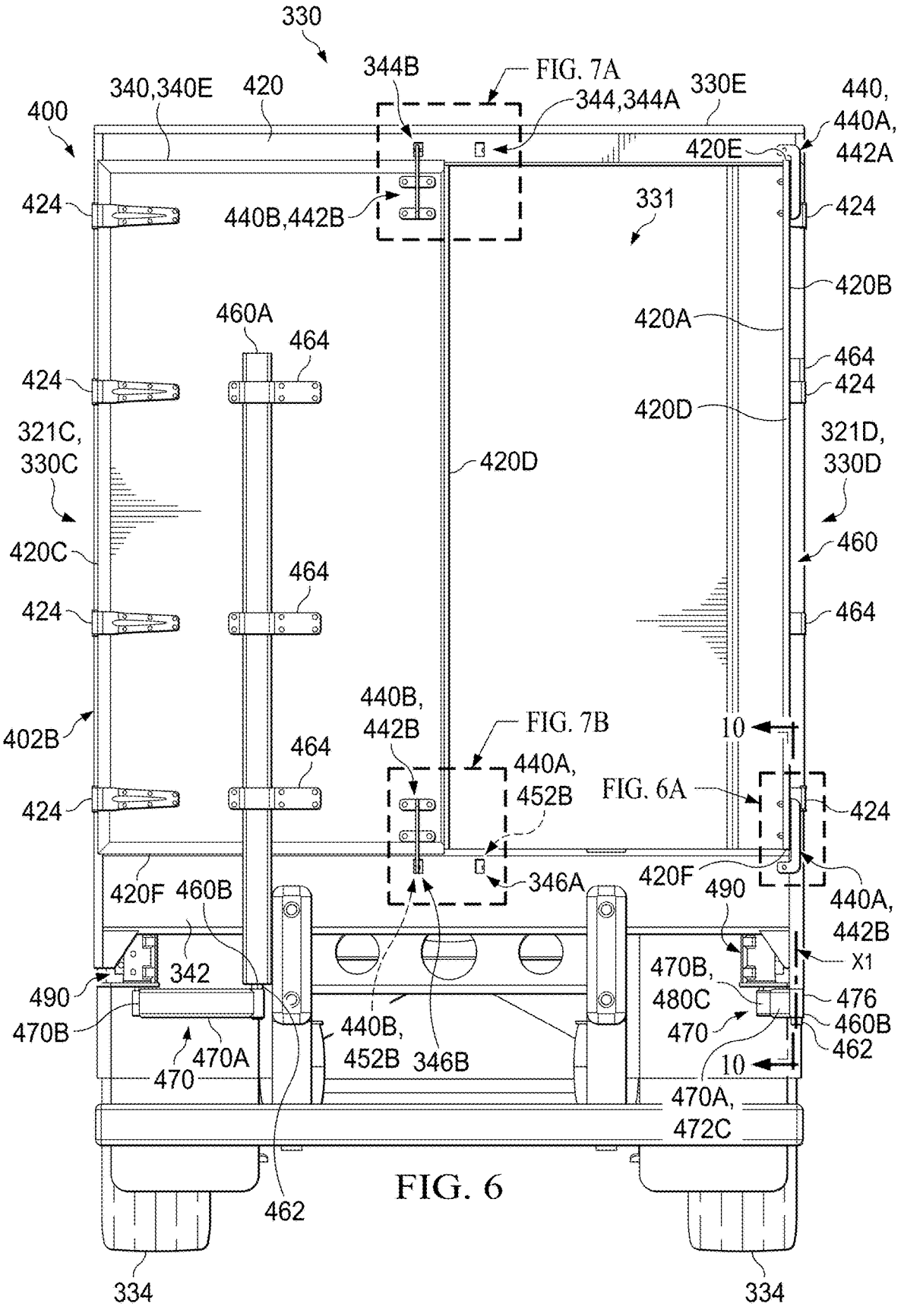
FIG. 6 (FIG. 6) is a rear elevation view of the trailer door system and the trailer, wherein a first trailer door assembly of the trailer door system is provided in an opened position and a second trailer door assembly of the trailer door system is provided in a closed position.

Still referring to FIG. 5, the front wall 330A, the rear wall 330B, the first and second lateral walls 330C, 330D, the top wall 330E, and the bottom wall 330F may collectively define a compartment 331. The compartment 331 may be accessible by a rear opening 12 defined collectively by the left wall 330C, right wall 330D, top wall 330E, and the bottom wall 330F. The compartment 331 may be adapted to hold and store different types of freight and/or goods for logistical purposes. Referring to FIGS. 5 and 6, the trailer 330 may also have a bolster 340 that operably engages with the left wall 330C, the right wall 330D, and the top wall 330E of the trailer 330. Still referring to FIGS. 5 and 6, the trailer may also have a bumper 342 positioned opposite to the bolster 340 on the trailer 330 relative to the vertical axis "X." The bumper 342 may be operably engaged with the left wall 330C, the right wall 330D, and the bottom wall 330F of the trailer 330.

Figure 7A:
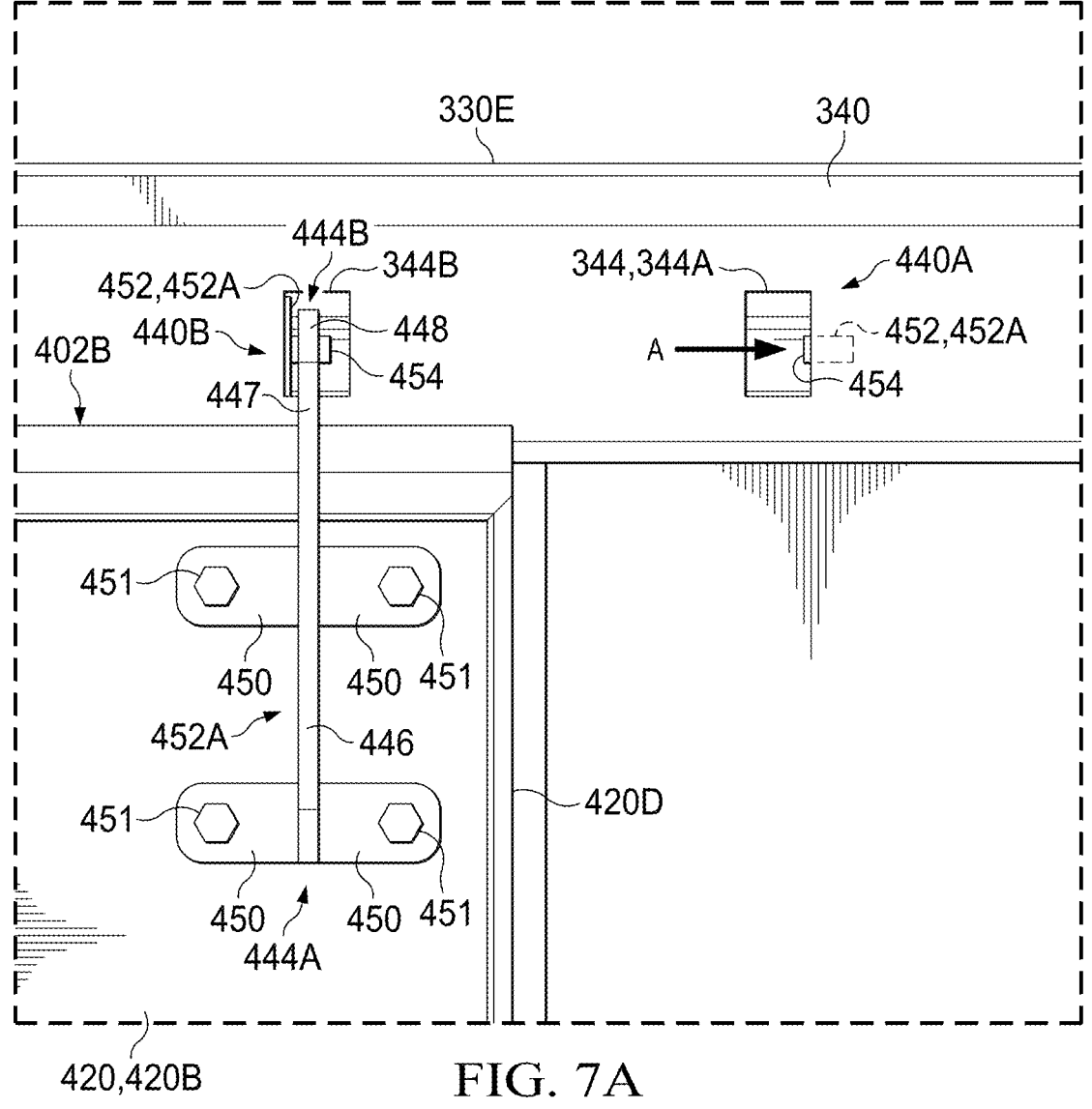
FIG. 7A (FIG. 7A) is an enlargement view of the area that is highlighted in FIG. 6.

Referring to FIGS. 6 and 7A, the bolster 340 may define at least one upper slot 344. The at least one upper slot 344 may extend from an exterior surface of the bolster 340 towards an interior surface of the bolster 340. In one exemplary embodiment, at least one upper though-hole may extend entirely through a bolster of trailer where a central compartment defined by the trailer is in fluid communication with the external environment via the at least one upper though-hole. In the illustrated embodiment, the bolster 340 may define a first upper slot 344A and an adjacent second upper slot 344B relative to the transverse axis of the trailer 330. Such uses and purposes of the first and second upper slots 344A, 344B are described in more detail below.

Figure 7B:
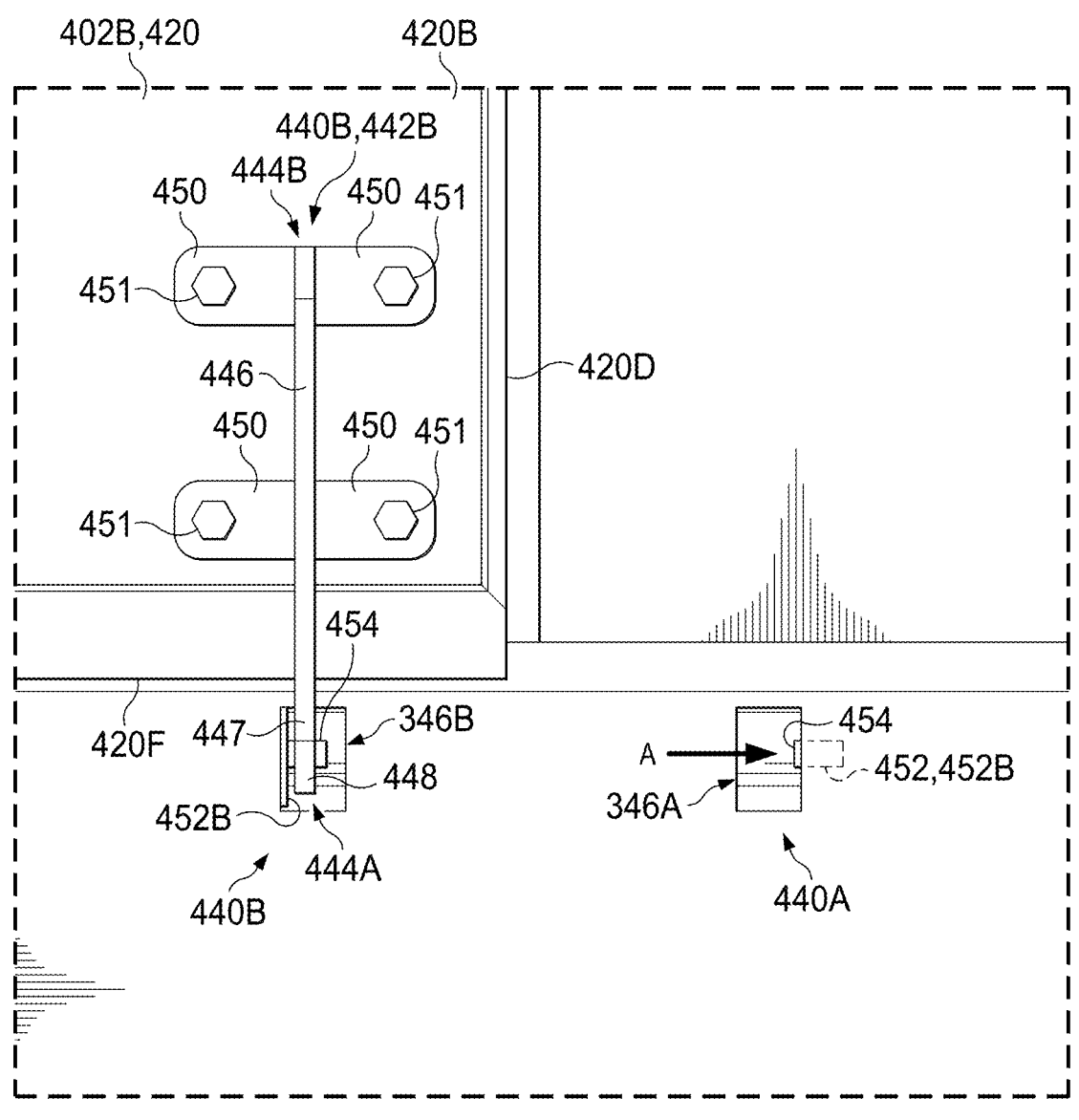
FIG. 7B (FIG. 7B) is an enlargement view of the area that is highlighted in FIG. 6.

Still referring to FIGS. 6 and 7B, the bumper 342 may define at least one lower slot 346. The at least one lower slot 346 may extend from an exterior surface of the bumper 342 towards an interior surface of the bumper 342. In one exemplary embodiment, at least one lower though-hole may extend entirely through a bumper of trailer where a central compartment defined by the trailer is in fluid communication with the external environment via the at least one lower though-hole. In the illustrated embodiment, the bumper 342 may define a first lower slot 346A and an adjacent second lower slot 346B relative to the transverse axis of the trailer 330. The first lower slot 346A may be aligned with the first upper slot 344A relative to the vertical axis of the trailer 330. The second lower slot 346B may also be aligned with the second upper slot 344B relative to the vertical axis of the trailer 330. Such uses and purposes of the first and second lower slot 346A, 26B are described in more detail below.

Referring to FIGS. 5-13B, the trailer 330 may include a trailer door system, generally indicated by the reference number 100. The trailer door system 400 is considered advantageous at least because the trailer door system 400 described and illustrated herein may be fitted to existing trailers doors The trailer door system 400 may include at least one trailer door assembly, generally indicated by the reference number 402. In the illustrated embodiment, the trailer 330 includes a first trailer door assembly 402A and a second trailer door assembly 402B. Each of the first trailer door assembly 402A and the second trailer door assembly 402B may operably engage to the trailer 330, which is described in more detail below. The first trailer door assembly 402A and the second trailer door assembly 402B are substantially identical to one another and are engaged with the trailer 330 in a mirrored-image. Inasmuch as the first trailer door assembly 402A and the second trailer door assembly 402B are substantially identical, the following description will relate to the first trailer door assembly 402A. It should be understood, however, that the description of the first trailer door assembly 402A applies equally to the second trailer door assembly 402B, unless specifically stated otherwise.

Referring to FIGS. 5-8, the trailer door assembly 402A may include a door 420 that has a front surface 420A, an opposing rear surface 420B, and a vertical axis defined therebetween. The door 420 may also include an outer side 420C, an opposing inner side 420D, and a transverse axis defined therebetween. The door 420 may also include a top end 420E, an opposing bottom end 420F, and a longitudinal axis defined therebetween. The door 420 may be operably engaged with a plurality of hinges 424 even spaced along the front surface 420A proximate to the outer side 420C of the door 420. In the illustrated embodiment, the door 420 of the trailer door assembly 402A are pivotable on the trailer 330, via the plurality of hinges 424, to move the door 420 from a closed position (see FIGS. 11A-11C) and an opened position (see FIGS. 13A-13B). In the illustrated embodiment, the door 420 pivots about an axis that is parallel to the "Z" axis of the trailer 330 via the plurality of hinges 424. Such pivoting rotation of the door 420 is described in more detail below. In other exemplary embodiments, a door of a trailer door assembly may pivot about any axis to move the door between a closed position and an opened position. In one instance, a door of a trailer door assembly operably engaged with a trailer may pivot about an axis parallel to a longitudinal axis defined by the trailer. In another instance, a door of a trailer door assembly operably engaged with a trailer may pivot about an axis parallel to a transverse axis defined by the trailer.

Referring to FIGS. 6-7A, the trailer door assembly 402A may further include at least one locking assembly 440 that is operably engaged with the door 420 of the at least one trailer door assembly 402. The at least one locking assembly 440 may be configured to actuate between a locked position and an unlocked position for locking and unlocking the door 420 of the at least one trailer door assembly 402 with the trailer 330. In the illustrated embodiment, a first locking assembly 440A is operably engaged with the door 420 of the first trailer door assembly 402A and the trailer 330. Additionally, a second locking assembly 440B is operably engaged with the door 420 of the second trailer door assembly 402B and the trailer 330. The first locking assembly 440A and the second locking assembly 440B are substantially identical to one another. Inasmuch as the first locking assembly 440A and the second locking assembly 440B are substantially identical, the following description will relate to the first locking assembly 440A. It should be understood, however, that the description of the first locking assembly 440A applies equally to the second locking assembly 440B, unless specifically stated otherwise.

Figure 6A:
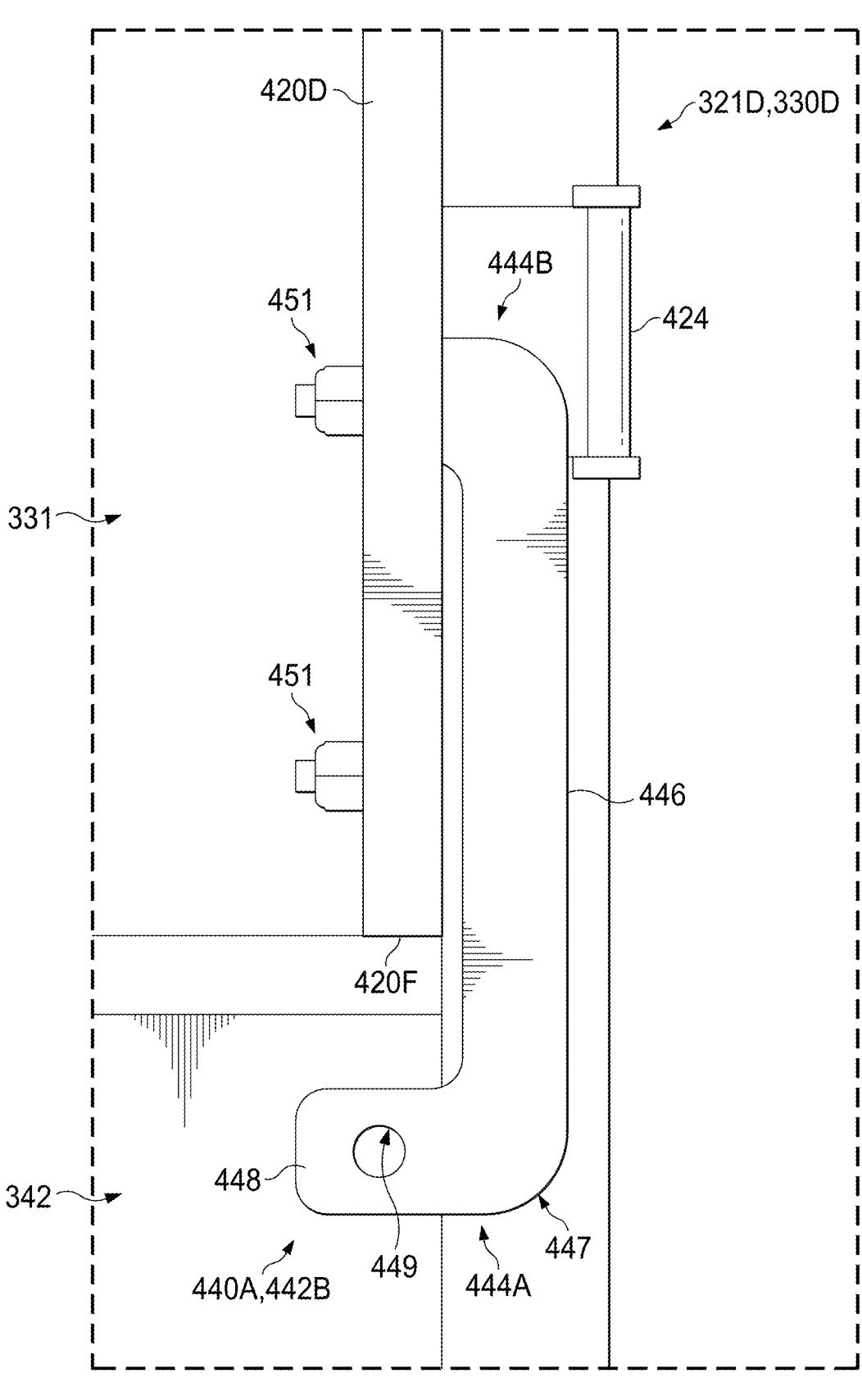
FIG. 6A (FIG. 6A) is an enlargement view of the area that is highlighted in FIG. 6.

As illustrated FIG. 6A, the first locking assembly 440A may include at least one lock plate 442. The at least one lock plate 442 may be operably engaged with the door 420 of the trailer door assembly 402A. As shown in FIG. 6A, the at least one lock plate 442 may be operably engaged with the rear surface 420B of the door 420 exterior to the compartment 331 of the trailer 330. In other exemplary embodiments, a lock plate may be operably engaged to any portion of a door of a trailer door assembly for providing a mechanism to lock the door with the trailer. In the illustrated embodiment, the first locking assembly 440A includes a first or upper lock plate 442A and an opposing second or lower lock plate 442B. The upper and lower lock plates 442A, 442B are substantially identical to one another and are engaged with the door 420 of the first trailer door assembly 402A in a mirrored-image orientation. Inasmuch as the upper lock plate 442A and the lower lock plate 442B are substantially identical, the following description will relate to the upper lock plate 442A. It should be understood, however, that the description of the upper lock plate 442A applies equally to the lower lock plate 442B, unless specifically stated otherwise.

As illustrated in FIGS. 6-7A, the upper lock plate 442A may have a first end 444A, an opposing second end 444B, and a longitudinal axis defined between the first end 444A and the second end 444B. The upper lock plate 442A may have a base portion 446 that extends from the second end 444B towards the first end 444A where the base portion 446 is substantially parallel with the rear surface 420B of the door 420. The upper lock plate 442A may also define a bend 447 proximate to the first end 444A of the upper lock plate 442A that extends into a securement portion 448 of the upper lock plate 442A. The securement portion 448 may be substantially orthogonal to the base portion 446 of the upper lock plate 442A when the upper lock plate 442A is formed. As illustrated in FIG. 6A, an aperture 449 may be defined in the securement portion 448 at a distance away from the bend 447 and the base portion 446. The aperture 449 may extend entirely through the securement portion 448 in that each surface of the securement portion 448 is in fluid communication with one another via the aperture 449. Such use of the securement portion 448 and the aperture 449 is described in more detail below.

The upper lock plate 442A may also include at least one attachment member 450 that extends from the base portion 446 (see FIG. 7A). In the illustrated embodiment, the at least one attachment member 450 of the upper lock plate 442A operably engages with the door 420 of the trailer door assembly 402A. In the illustrated embodiment, the upper lock plate 442A includes four attachment members 450 for operably engaging the upper lock plate 442A to the door 420. In other exemplary embodiments, any suitable number of attachment members may be used for operably engaging a lock plate to a door of a trailer door assembly. The at least one attachment member 450 may be operably engaged with the door 420 of the trailer door assembly 402A via at least one attachment mechanism 451 (e.g., a connector threadably engaged with a nut). In other exemplary embodiments, any suitable attachment or securement mechanism may be used to operably engage at least one attachment member of a lock plate with a door of a trailer door assembly.

As illustrated in FIGS. 6 and 7A, the first locking assembly 440A may include at least one actuator 452 for operably engaging the door 420 of the trailer door assembly 402A between the locked position and an unlocked position via the at least one lock plate 442. The at least one actuator 452 may be operably engaged with one of the bolster 340 and the bumper 342 proximate to one of the at least one upper slot 344 and the at least one lower slot 346. In the illustrated embodiment, the first locking assembly 440A may include a first or upper actuator 452A that is operably engaged with the bolster 340 proximate to the first upper slot 344A. The locking assembly 440A may also include an opposing second or lower actuator 452B that is operably engaged with the bumper 342 proximate to the first lower slot 346A. The upper actuator 452A and the lower actuator 452B are substantially identical to one another and are engaged with the trailer 330 where the upper and lower actuator 452A, 452B are parallel to one another relative to the vertical axis of the trailer 330. Inasmuch as the upper actuator 452A and the lower actuator 452B are substantially identical, the following description will relate to the upper actuator 452A. It should be understood, however, that the description of the upper actuator 452A applies equally to the lower actuator 452B, unless specifically stated otherwise.

Moreover, it should be understood that the second locking assembly 440B of the second trailer door assembly 402B may include at least one actuator 452 substantially similar to the at least one actuator 452 of the first locking assembly 440A. As such, the at least one actuator 452 is configured to operably engage the door 420 of the second trailer door assembly 402B between the locked position and an unlocked position via the at least one lock plate 442. As illustrated in FIGS. 6 and 7A, the second locking assembly 440B may include an upper actuator 452A that is operably engaged with the bolster 340 proximate to the second upper slot 344B. The second locking assembly 440B may also include an opposing lower actuator 452B that is operably engaged with the bumper 342 proximate to the second lower slot 346B.

As illustrated in FIG. 7A, the upper actuators 452A of first and second locking assemblies 440A, 440B may be actuated between a locked position and an unlocked position. Each upper actuator 452A of first and second locking assemblies 440A, 440B includes a piston 454 that is moveable between a locked position and an unlocked position. As seen in FIG. 7A, the piston 454 of the upper actuator 452A of the second locking assembly 440B is provided in the locked position where the piston 454 extends through the aperture 449 of the upper lock plate 442A and operably engages with the upper lock plate 442A. As such, the interaction between the piston 454 of the upper actuator 452A and the upper lock plate 442A of the second locking assembly 440B creates a deadbolt or dead lock mechanism to maintaining door 420 of the second trailer door assembly 402B at the closed position. While not illustrated herein, the piston 454 of the upper actuator 452A of the first locking assembly 440A may also extend through the aperture 449 of the upper lock plate 442A of the locking assembly 440A where the piston 454 operably engages with the upper lock plate 442A. Such interaction between the piston 454 of the upper actuator 452A and the upper lock plate 442A of the first locking assembly 440A also creates a deadbolt or dead lock mechanism to maintaining door 420 of the first trailer door assembly 402A at the closed position (see FIG. 11C).

Still referring to FIG. 7A, the piston 454 on the upper actuator 452A of the first locking assembly 440A transitioned from the locked position to the unlocked position where the piston 454 is positioned away from the aperture 449 of the upper lock plate 442A and operably disengages from the upper lock plate 442A. Such transitioning of the piston 454 of the upper actuator 452A of the first locking assembly 440A is denoted by an arrow labeled "A" in FIG. 7A. The disengagement between the piston 454 and the upper lock plate 442A allows the door 420 of the first trailer door assembly 402A to be moved from the closed position to the opened position. While not illustrated herein, the piston 454 of the upper actuator 452A of the second locking assembly 440B may transition from the locked position to the unlocked position where the piston 454 is positioned away from the aperture 449 of the upper lock plate 442A and operably disengages from the upper lock plate 442A. Such disengagement allows the door 420 of the second trailer door assembly 402B to be moved from the closed position to the opened position (see FIGS. 13A-13B).

Referring to FIG. 7B, the lower actuators 452B of the first and second locking assemblies 440A, 440B may also be actuated between locked and unlocked positions for allowing the doors 420 of the first and second trailer door assemblies 402A, 402B to move from closed position to opened positions. Such actuation and capabilities of the lower actuators 452B of the first and second locking assemblies 440A, 440B are substantially identical to the upper actuators 452A of the first and second locking assemblies 440A, 440B. During operation, pistons 454 of the lower actuators 452B may operably engage with the lower lock plates 442B of first and second locking assemblies 440A, 440B for maintaining the doors 420 of the first and second trailer door assemblies 402A, 402B at the closed position. Additionally, the pistons 454 of the lower actuators 452B of first and second locking assemblies 440A, 440B may operably disengage from the lower lock plates 442B to allow the doors 420 of the first and second trailer door assemblies 402A, 402B to transition from the closed position to the opened position.

In the illustrated embodiment, the upper and lower actuators 452A, 452B of the first and second locking assemblies 440A, 440B are pneumatic actuators powered by on-board air supply system of the vehicle 321 or the trailer 330. As such, the air supply system may actuate the upper and lower actuators 452A, 452B of the first and second locking assemblies 440A, 440B between the locked positions (see FIGS. 7A and 11A-11C) and the unlocked positions (see FIGS. 7A and 12A-13B) via controls in the vehicle 321 or the trailer

330. The air supply system of the vehicle 321 may be controlled by the driver or a remote user that is connected to the air supply system via a remote device or application operatively connected with the air supply system. In other exemplary embodiments, upper and lower actuators of first and second locking assemblies may be any suitable actuator. Examples of suitable actuators include hydraulic actuators, electric actuators, thermal and magnetic actuators, mechanical actuators, pneumatic actuators, and other suitable types of actuators or device of the like.

As illustrated in FIGS. 5, 6, and 8-13B, the trailer door system 400 may include at least one driving assembly, generally indicated by the reference number 410, that is operably engaged with at least one trailer door assembly 402. In the illustrated embodiment, the trailer 330 includes a first driving assembly 410A operably engaged with the first trailer door assembly 402A and a second trailer door assembly 402B operably engaged with the second trailer door assembly 402B. Each of the first driving assembly 410A and the second driving assembly 410B may operably engage with the trailer 330, which is described in more detail below. The first driving assembly 410A and the second driving assembly 410B are substantially identical to one another and are engaged with the trailer 330 in a mirrored-image. Inasmuch as the first driving assembly 410A and the second driving assembly 410B are substantially identical, the following description will relate to the first driving assembly 410A. It should be understood, however, that the description of the first driving assembly 410A applies equally to the second driving assembly 410B, unless specifically stated otherwise.

Figure 8:
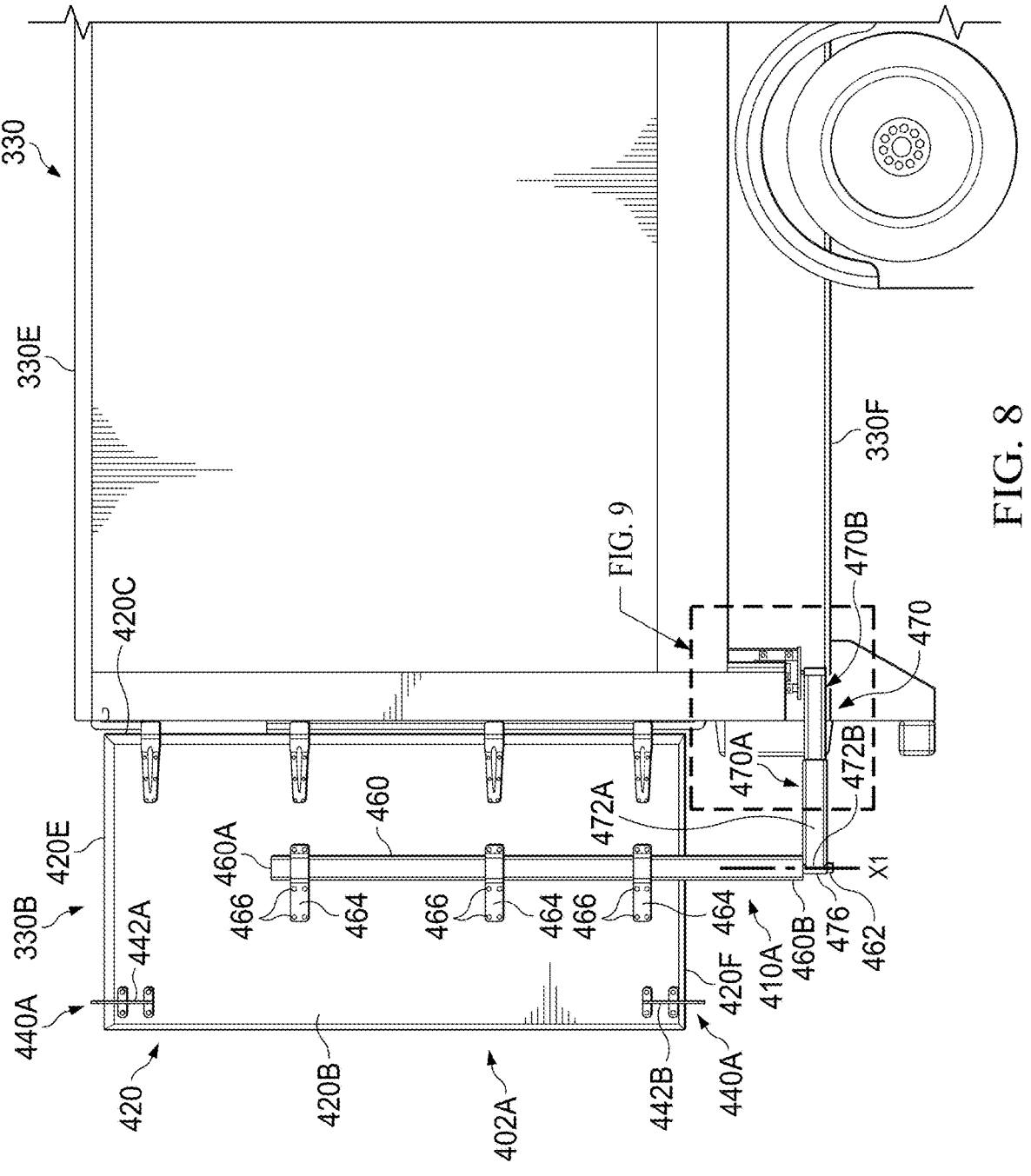
FIG. 8 (FIG. 8) is a partial right side elevation view of the first trailer door assembly and the trailer, wherein the second trailer door assembly of the trailer door system is provided in the opened position.

As illustrated in FIG. 8, the first driving assembly 410A includes a post 460. The post 460 includes a top end or first end 460A, an opposing bottom end or second end 460B, and a longitudinal axis defined therebetween parallel with the longitudinal axis of the door 420 of the first trailer door assembly 402A. The post 460 is substantially rectangular-shaped between the top and bottom ends 460A, 460B. The post 460 may also include a shaft 462 that extends from the bottom end 460B of the post 460. The shaft 462 of the post 460 is substantially round and/or cylindrical as compared to the post 460 being substantially rectangular in shape. Such use and purpose of the shaft 462 is described in more detail below. In addition, the post 460 is operably engaged with the door 420 of the first trailer door assembly 402A via a plurality of mount brackets 464. The plurality of mount brackets 464 are operably fastened to the door 420 of the first trailer door assembly 402A via mounting mechanism 166 (e.g., fasteners threaded into door 420, connector and nut mechanism engaged between the door 420, and other mechanisms of the like).

In the illustrated embodiment, the post 460 is operably engaged with the rear surface 420B of the door 420 of the first trailer door assembly 402A exterior to the compartment 331 of the trailer 330. In other exemplary embodiment, a post of a first driving assembly may be operably engaged with a door of a first trailer door assembly is any suitable configuration. In one exemplary embodiment, a post of a first driving assembly may be operably engaged with a front surface of a door of a first trailer door assembly where the post is positioned inside of a compartment of a trailer. In another exemplary embodiment, a post of a first driving assembly may be operably engaged with a door of a first trailer door assembly between front and rear surfaces of said door where the post is positioned on a side of said door. In another exemplary embodiment, a post of a first driving assembly may be operably engaged with a door of a first trailer door assembly between front and rear surfaces of said door where the post is positioned inside of said door.

In addition, the second driving assembly 410B also includes a post 460 and a plurality of mount brackets 464 operably engaged with the door 420 of the second trailer door assembly 402B, which is identical to the post 460 and plurality of mount brackets of the first driving assembly 410A operably engaged with the door 420 of the first trailer door assembly 402A described above.

Figure 9:
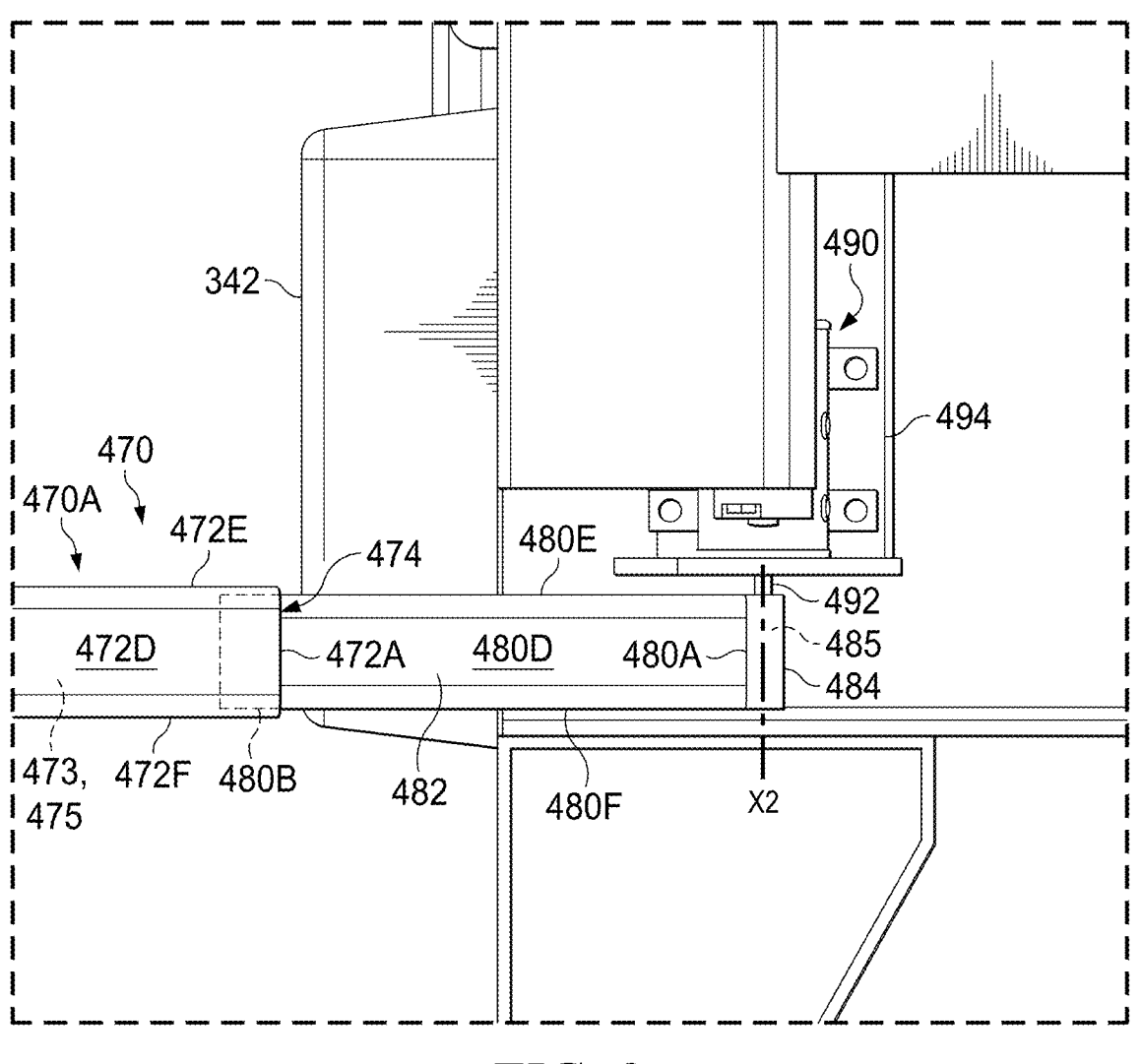
FIG. 9 (FIG. 9) is an enlargement view of the area that is highlighted in FIG. 8.

Referring to FIGS. 8 and 9, the first driving assembly 410A may also include an expansion assembly 470 that is operably engaged with the post 460. In the illustrated embodiment, the expansion assembly 470 is positioned vertically below the door 420 of the first trailer door assembly 402A and vertically below the post 460. The expansion assembly 470 includes a first or outer sleeve 470A and a second or inner sleeve 470B that may transition the expansion assembly 470 between a collapsed position (see FIGS. 5-6 and 11A-11C) and an expanded position (see FIGS. 5-6 and FIGS. 11A-11C).

As illustrated in FIGS. 6 and 8-10, the outer sleeve 470A may include a front or first end 472A, an opposing rear or second wall 472B and a longitudinal axis defined therebetween. The outer sleeve 470A may also include a first side wall or inner wall 472C (see FIG. 8) and an opposing second side wall or outer wall 472D. The outer sleeve 470A may also include a top wall 472E and an opposing bottom wall 472F. The rear wall 472B, the inner wall 472C, the outer wall 472D, the top wall 472E, and the bottom wall 472F of the outer sleeve 470A collectively define a chamber 473. The chamber 473 extends along the longitudinal axis of the outer sleeve 470A from the front end 472A to the rear end 472B. The chamber 473 is accessible via an opening 17 defined at the front end 472A of the outer sleeve 470A via the structural configuration of the inner wall 472C, the outer wall 472D, the top wall 472E, and the bottom wall 472F. The chamber 473 and the front opening 474 are sized and configured to receive a portion of the inner sleeve 470B to allow the inner sleeve 470B to slideably move inside of the outer sleeve 470A during operation, which is described in more detail below. Additionally, the rear wall 472B, the inner wall 472C, the outer wall 472D, the top wall 472E, and the bottom wall 472F of the outer sleeve 470A collectively define an interior surface 475 (see FIGS. 10 and 13A-13B) inside of the chamber 473 that operably engages with the inner sleeve 470B during operation, which is described in more detail below.

Referring to FIGS. 6 and 8, the outer sleeve 470A may also include a receiving member 476. The receiving member 476 is operably engaged with the rear wall 472B of the outer sleeve 470A. In the illustrated embodiment, the receiving member 476 is oriented orthogonal to the top and bottom walls 470E, 470F of the outer sleeve 470A relative to the longitudinal axis of the outer sleeve 470A. The receiving member 476 may also define a passageway 477 therethrough; the passageway 477 of the receiving member 476 is accessible via an open top end and an open bottom end defined by the receiving member 476. The receiving member 476 is configured to receive the shaft 462 of the post 460 for rotating the expansion assembly 470 about a first axis of rotation "X1" defined by shaft 462 (see FIGS. 6 and 8), which is described in more detail below. As such, the receiving member 476 of the outer sleeve 470A and the shaft 462 of the post 460 operably engage with one another in that the receiving member 476 is able to freely rotate about the shaft 462 about the first axis of rotation "X1" during operation.

Figure 10:
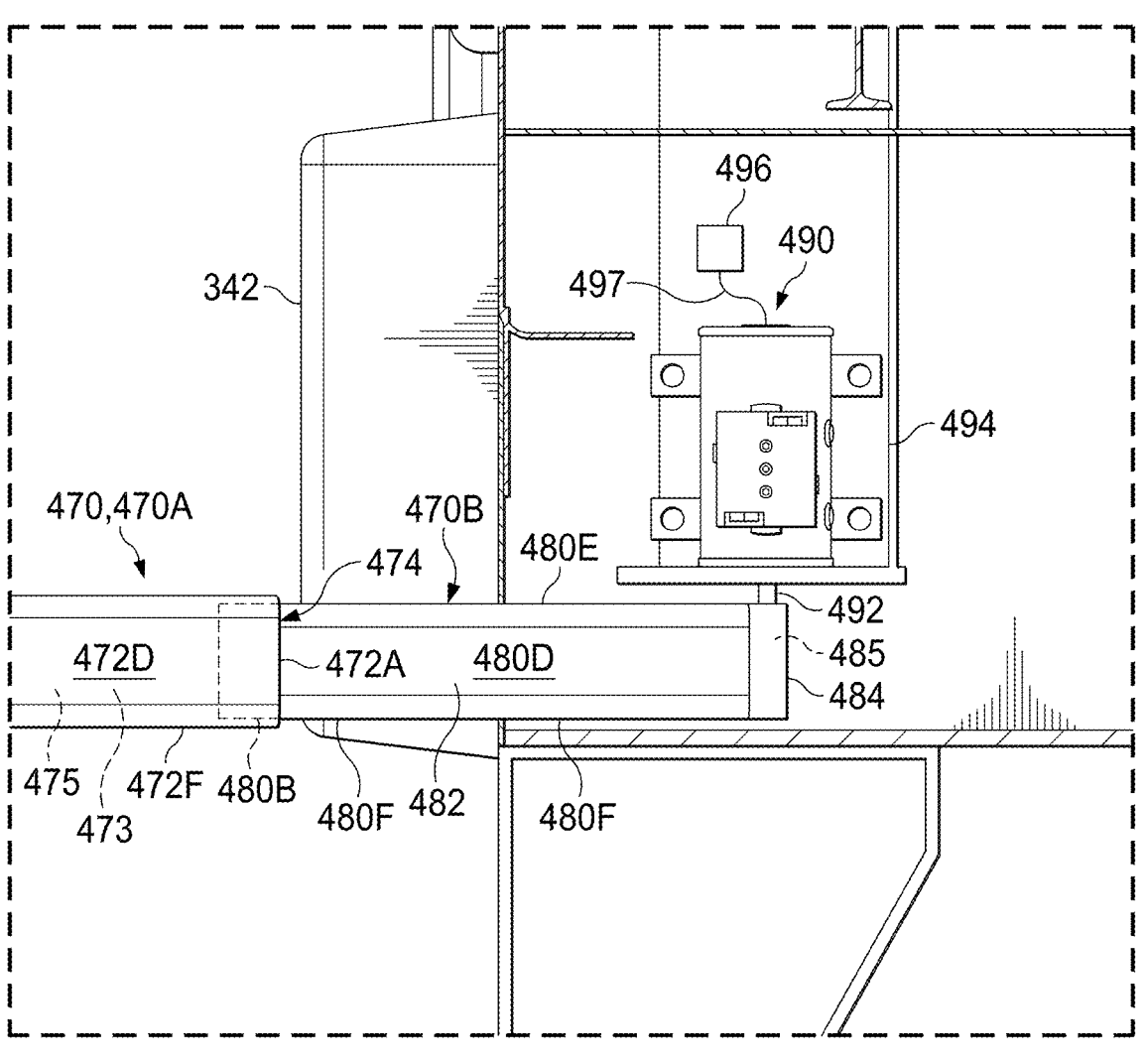
FIG. 10 (FIG. 10) is a longitudinal section view of the first trailer door assembly and the trailer shown in FIG. 6.

Referring to FIGS. 9-10, the inner sleeve 470B may include a front or first end 480A, an opposing rear or second end 480B and a longitudinal axis defined therebetween. The inner sleeve 470B may also include a first side wall or inner wall 480C (see FIG. 6) and an opposing second side wall or outer wall 480D. The inner sleeve 470B may also include a top wall 480E and an opposing bottom wall 480F. As illustrated in FIG. 9, the inner wall 480C, the outer wall 480D, the top wall 480E, and the bottom wall 480F may collectively define an exterior surface 482.

Still referring to FIGS. 8-9, the inner sleeve 470B may also include a linkage member 484. The linkage member 484 may be operably engaged with the front wall 480A of the inner sleeve 470B. In the illustrated embodiment, the linkage member 484 is oriented orthogonal to top and bottom walls 480E, 480F of the inner sleeve 470B relative to the longitudinal axis of the inner sleeve 470B. The linkage member 484 may also define a passageway 485 therethrough; the passageway 485 of the linkage member 484 is accessible via an open top end and an open bottom end defined by the linkage member 484. Such use of the linkage member 484 to transition the expansion assembly 470 from the collapsed position to the expanded position is described in more detail below.

While not illustrated herein, a material or cover may be formed or placed along an interior surface of an outer sleeve and/or along the exterior surface of an inner sleeve to promote sliding movement between the outer and inner sleeves. In one instance, friction wear pads or similar types of components may be installed or formed along an interior surface of an outer sleeve and/or along an exterior surface of the inner sleeve to promote sliding movement between the outer and inner sleeves. While not illustrated herein, sliding mechanisms may be operably engaged between outer and inner sleeves of first and second driving assemblies for transitioning the outer and inner sleeves of first and second driving assemblies between collapsed positions and expanded positions for opening and closing trailer doors. In one exemplary embodiment, rack and pinion mechanisms may be operably engaged between outer and inner sleeves of first and second driving assemblies for transitioning the outer and inner sleeves of first and second driving assemblies between collapsed positions and expanded positions for opening and closing trailer doors In addition, the second driving assembly 410B also includes an expansion assembly 470 that includes an outer sleeve 470A and an inner sleeve 470B identical to the expansion assembly 470 of the first driving assembly 410A described above. The expansion assembly 470 of the second driving assembly 410B operates identical to the expansion assembly 470 of the first driving assembly 410A in that the expansion assembly 470 is able to transition between collapsed and expanded positions for opening and closing the door 420 of the second trailer door assembly 402B.

Referring to FIG. 8, the first driving assembly 410A may also include a rotary actuator 490 that is operably engaged with the expansion assembly 470. The rotary actuator 490 may be configured to transition the expansion assembly 470 between the collapsed position and the expanded position for opening and closing the door 420 of the first trailer door assembly 402A. As illustrated in FIG. 9, the rotary actuator 490 may include a drive shaft 492 that operably engages with the linkage member 484 of the inner sleeve 470B. The drive shaft 492 may also define a second axis of rotation "X2" along the longitudinal axis of the drive shaft 492. During operation, the rotary actuator 490 is able to apply torque in a first or clockwise direction or a second or counterclockwise direction on the drive shaft 492 where the drive shaft 492 rotates about the second axis of rotation "X2" to rotate the inner sleeve 470B. Such connection between the drive shaft 492 of the rotary actuator 490 and the linkage member 484 of the inner sleeve 470B allows the rotary actuator 490 to transition the expansion assembly 470 from the collapsed position to the expanded position for opening and closing the door 420 as shown in FIGS. 7 and 11A-13B. Such operation of the rotary actuator 490 on the first trailer door assembly 402A along with the post 460 and the expansion assembly 470 is described in more detail below.

In the illustrated embodiment, the rotary actuator 490 is hydraulically powered via an on-board hydraulic system on the vehicle 321 or the trailer 330. The on-board hydraulic system may actuate the rotary actuator 490 of the first driving assembly 410A in a first direction (see FIGS. 12A-12B) for opening the first trailer door assembly 402A and in an opposing second direction for closing the first trailer door assembly 402A via controls in the vehicle 321 or the trailer 330. The hydraulic system may be controlled by the driver of the vehicle 321 or a remote user that is connected to the hydraulic system via a remote device or application operatively connected with said hydraulic system (e.g., a smartphone, tablet, or other remote device capable of interfacing with the hydraulic system). In the illustrated embodiment, the rotary actuator 490 may also be operatively controlled with a controller 496 via an electrical connection or electrical wire 497. Such controller 496 may operatively control the rotary actuator 490 for opening and closing the trailer door 420 via a remote device or application operatively connected with the controller 496. As such, the controller 496 may be operatively connected with a trailer monitoring system, such as trailer monitoring system 100 above, or other trailer systems provided on a trailer. On the other hand, the controller 496 may be independent of other systems on the trailer and controlled independently by a remote device or application adapted to interface with the controller 496.

In other exemplary embodiments, any suitable rotary actuator may be used in a trailer door system. Examples of suitable rotary actuators that may be used in a trailer door system include a pneumatic rotary actuator, an electric rotary actuator, and other suitable rotary actuators for opening and closing a trailer door assembly of a trailer. The rotary actuator 490 may also be controlled via the controller for actuating the rotary actuator 490 to open and close the door 420 of the first trailer door assembly 402A. In one exemplary embodiment, the rotary actuator 490 may be controlled via a separate controller form the controller described and illustrated herein.

Still referring to FIG. 9, a support bracket 494 may be operably engaged with the bumper 342 of the trailer 330 to support the rotary actuator 490 with the trailer 330 and the first trailer door assembly 402A. Specifically, the support bracket 494 is operably engaged with the bumper 342 where the support bracket 494 extends downwardly from the bumper 342. The support bracket 494 supports the rotary actuator 490 at an orientation where the rotary actuator 490 is oriented orthogonal to the longitudinal axis of the bumper 342.

In addition, the second driving assembly 410B also includes a rotary actuator 490 identical to the rotary actuator 490 of the first driving assembly 410A described above. The rotary actuator 490 of the second driving assembly 410B is able to actuate the expansion assembly 470 in a first direction (see FIGS. 12A-12B) for opening the first trailer door assembly 402A and in an opposing second direction for closing the first trailer door assembly 402A via controls in the vehicle 321 or the trailer 330; such actuation is identical to the rotary actuator 490 of the first driving assembly 410A.

While the first and second driving assemblies 410A, 410B are positioned towards the bottom wall 330F of the trailer 330 and the bumper 342 exterior to the compartment 331 of the trailer 330, first and second driving assemblies may be positioned along any suitable portion or position on a trailer. In one exemplary embodiment, first and second driving assemblies may be positioned towards a top end of a trailer and proximate a bolster of the trailer exterior to a compartment of the trailer. In another exemplary embodiment, first and second driving assemblies may be positioned between top and bottom ends of a trailer and between a bolster and a bumper of the trailer exterior to a compartment of the trailer. In another exemplary embodiment, first and second driving assemblies may be positioned towards a bottom end of a trailer and proximate a bumper of the trailer interior to a compartment of the trailer. In another exemplary embodiment, first and second driving assemblies may be positioned towards a top end of a trailer and proximate a bolster of the trailer interior to a compartment of the trailer. In another exemplary embodiment, first and second driving assemblies may be positioned between top and bottom ends of a trailer and between bolster and bumper of the trailer interior to a compartment of the trailer.

The use of the first and second driving assemblies 410A, 410B is considered advantageous at least because the first and second driving assemblies 410A, 410B may be fitted to existing trailers having at least one vertical hinge trailer door similar to the door 420 of either the first trailer door assembly 402A and the second trailer door assembly 402B. As such, these first and second driving assemblies 410A, 410B may be versatile in both the existing trailer market and future trailer market. Moreover, the structural configuration between the posts 460 and the expansion assemblies 470 of the first and second driving assemblies 410A, 410B allows for a single point of torque to be applied by the rotary actuators 490. In other words, the orientation of the first and second driving assemblies 410A, 410B with the first and second trailer door assemblies 402A, 402B allows the first and second driving assemblies 410A, 410B to rotate the doors 420 at a single point with any user intervention (i.e., automatically opening and closing doors 420).

Having now described the assemblies and components of the trailer door system 400 therein, a method of using the trailer door system 400 is described below.

Figure 11A:
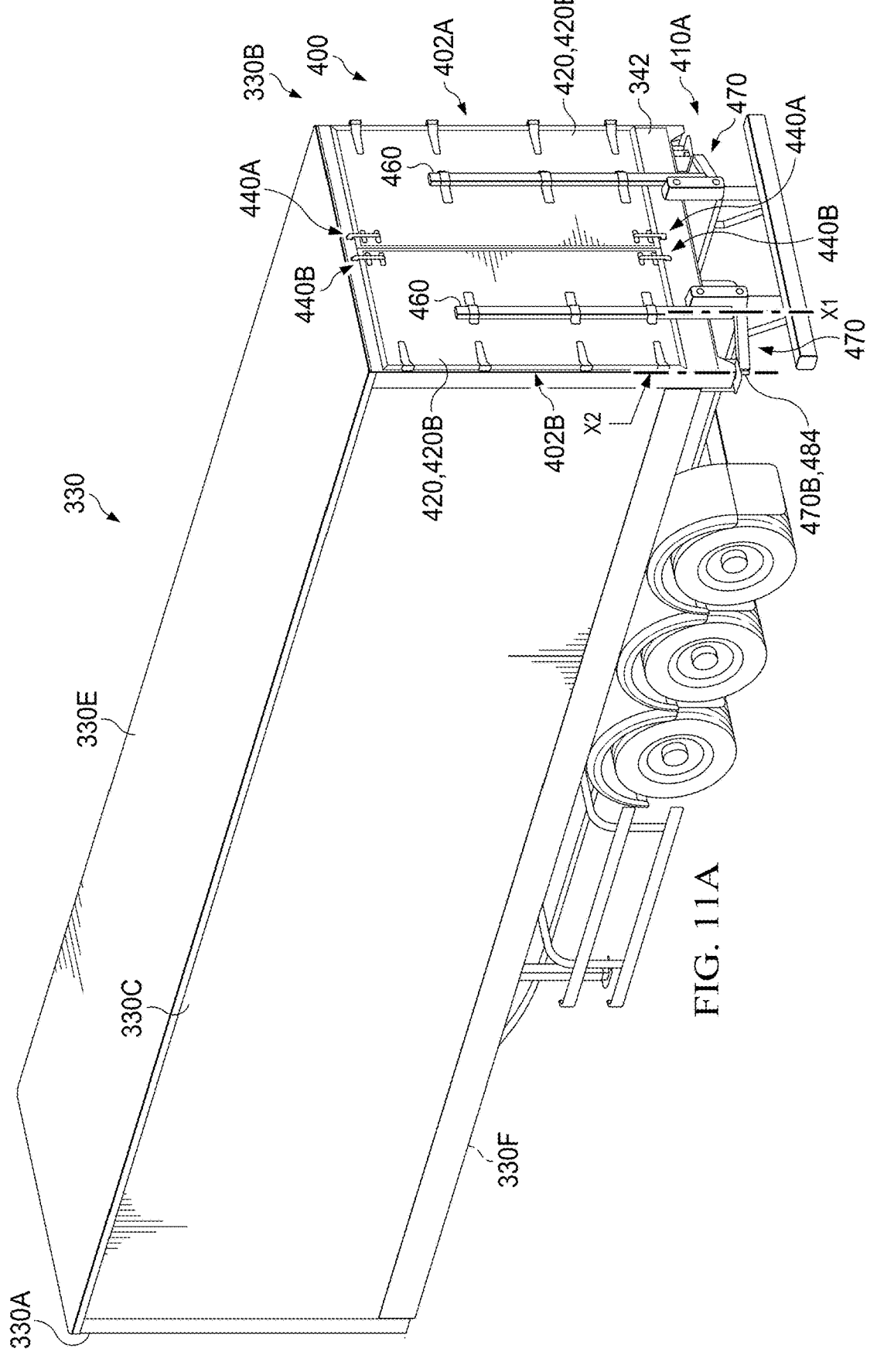
FIG. 11A (FIG. 11) is a side perspective isometric operational view of the first and second trailer door assemblies of the trailer door system provided in the closed position.
Figure 11B:
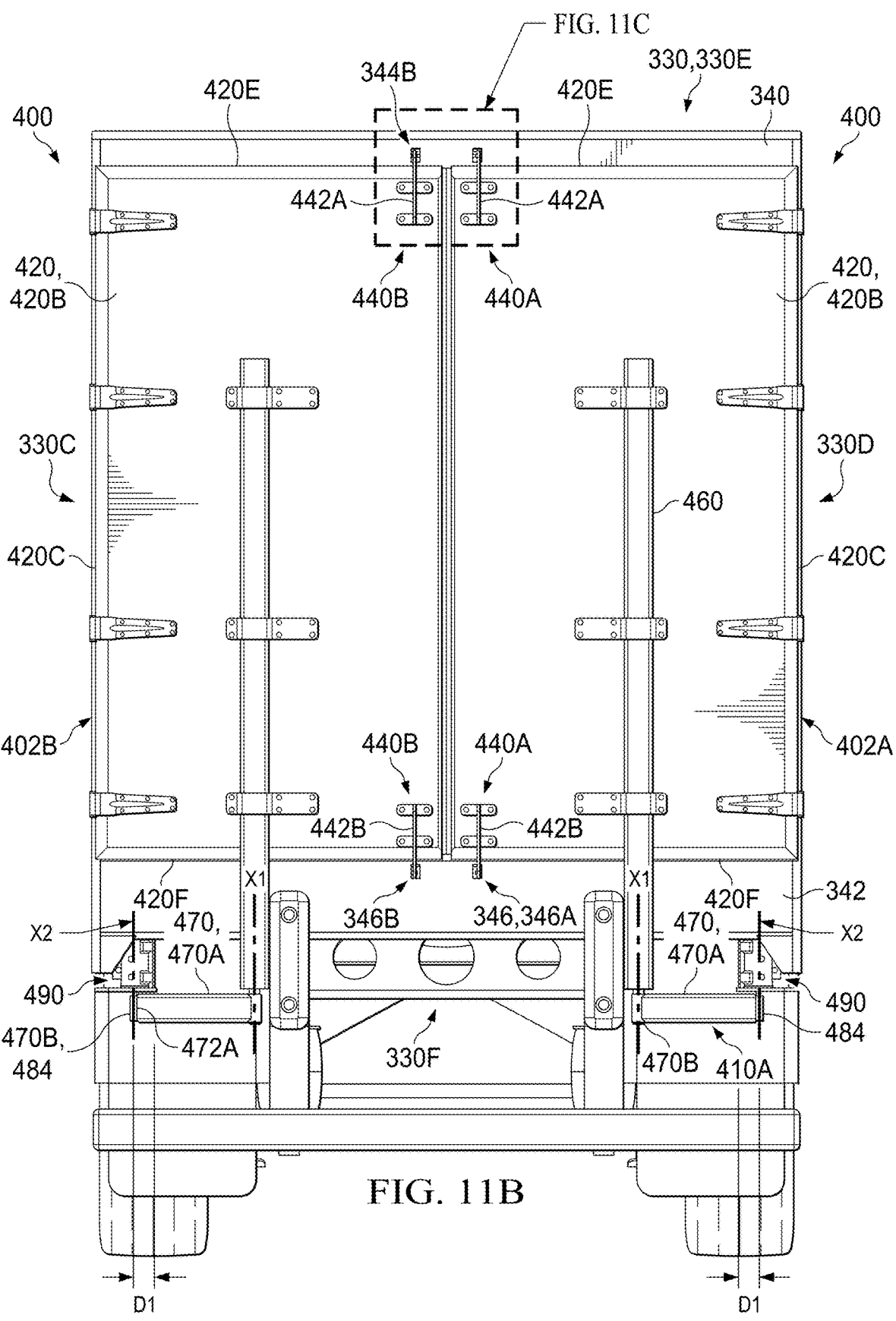
FIG. 11B (FIG. 11B) is a rear elevation operational view of the first and second trailer door assemblies of the trailer door system provided in the closed position.
Figure 11C:
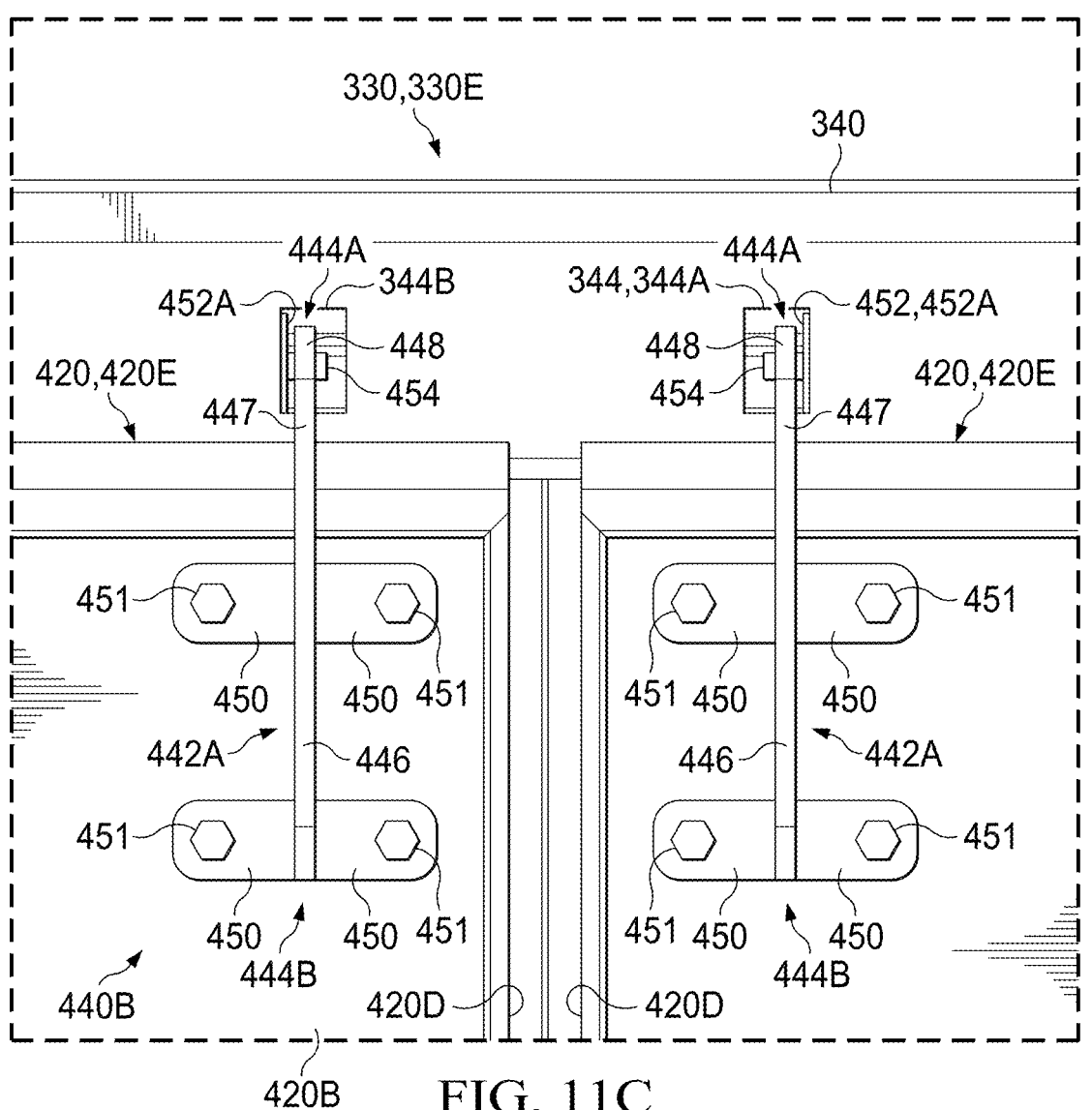
FIG. 11C (FIG. 11C) is an enlargement view of the area that is highlighted in FIG. 11B.

As illustrated in FIGS. 11A-11C, the first and second trailer door assemblies 402A, 402B are provided in the closed position to prevent the driver of the vehicle 321 and other bystanders from accessing the compartment 331 of the trailer 330. In the closed position, the first and second locking assemblies 440A, 440B may also be provided in the locked position to lock the doors 420 of the first and second trailer door assemblies 402A, 402B to the trailer 330. In the locked position, a portion of the upper and lower lock plates 442A, 442B of the first and second locking assemblies 440A, 440B are disposed inside of the bolster 340, via the upper slots 344A, 344B, and the bumper 342, via the lower slots 346A, 346B. In particular, the securement portions 448 of the upper and lower lock plates 442A, 442B of the first and second locking assemblies 440A, 440B are positioned inside of the bolster 340 and the bumper 342 via the upper and lower slots 344A, 344B, 346A, 346B (see FIG. 11C).

In the locked position, the pistons 454 of the upper and lower actuators 452A, 452B of the first locking assembly 440A may operably engaged with the upper and lower lock plates 442A, 442B via the apertures 449 defined in the securement portions 448 (i.e., a deadbolt or dead lock mechanism discussed above) (see FIG. 11C). Similarly, the pistons 454 of the upper and lower actuators 452A, 452B of the second locking assembly 440B are operably engaged with the upper and lower lock plates 442A, 442B via the apertures 449 defined in the securement portions 448 (i.e., a deadbolt or dead lock mechanism).

In the closed position, the expansion assemblies 470 of the first and second driving assemblies 410A, 410B are provided in the collapsed position. In the collapsed position, the front end 472A of each outer sleeve 470A of the first and second driving assemblies 410A, 410B is proximate to the linkage member 484 of each inner sleeve 470B of the first and second driving assemblies 410A, 410B. Additionally, the front end 472A of each outer sleeve 470A of the first and second driving assemblies 410A, 410B may be directly abutting the linkage member 484 of each inner sleeve 470B of the first and second driving assemblies 410A, 410B. In the collapsed position, a first distance "D1" may be measured between the rear wall 472B of the outer sleeve 470A to the linkage member 484 of the inner sleeve 470B in each of the first and second driving assemblies 410A, 410B (See FIG. 11B).

Prior to transitioning the doors 420 of the first and second trailer door assemblies 402A, 402B from the closed position to the opened position, the first and second locking assemblies 440A, 440B must be actuated from the locked position to the unlocked position via the air supply system be operatively engaged with the upper and lower actuators 452A, 452B of the first and second locking assemblies 440A, 440B. As illustrated in FIG. 7A, the piston 454 of the upper actuator 452A of the first locking assembly 440A transitions from the locked position to the unlocked position by moving away from upper lock plate 442A and disengaging from the upper lock plate 442A engaged with the door 420 of the second trailer door assembly 402B. In particular, the piston 454 of the upper actuator 452A is removed from the aperture 449 defined in the securement portion 448 to disengage the piston 454 from the upper lock plate 442A. The actuation of the piston 454 of the upper actuator 452A is controlled via the air supply system of either the vehicle 321 or an on-board air supply system of the trailer 330. In one instance, the piston 454 of the upper actuator 452A may be actuated by the driver of the vehicle 321 causing a first input on the upper actuator 452A to transition from the locked positon to the unlocked position. In another instance, the piston 454 of the upper actuator 452A may be actuated by a remote third-party having access to the air supply system, via a logic controller or communication device of the like, causing a first input on the upper actuator 452A to transition from the locked positon to the unlocked position.

Similarly, the piston 454 of the lower actuator 452B of the first locking assembly 440A also transitions from the locked position to the unlocked position by moving away from lower lock plate 442B and disengaging from the lower lock plate 442B engaged with the door 420 of the first trailer door assembly 402A. Moreover, the pistons 454 of the upper and lower actuators 452A, 452B of the second locking assembly 440B transitions from the locked position to the unlocked position by moving away from upper and lower lock plates 442A, 442B and disengaging from the upper and lower lock plates 442A, 442B engaged with the door 420 of the second trailer door assembly 402B. Such actuation of the remaining actuators described herein may be actuated by the driver of the vehicle 321 or a remote third-party having access to the air supply system via a logic controller or communication device of the like.

Once the upper and lower actuators 452A, 452B of the first and second locking assemblies are provided in the unlocked position, the doors 420 of the first and second trailer door assemblies 402A, 402B may the transition from the closed position to the opened position. Such transitioning of the doors 420 of the first and second trailer door assemblies 402A, 402B from the closed position to the opened position occur via torque applied by the first and second driving assemblies 410A, 410B in a first, opening direction. Such torque applied in a first opening direction is denoted by arrows labeled "R1" shown in FIGS. 12A-12B.

Figure 12A:
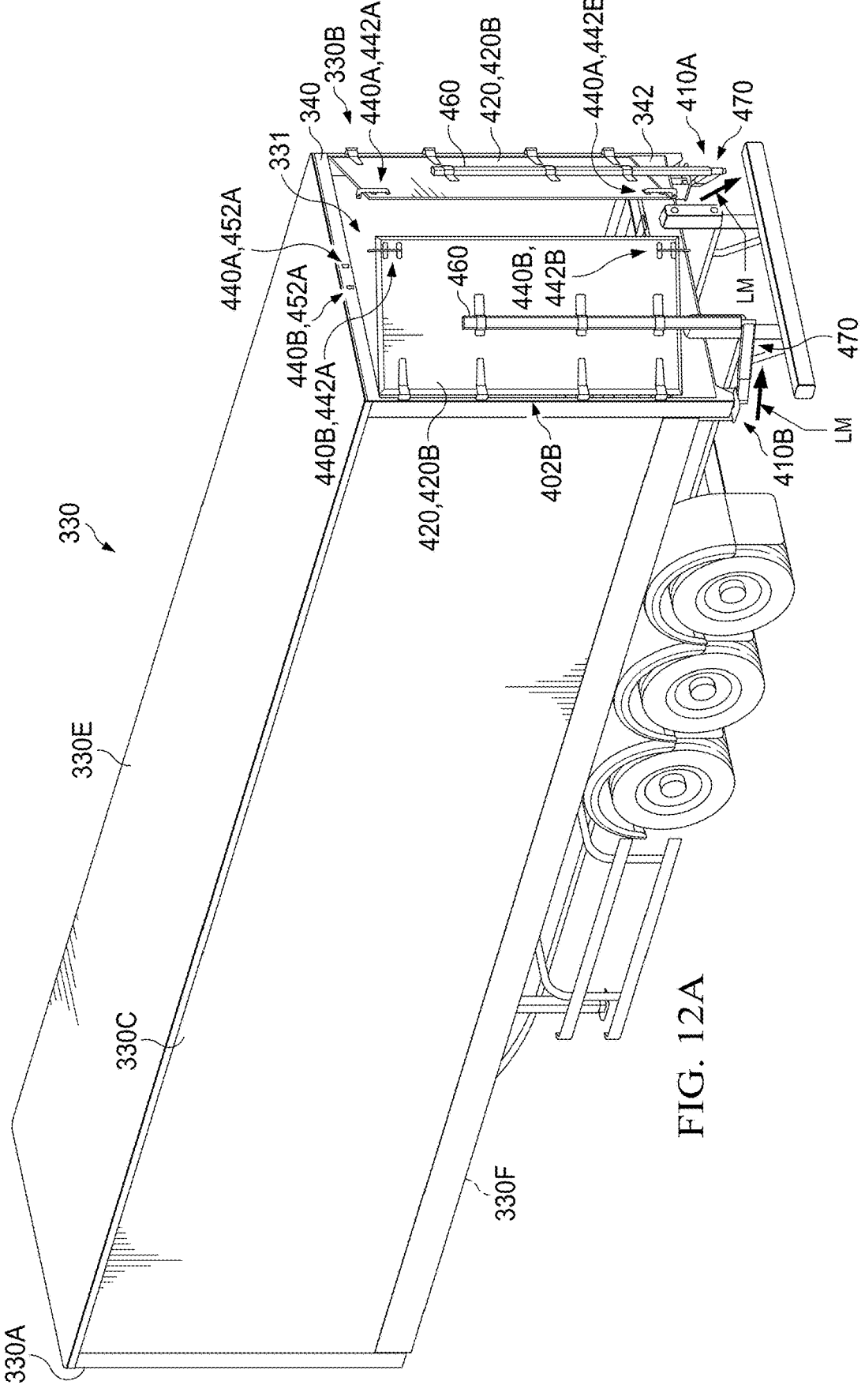
FIG. 12A (FIG. 12A) is an operational view similar to FIG. 11A, but the first and second trailer door assemblies of the trailer door system are providing in the opening position when transitioning from the closed position to the opened position.
Figure 12B:
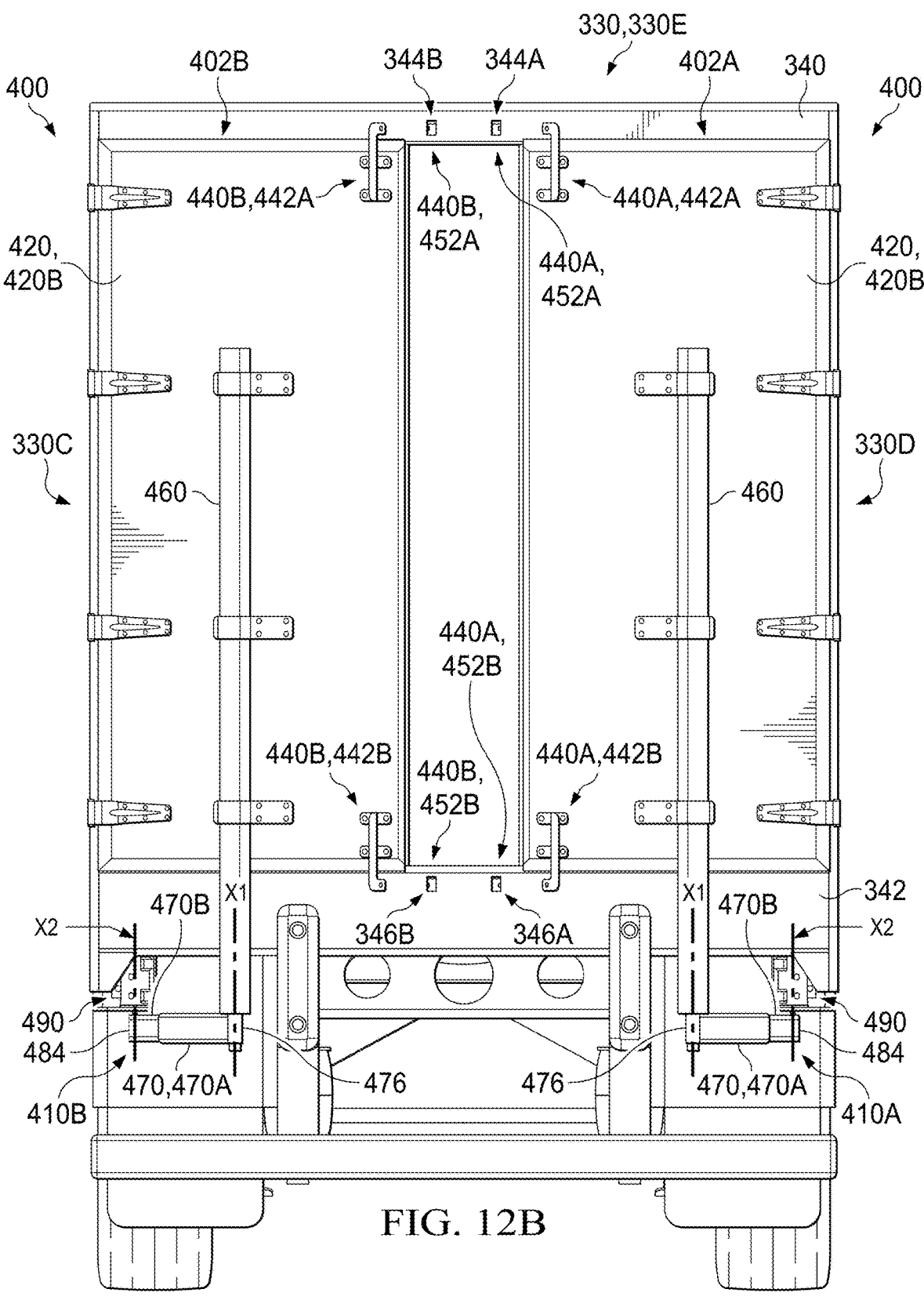
FIG. 12B (FIG. 12B) is an operational view similar to FIG. 11B, but the first and second trailer door assemblies of the trailer door system are providing in the opening position when transitioning from the closed position to the opened position.

As illustrated in FIGS. 12A-12B, each rotary actuator 490 of the first and second driving assemblies 410A, 410B applies a first torque on their respective drive shaft 492 to move the doors 420 of the first and second trailer door assemblies 402A, 402B from the closed position to the opened position. As the rotary actuators 490 apply the first torque, the linkage member 484 of the inner sleeve 470B in each driving assembly 410A, 410B is rotated about the second axis of rotation "X2" defined by each drive shaft 492. The rotation of the linkage member 484 also rotates the inner sleeve 470B about the second axis of rotation "X2" due to the linkage member 484 being operably engaged with the inner sleeve 470B.

Upon the rotation of the inner sleeve 470B, the outer sleeves 470A of the driving assemblies 410A, 410B begin to rotate about the second axis of rotation "X2" with the inner sleeves 470B due to the structural configuration between the outer sleeves 470A and inner sleeves 470B. The rotation of the outer sleeves 470A is also transferred to the posts 460 of the driving assemblies 410A, 410B to move the doors 420 of the first and second trailer door assemblies 402A, 402B from the closed position to the opened position. Specifically, the rotation of the outer sleeves 470A causes the receiving members 476 of the outer sleeves 470A to rotate about the first axis of rotations "X1" defined by the shafts 462 of posts 460. Such rotation about the first axis of rotation "X1" allows the posts 460 to rotate with the expansion assemblies 470 of the driving assemblies 410A, 410B. The rotation of the posts 460 follow the direction of the rotation "R1" caused by the first torque applied by the rotary actuators 490.

As the expansion assembly 470 of the driving assemblies 410A, 410B begin to rotate away from the trailer 330, the outer sleeves 470A slidably move rearwardly away from the inner sleeves 470B as the trailer door assemblies 402A, 402B transition toward the opened position. Such sliding of the outer sleeves 470A along the exterior surfaces 482 of the inner sleeves 470B is caused by gravitational forces applied on the first and second trailer door assemblies 402A, 402B and the first and second driving assemblies 410A, 410B. In one exemplary embodiment, first and second driving assemblies may be oriented in a way to promote sliding of outer sleeves of the first and second driving assemblies along the inner sleeves of the first and second driving assemblies. As described above, the outer sleeves 470A of the driving assemblies 410A, 410B may include a smooth or slick material inside of the chambers 473 along the interior surfaces 475 that promote the outer sleeves 470A to slidably move along the exterior surfaces 482 of the inner sleeves 470B. On the other hand, the inner sleeves 470B of the driving assemblies 410A, 410B may include a smooth or slippery material along the exterior surfaces 482 that promote the outer sleeves 470A to slidably move along the exterior surfaces 482 of the inner sleeves 470B.

As the outer sleeves 470A move away from the inner sleeves 470B, the posts 460 of the driving assemblies 410A, 410B also move away from the inner sleeves 470B with the outer sleeves 470A. Such collective movement of the posts 460 and the outer sleeves 470A is caused by the structural arrangement between the shafts 462 of the posts 460 and the receiving members 476 of the outer sleeves 470A. Such linear movement of the posts 460 and the outer sleeves 470A away from the inner sleeves 470B is denoted by arrows labeled "LM" shown in FIG. 12A. Additionally, the linear movement of the posts 460 and the outer sleeves 470A promotes the doors 420 of the first and second trailer door assemblies 402A, 402B to transition from the closed position to the opened position.

Figure 13A:
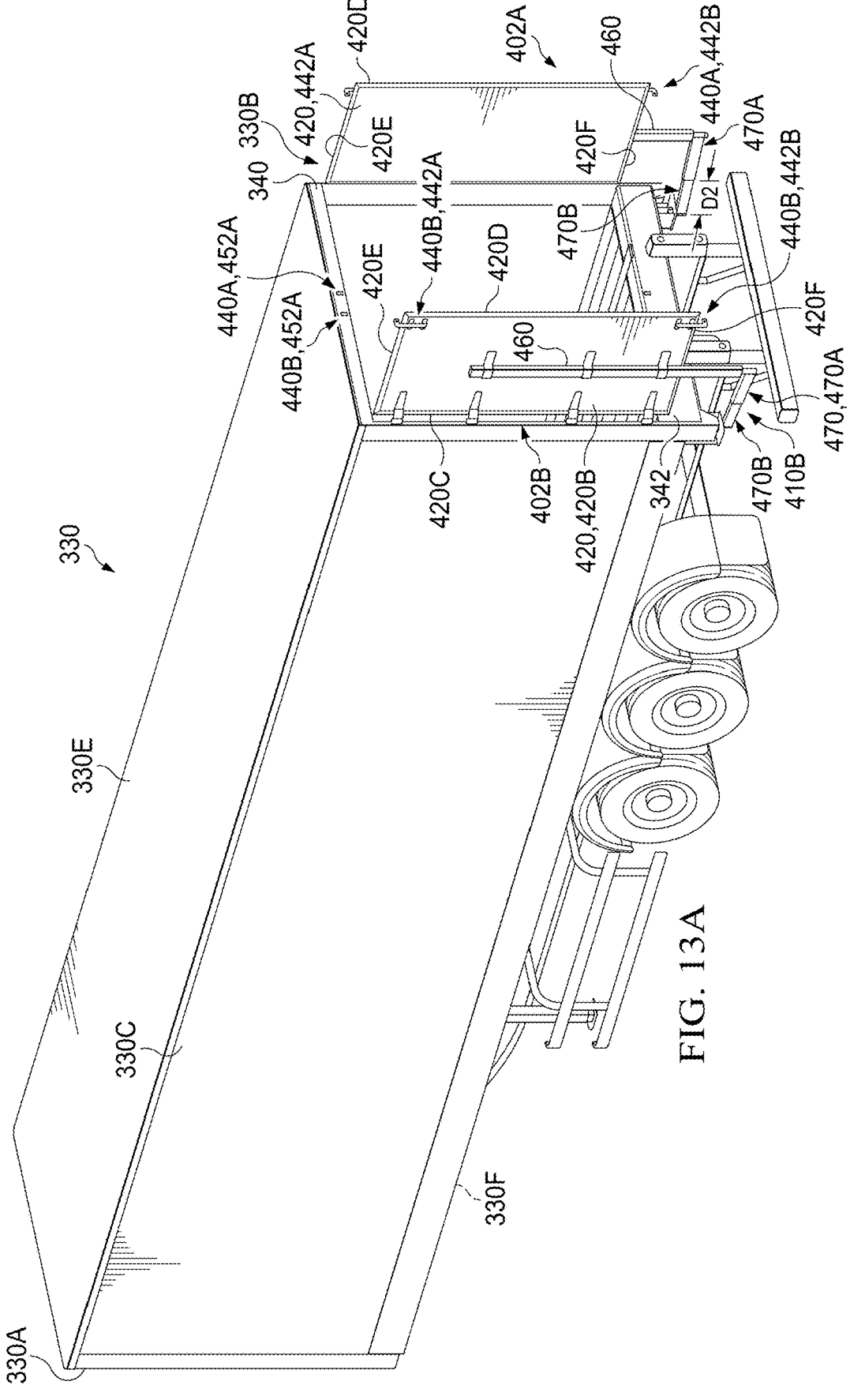
FIG. 13A (FIG. 13A) is an operational view similar to FIG. 12A, but the first and second trailer door assemblies of the trailer door system are provided in the opened position.
Figure 13B:
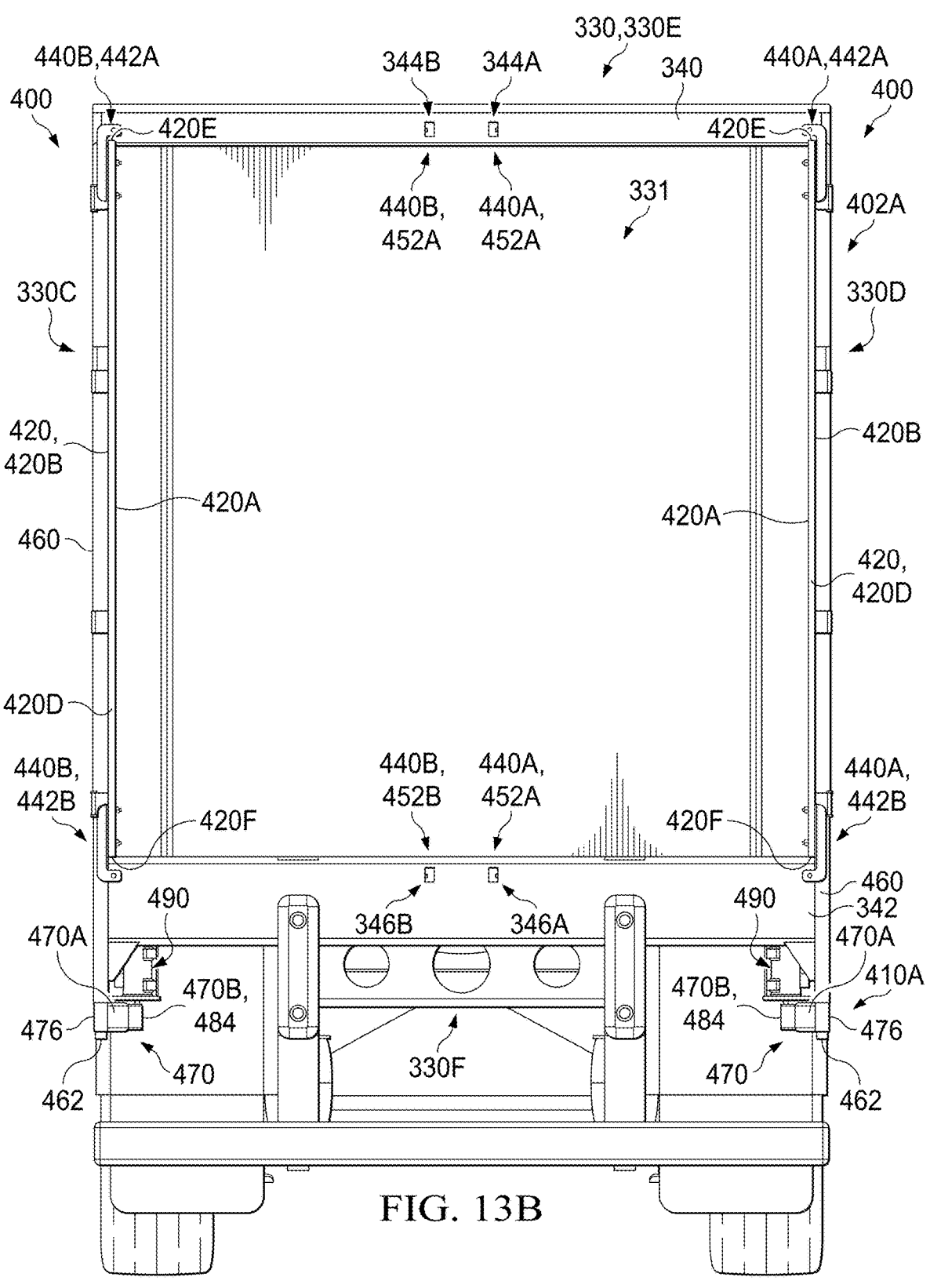
FIG. 13B (FIG. 13B) is an operational view similar to FIG. 13A, but the first and second trailer door assemblies of the trailer door system are provided in the opened position.

As illustrated in FIGS. 13A-13B, the first and second trailer door assemblies 402A, 402B are provided in the opened position to allow the driver of the vehicle 321 and other bystanders to access the compartment 331 of the trailer 330. Once the first and second trailer door assemblies 402A, 402B are provided in the open position, the expansion assemblies 470 of the driving assemblies 410A, 410B are also provided in the expanded position. Upon reaching the expanded position, the rotary actuators 490 cease applying the first torques on their respective drift shafts 492 to prevent any additional rotation on the posts 460 and the expansion assemblies 470. Such ceasing of the first torque may be operatively controlled by the hydraulic system via inputs from the driver towing the trailer 330 or from a remote user remotely connected with the hydraulic system via logic controller or communication device of the like. The rotary actuators 490 of the driving assemblies 410A, 410B may be configured to maintain the expansion assemblies 470 at the expanded position and to maintain the first and second trailer door assemblies 402A, 402B at the opened position. In other exemplary embodiments, any suitable mechanism or assembly may be used to maintain expansion assemblies of first and second driving assemblies at an expanded position and to maintain first and second trailer door assemblies at an opened position.

In the opened position, the expansion assemblies 470 of the first and second driving assemblies 410A, 410B are provided in the expanded position. In the expanded position, the front end 472A of each outer sleeve 470A of the first and second driving assemblies 410A, 410B is proximate to the rear end 480B of each inner sleeve 470B of the first and second driving assemblies 410A, 410B (see FIGS. 9-10). Additionally, the front end 472A of each outer sleeve 470A of the first and second driving assemblies 410A, 410B is positioned at a distance away from the linkage member 484 of each inner sleeve 470B of the first and second driving assemblies 410A, 410B. In the expanded position, a second distance "D2" may be measured between the rear wall 472B of the outer sleeve 470A to the front wall 480A of the inner sleeve 470B in each of the first and second driving assemblies 410A, 410B (se FIGS. 9 and 13A); the second distance "D2" is greater than the first distance "D1."

While not illustrated herein, the first and second trailer door assemblies 402A, 402B may transition from the opened position to the closed position upon conclusion of accessing the compartment 331 of the trailer 330. To transition the first and second trailer door assemblies 402A, 402B from the opened position to the closed position, the operation described above and illustrated in FIGS. 11A-13B may be accomplished in the reverse order. As such, the rotary actuators 490 of the first and second driving assemblies 410A, 410B may apply a second opposing torque on their respective drive shafts 492 to transition the first and second driving assemblies 410A, 410B from the expanded position to the collapsed position and to transition the first and second trailer door assemblies 402A, 402B from the opened position to the closed position. Once the first and second driving assemblies 410A, 410B are provided in the collapsed position and the first and second trailer door assemblies 402A, 402B are provided in the closed position, the upper and lower actuators 452A, 452B of the first and second locking assemblies 440A, 440B may be actuated from the unlocked position to the locked position. The actuation of the upper and lower actuators 452A, 452B may occur once the apertures 449 of the upper and lower lock plates 442A, 442B are aligned with the pistons 454 of said upper and lower actuators 452A, 452B. Such operation of using the trailer door system 400 may be repeated for loading and unloading cargo and freight during logistic operations.

While the first and second driving assemblies 410A, 410B transition between the first and second trailer door assemblies 402A, 402B between the closed positions and the open positions simultaneously, the first and second driving assemblies 410A, 410B may independently transition their respective trailer door assembly 402A, 402B at different intervals. In one instance, the first driving assembly 410A may transition the first trailer door assembly 402A between the closed position and the opened position while the second driving assembly 410B second trailer door assembly 402B remains at a fixed position (see FIGS. 5-6). In another instance, the second driving assembly 410B may transition the second trailer door assembly 402B between the closed position and the opened position while the first trailer door assembly 402A remains at a fixed position.

While the trailer door system 400 includes the first and second driving assemblies 410A, 410B being operatively engaged with the first and second trailer door assemblies 402A, 402B from the bottom ends 420F of the doors 420, any suitable configuration may be used for operatively engaging first and second driving assemblies with first and second trailer door assemblies. In one exemplary embodiment, a trailer door system may include first and second driving assemblies being operatively engaged with first and second trailer door assemblies from top ends of doors of the first and second trailer door assemblies. In another exemplary embodiment, a trailer door system may include first and second driving assemblies being operatively engaged with first and second trailer door assemblies between top and bottom ends of doors of the first and second trailer door assemblies.

While the trailer door system 400 includes the first and second driving assemblies being operatively engaged with the first and second trailer door assemblies 402A, 402B, any suitable number of driving assemblies may be attached to a single trailer door assembly for transitioning the single door assembly between a closed position and an opened position. In one exemplary embodiment, a single trailer door assembly may include an upper driving assembly and an opposing lower driving assembly for transitioning the single door assembly between a closed position and an opened position.

The trailer 330 and the trailer door system 400 may include any suitable trailer monitoring system, such as trailer monitoring system 100, for various considerations, include monitoring the trailer 330 and the trailer door system 400 for security purposes, assisting the driver with trailing the trailer 330 when loading or unloading freight/cargo provided in the trailer 330, monitoring the location of the trailer 330 and the state of the trailer door system 400 (e.g., whether doors are locked or unlocked, whether doors are closed or open, etc.), or other various considerations.

FIG. 14 illustrates a method 500 of accessing cargo in a trailer. An initial step 502 of the method 500 comprises engaging the trailer to a vehicle, wherein the trailer comprises at least one trailer door assembly operably engaged with at least one driving assembly. Another step 504 comprises unlocking a trailer door of the at least one trailer door assembly via at least one locking assembly. Another step 506 comprises actuating the trailer door, via a rotary actuator, from a closed position to an opened position. Another step 508 comprises pivoting the trailer door, via an expansion assembly of the at least one driving assembly, from the closed position to the opened position. Another step 510 comprises providing access cargo inside of the trailer.

In an exemplary embodiment, method 500 may include additional steps of accessing cargo in a trailer. Optional steps may further include actuating at least one actuator of the at least one locking assembly from a locked position to an unlocked position; disengaging the at least one actuator from at least one locking plate operably engaged with the trailer door; and moving the at least one locking plate from the trailer. Optional steps may further include applying a first torque, via the rotary actuator, to the expansion assembly of the at least one driving assembly; rotating an inner sleeve of the expansion assembly away from a rear end of the trailer; and sliding an outer sleeve of the expansion assembly along an inner sleeve to transition the expansion assembly from a collapsed position to an expanded position. Optional steps may further include applying a second torque, via the rotary actuator, to the expansion assembly of the at least one driving assembly; rotating the inner sleeve of the expansion assembly towards the rear end of the trailer; sliding an outer sleeve of the expansion assembly along an inner sleeve to transition the expansion assembly from expanded position to collapsed position; engaging the at least one actuator with the at least one locking plate; and actuating the at least one actuator from the unlocked position to the locked position. Optional steps may further include unlocking a second trailer door of a second trailer door assembly via a second locking assembly; actuating the second trailer door, via a second rotary actuator, from a closed position to an opened position; and pivoting the second trailer door, via a second expansion assembly of a second driving assembly, from the closed position to the opened position.

Various inventive concepts may be embodied as one or more methods, of which an example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

While various inventive embodiments have been described and illustrated herein, those of ordinary skill in the art will readily envision a variety of other means and/or structures for performing the function and/or obtaining the results and/or one or more of the advantages described herein, and each of such variations and/or modifications is deemed to be within the scope of the inventive embodiments described herein. More generally, those skilled in the art will readily appreciate that all parameters, dimensions, materials, and configurations described herein are meant to be exemplary and that the actual parameters, dimensions, materials, and/or configurations will depend upon the specific application or applications for which the inventive teachings is/are used. Those skilled in the art will recognize, or be able to ascertain using no more than routine experimentation, many equivalents to the specific inventive embodiments described herein. It is, therefore, to be understood that the foregoing embodiments are presented by way of example only and that, within the scope of the appended claims and equivalents thereto, inventive embodiments may be practiced otherwise than as specifically described and claimed. Inventive embodiments of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the inventive scope of the present disclosure.

The above-described embodiments can be implemented in any of numerous ways. For example, embodiments of technology disclosed herein may be implemented using hardware, software, or a combination thereof. When implemented in software, the software code or instructions can be executed on any suitable processor or collection of processors, whether provided in a single computer or distributed among multiple computers. Furthermore, the instructions or software code can be stored in at least one non-transitory computer readable storage medium.

Also, a computer or smartphone utilized to execute the software code or instructions via its processors may have one or more input and output devices. These devices can be used, among other things, to present a user interface. Examples of output devices that can be used to provide a user interface include printers or display screens for visual presentation of output and speakers or other sound generating devices for audible presentation of output. Examples of input devices that can be used for a user interface include keyboards, and pointing devices, such as mice, touch pads, and digitizing tablets. As another example, a computer may receive input information through speech recognition or in other audible format.

Such computers or smartphones may be interconnected by one or more networks in any suitable form, including a local area network or a wide area network, such as an enterprise network, and intelligent network (IN) or the Internet. Such networks may be based on any suitable technology and may operate according to any suitable protocol and may include wireless networks, wired networks or fiber optic networks.

The various methods or processes outlined herein may be coded as software/instructions that is executable on one or more processors that employ any one of a variety of operating systems or platforms. Additionally, such software may be written using any of a number of suitable programming languages and/or programming or scripting tools, and also may be compiled as executable machine language code or intermediate code that is executed on a framework or virtual machine.

In this respect, various inventive concepts may be embodied as a computer readable storage medium (or multiple computer readable storage media) (e.g., a computer memory, one or more floppy discs, compact discs, optical discs, magnetic tapes, flash memories, USB flash drives, SD cards, circuit configurations in Field Programmable Gate Arrays or other semiconductor devices, or other non-transitory medium or tangible computer storage medium) encoded with one or more programs that, when executed on one or more computers or other processors, perform methods that implement the various embodiments of the disclosure discussed above. The computer readable medium or media can be transportable, such that the program or programs stored thereon can be loaded onto one or more different computers or other processors to implement various aspects of the present disclosure as discussed above.

The terms "program" or "software" or "instructions" are used herein in a generic sense to refer to any type of computer code or set of computer-executable instructions that can be employed to program a computer or other processor to implement various aspects of embodiments as discussed above. Additionally, it should be appreciated that according to one aspect, one or more computer programs that when executed perform methods of the present disclosure need not reside on a single computer or processor, but may be distributed in a modular fashion amongst a number of different computers or processors to implement various aspects of the present disclosure.

Computer-executable instructions may be in many forms, such as program modules, executed by one or more computers or other devices. Generally, program modules include routines, programs, objects, components, data structures, etc. that perform particular tasks or implement particular abstract data types. Typically, the functionality of the program modules may be combined or distributed as desired in various embodiments.

Also, data structures may be stored in computer-readable media in any suitable form. For simplicity of illustration, data structures may be shown to have fields that are related through location in the data structure. Such relationships may likewise be achieved by assigning storage for the fields with locations in a computer-readable medium that convey relationship between the fields. However, any suitable mechanism may be used to establish a relationship between information in fields of a data structure, including through the use of pointers, tags or other mechanisms that establish relationship between data elements.

All definitions, as defined and used herein, should be understood to control over dictionary definitions, definitions in documents incorporated by reference, and/or ordinary meanings of the defined terms.

"Logic", as used herein, includes but is not limited to hardware, firmware, software, and/or combinations of each to perform a function(s) or an action(s), and/or to cause a function or action from another logic, method, and/or system. For example, based on a desired application or needs, logic may include a software controlled microprocessor, discrete logic like a processor (e.g., microprocessor), an application specific integrated circuit (ASIC), a programmed logic device, a memory device containing instructions, an electric device having a memory, or the like. Logic may include one or more gates, combinations of gates, or other circuit components. Logic may also be fully embodied as software. Where multiple logics are described, it may be possible to incorporate the multiple logics into one physical logic. Similarly, where a single logic is described, it may be possible to distribute that single logic between multiple physical logics.

Furthermore, the logic(s) presented herein for accomplishing various methods of this system may be directed towards improvements in existing computer-centric or internet-centric technology that may not have previous analog versions. The logic(s) may provide specific functionality directly related to structure that addresses and resolves some problems identified herein. The logic(s) may also provide significantly more advantages to solve these problems by providing an exemplary inventive concept as specific logic structure and concordant functionality of the method and system. Furthermore, the logic(s) may also provide specific computer implemented rules that improve on existing technological processes. The logic(s) provided herein extends beyond merely gathering data, analyzing the information, and displaying the results. Further, portions or all of the present disclosure may rely on underlying equations that are derived from the specific arrangement of the equipment or components as recited herein. Thus, portions of the present disclosure as it relates to the specific arrangement of the components are not directed to abstract ideas. Furthermore, the present disclosure and the appended claims present teachings that involve more than performance of well-understood, routine, and conventional activities previously known to the industry. In some of the method or process of the present disclosure, which may incorporate some aspects of natural phenomenon, the process or method steps are additional features that are new and useful.

The articles "a" and "an," as used herein in the specification and in the claims, unless clearly indicated to the contrary, should be understood to mean "at least one." The phrase "and/or," as used herein in the specification and in the claims (if at all), should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc. As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of." "Consisting essentially of," when used in the claims, shall have its ordinary meaning as used in the field of patent law.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

When a feature or element is herein referred to as being "on" another feature or element, it can be directly on the other feature or element or intervening features and/or elements may also be present. In contrast, when a feature or element is referred to as being "directly on" another feature or element, there are no intervening features or elements present. It will also be understood that, when a feature or element is referred to as being "connected", "attached" or "coupled" to another feature or element, it can be directly connected, attached or coupled to the other feature or element or intervening features or elements may be present. In contrast, when a feature or element is referred to as being "directly connected", "directly attached" or "directly coupled" to another feature or element, there are no intervening features or elements present. Although described or shown with respect to one embodiment, the features and elements so described or shown can apply to other embodiments. It will also be appreciated by those of skill in the art that references to a structure or feature that is disposed "adjacent" another feature may have portions that overlap or underlie the adjacent feature.

Spatially relative terms, such as "under", "below", "lower", "over", "upper", "above", "behind", "in front of", and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if a device in the figures is inverted, elements described as "under" or "beneath" other elements or features would then be oriented "over" the other elements or features. Thus, the exemplary term "under" can encompass both an orientation of over and under. The device may be otherwise oriented (rotated 90 degrees or at other orientations) and the spatially relative descriptors used herein interpreted accordingly. Similarly, the terms "upwardly", "downwardly", "vertical", "horizontal", "lateral", "transverse", "longitudinal", and the like are used herein for the purpose of explanation only unless specifically indicated otherwise.

Although the terms "first" and "second" may be used herein to describe various features/elements, these features/ elements should not be limited by these terms, unless the context indicates otherwise. These terms may be used to distinguish one feature/element from another feature/element. Thus, a first feature/element discussed herein could be termed a second feature/element, and similarly, a second feature/element discussed herein could be termed a first feature/element without departing from the teachings of the present invention.

An embodiment is an implementation or example of the present disclosure. Reference in the specification to "an embodiment," "one embodiment," "some embodiments," "one particular embodiment," "an exemplary embodiment," or "other embodiments," or the like, means that a particular feature, structure, or characteristic described in connection with the embodiments is included in at least some embodiments, but not necessarily all embodiments, of the invention. The various appearances "an embodiment," "one embodiment," "some embodiments," "one particular embodiment,"

"an exemplary embodiment," or "other embodiments," or the like, are not necessarily all referring to the same embodiments.

If this specification states a component, feature, structure, or characteristic "may", "might", or "could" be included, that particular component, feature, structure, or characteristic is not required to be included. If the specification or claim refers to "a" or "an" element, that does not mean there is only one of the element. If the specification or claims refer to "an additional" element, that does not preclude there being more than one of the additional element.

As used herein in the specification and claims, including as used in the examples and unless otherwise expressly specified, all numbers may be read as if prefaced by the word "about" or "approximately," even if the term does not expressly appear. The phrase "about" or "approximately" may be used when describing magnitude and/or position to indicate that the value and/or position described is within a reasonable expected range of values and/or positions. For example, a numeric value may have a value that is +/−0.1% of the stated value (or range of values), +/−1% of the stated value (or range of values), +/−2% of the stated value (or range of values), +/−5% of the stated value (or range of values), +/−10% of the stated value (or range of values), etc. Any numerical range recited herein is intended to include all sub-ranges subsumed therein.

Additionally, the method of performing the present disclosure may occur in a sequence different than those described herein. Accordingly, no sequence of the method should be read as a limitation unless explicitly stated. It is recognizable that performing some of the steps of the method in a different order could achieve a similar result.

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively.

To the extent that the present disclosure has utilized the term "invention" in various titles or sections of this specification, or in the context of those sections, this term has been included as required by the formatting requirements of word document submissions (i.e., docx submissions) pursuant the guidelines/requirements of the United States Patent and Trademark Office and shall not, in any manner, be considered a disavowal of any subject matter.

In the foregoing description, certain terms have been used for brevity, clearness, and understanding. No unnecessary limitations are to be implied therefrom beyond the requirement of the prior art because such terms are used for descriptive purposes and are intended to be broadly construed.

Moreover, the description and illustration of various embodiments of the disclosure are examples and the disclosure is not limited to the exact details shown or described.

What is claimed:

1. A method of accessing a cargo in a trailer, comprising:
   unlocking a trailer door of at least one trailer door assembly of the trailer via at least one locking assembly upon the at least one locking assembly receiving a first unlock command from a controller;
   actuating the trailer door, via a rotary actuator, from a closed position to an opened position upon the rotary actuator receiving a first torque command from the controller;

pivoting the trailer door, via an expansion assembly of at least one driving assembly, from the closed position to the opened position, based on a first torque applied by the at least one rotary actuator, wherein the expansion assembly is connected to the rotary actuator; and providing access to the cargo inside of the trailer.

2. The method of claim 1, further comprising:

actuating at least one actuator of the at least one locking assembly from a locked position to an unlocked position upon the at least one actuator receiving the first unlock command from the controller;

disengaging the at least one actuator from at least one lock plate operably engaged with the trailer door; and moving the at least one lock plate away from the trailer by the rotary actuator and the expansion assembly.

3. The method of claim 1, further comprising:

applying the first torque, via the rotary actuator, to the expansion assembly of the at least one driving assembly upon receiving the first torque command from the controller;

rotating a first sleeve of the expansion assembly away from the trailer by the rotary actuator; and sliding a second sleeve of the expansion assembly along the first sleeve to transition the expansion assembly from a collapsed position to an expanded position.

4. The method of claim 3, further comprising:

applying a second torque, via the rotary actuator, to the expansion assembly of the at least one driving assembly upon receiving a second torque command from the controller;

rotating the first sleeve of the expansion assembly towards the trailer by the rotary actuator;

sliding the second sleeve of the expansion assembly along the first sleeve to transition the expansion assembly from the expanded position to the collapsed position; and actuating at least one actuator of the at least one locking assembly from an unlocked position to a locked position upon receiving a first lock command from the controller.

5. The method of claim 1, further comprising:

unlocking a second trailer door of a second trailer door assembly via a second locking assembly upon receiving a second unlock commend from the controller;

actuating the second trailer door, via a second rotary actuator, from the closed position an opened position upon receiving the first torque command from the controller; and pivoting the second trailer door, via a second expansion assembly of a second driving assembly, from the closed position to the opened position based on a first torque applied by the second rotary actuator, wherein the second expansion assembly is connected to the second rotary actuator.

6. A method of accessing a cargo in a trailer, comprising:

unlocking a trailer door of at least one trailer door assembly of the trailer via at least one locking assembly upon the at least one locking assembly receiving a first unlock command from a controller;

actuating the trailer door, via a rotary actuator, from a closed position to an opened position upon the rotary actuator receiving a first torque command from the controller;

pivoting the trailer door, via an expansion assembly of at least one driving assembly, from the closed position to the opened position, based on a first torque applied by the at least one rotary actuator, wherein the expansion assembly is connected to the rotary actuator;

monitoring the trailer and the at least one trailer door assembly with at least one input device;

monitoring the trailer and the at least one trailer door assembly with at least one output device that is operatively connected with the at least one input device via at least one electrical connection; and providing access to the cargo inside of the trailer.

7. The method of claim 6, wherein the step of monitoring the trailer and the at least one trailer door assembly with the at least one input device further comprises:

recording visual images during a triggering event in a first viewing plane, by the at least one input device, that is exterior to a central compartment defined by the trailer;

wherein the at least one input device is a camera mounted to the trailer exterior to the central compartment.

8. The method of claim 7, wherein the step of monitoring the trailer and the at least one trailer door assembly with the at least one input device further comprises:

recording visual images during the triggering event in a second viewing plane, by at least another input device, that is interior to the central compartment defined by the trailer;

wherein the at least another input device is a camera mounted to the trailer interior to the central compartment, and wherein the second viewing plane is different than the first viewing plane.

9. The method of claim 6, wherein the step of monitoring the trailer and the at least one trailer door assembly with the at least one input device further comprises:

detecting a predetermined area surrounding the trailer with a first input device of the at least one input device; and detecting when the at least one trailer door assembly is positioned between the opened position and the closed position with a first input device of the at least one input device;

wherein the first input device is a proximity sensor; and wherein the second input device is a door sensor.

10. The method of claim 6, wherein the step of monitoring the trailer and the at least one trailer door assembly with the at least one input device further comprises:

sharing a location of the trailer with the at least one input device;

wherein the at least one input device is a geolocation device having a global positioning system (GPS).

11. The method of claim 1, wherein the step of pivoting the trailer door from the closed position to the opened position further comprises:

rotating a post, by the rotary actuator, to transition the trailer door of the at least one trailer door assembly from the closed position to the opened position, wherein the post operably engages with the expansion assembly and the rotary actuator.

12. The method of claim 11, further comprising:

rotating the expansion assembly about a shaft of the post, via the rotary actuator, to transition the expansion assembly between a collapsed position and an expanded position for opening and closing the at least one trailer door assembly.

13. The method of claim 12, wherein the shaft defines a first axis of rotation and a drive shaft of the rotary actuator defines a second axis of rotation that is parallel to the first axis of rotation.

14. The method of claim 11, wherein the post engages with a first sleeve of the expansion assembly;

wherein the rotary actuator engages with a second sleeve of the expansion assembly; and wherein the first sleeve and the second sleeve engage with one another such that the second sleeve is slidably movable inside of the first sleeve.

15. The method of claim 1, further comprising:

supporting the rotary actuator from the trailer, via a support bracket, at an angle that is orthogonal to a longitudinal axis of the trailer.

16. The method of claim 11, wherein the step of engaging the post with the door of the at least one trailer door assembly further comprises:

engaging the post with the door of the at least one trailer door assembly with at least one mounting bracket exterior to a central compartment defined by the trailer.

17. The method of claim 1, wherein at least one actuator of the at least one locking assembly connects to a bolster of the trailer or to a bumper of the trailer inside a central compartment defined by the trailer.

18. The method of claim 1, wherein a first actuator of the at least one locking assembly connects to a bolster of the trailer or to a bumper of the trailer inside a central compartment defined by the trailer; and wherein a second actuator of the at least one locking assembly connects to the bolster of the trailer or to a bumper of the trailer inside the central compartment defined by the trailer.

19. The method of claim 4, wherein the step of engaging the at least one actuator with the at least one lock plate further comprises:

housing a portion of the at least one lock plate inside of a bolster of the trailer or a bumper of the trailer when the at least one trailer door assembly is in the closed position.

20. The method of claim 19, wherein the step of engaging the at least one actuator with the at least one lock plate further includes that the at least one actuator engages with the at least one lock plate inside of the bolster of the trailer or the bumper of the trailer when the at least one trailer door assembly is in the closed position.

* * * * *